US012213135B2

(12) United States Patent
Wang et al.

(10) Patent No.: US 12,213,135 B2
(45) Date of Patent: Jan. 28, 2025

(54) RESOURCE MAPPING FOR A SCHEDULING REQUEST ON A PHYSICAL SIDELINK FEEDBACK CHANNEL

(71) Applicant: QUALCOMM Incorporated, San Diego, CA (US)

(72) Inventors: Xiaojie Wang, Hillsborough, NJ (US); Piyush Gupta, Bridgewater, NJ (US); Jing Sun, San Diego, CA (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 385 days.

(21) Appl. No.: 17/380,912

(22) Filed: Jul. 20, 2021

(65) Prior Publication Data

US 2022/0070906 A1  Mar. 3, 2022

Related U.S. Application Data

(60) Provisional application No. 63/071,255, filed on Aug. 27, 2020.

(51) Int. Cl.
*H04W 72/121* (2023.01)
*H04L 1/16* (2023.01)
(Continued)

(52) U.S. Cl.
CPC ......... *H04W 72/20* (2023.01); *H04L 1/1614* (2013.01); *H04L 1/1812* (2013.01)

(58) Field of Classification Search
CPC ... H04W 28/04; H04W 72/04; H04W 72/042; H04W 88/08; H04W 72/20;
(Continued)

(56) References Cited

U.S. PATENT DOCUMENTS 11,627,591 B2 *  4/2023  Park ................. H04L 1/1812
                                                              370/329
11,711,677 B2 *  7/2023  Hwang ............. H04L 1/1854
                                                              370/329
(Continued)

FOREIGN PATENT DOCUMENTS

EP    3 911 003 A1 * 11/2021 ........... H04W 28/04
KR    20200050848 A    5/2020
(Continued)

OTHER PUBLICATIONS

Partial International Search Report—PCT/US2021/042545—ISA/EPO—Nov. 5, 2021.
(Continued)

*Primary Examiner* — Peter G Solinsky
*Assistant Examiner* — Sanjay K Dewan
(74) *Attorney, Agent, or Firm* — Holland & Hart LLP/QUALCOMM Incorporated

(57) ABSTRACT

Methods, systems, and devices for wireless communications are described. Some wireless communications systems may support the transmission of a scheduling request via a physical sidelink feedback channel (PSFCH). In some cases, a user equipment (UE) may determine a configuration of a set of PSFCH resource blocks (RBs). The UE may receive a first bit map that may indicate a subset of the set of PSFCH RBs allocated for transmitting a scheduling request on the PSFCH, and the UE may receive a second bit map that may indicate a second subset of the PSFCH RBs allocated for hybrid automatic repeat request (HARQ) messages. The UE may transmit a scheduling request via one or more RBs of the first subset of the PSFCH RBs. In some cases, the UE may generate a waveform for transmitting the scheduling request message, and the waveform may be based on the number of RBs selected.

32 Claims, 24 Drawing Sheets

(51) Int. Cl.
*H04L 1/1607* (2023.01)
*H04L 1/18* (2023.01)
*H04L 1/1812* (2023.01)
*H04W 72/20* (2023.01)

(58) Field of Classification Search
CPC ............. H04W 72/1278; H04L 5/0007; H04L 1/1614; H04L 1/1812
USPC .......................................................... 370/329
See application file for complete search history.

(56) References Cited

U.S. PATENT DOCUMENTS

| | | | |
|---|---|---|---|
| 12,010,686 B2 * | 6/2024 | Wang | ................... H04W 72/20 |
| 2009/0232067 A1 * | 9/2009 | Pajukoski | ............. H04L 5/0053 |
| | | | 370/329 |
| 2019/0363843 A1 * | 11/2019 | Gordaychik | .............. H04L 1/08 |
| 2020/0052825 A1 | 2/2020 | Sarkis et al. | |
| 2020/0245408 A1 | 7/2020 | Zhao et al. | |
| 2022/0030613 A1 * | 1/2022 | Wang | ................... H04W 72/20 |
| 2022/0140958 A1 * | 5/2022 | Zhou | ................... H04L 1/1861 |
| | | | 370/329 |
| 2022/0141866 A1 * | 5/2022 | Liu | ...................... H04L 5/0012 |
| | | | 370/329 |
| 2023/0102142 A1 * | 3/2023 | Kim | ......................... H04L 5/00 |
| | | | 370/329 |
| 2023/0199770 A1 * | 6/2023 | Hu | ......................... H04W 72/02 |
| | | | 370/329 |
| 2023/0199824 A1 * | 6/2023 | Lee | ....................... H04L 1/1854 |
| | | | 370/329 |
| 2023/0247654 A1 * | 8/2023 | Zhang | ................... H04L 5/0092 |
| | | | 370/329 |
| 2023/0299892 A1 * | 9/2023 | Si | .......................... H04L 1/1861 |
| | | | 370/329 |
| 2023/0319787 A1 * | 10/2023 | Cozzo | ............... H04W 72/0453 |
| | | | 370/329 |

FOREIGN PATENT DOCUMENTS

| | | | |
|---|---|---|---|
| WO | WO-2018175042 A1 | 9/2018 | |
| WO | WO 2020/006388 A1 * | 1/2020 | ............ H04W 72/04 |
| WO | WO 2020/144787 A1 * | 11/2021 | ............ H04W 72/20 |

OTHER PUBLICATIONS

International Search Report and Written Opinion—PCT/US2021/042545—ISA/EPO—Feb. 9, 2022.

* cited by examiner

RESOURCE MAPPING FOR A SCHEDULING REQUEST ON A PHYSICAL SIDELINK FEEDBACK CHANNEL

CROSS REFERENCE

The present Application for Patent claims the benefit of U.S. Provisional Patent Application No. 63/071,255 by WANG et al., entitled "RESOURCE MAPPING FOR A SCHEDULING REQUEST ON A PHYSICAL SIDELINK FEEDBACK CHANNEL," filed Aug. 27, 2020, assigned to the assignee hereof, and expressly incorporated by reference herein.

INTRODUCTION

The following relates to wireless communications, including managing scheduling request transmissions on a physical sidelink feedback channel (PSFCH).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications by a first UE is described. The method may include receiving control signaling indicating a first subset of a set of PSFCH resource blocks (RBs) allocated for scheduling request transmission on a PSFCH and transmitting, on the PSFCH and to a second UE, a scheduling request message in the first subset of the set of PSFCH RBs.

An apparatus for wireless communications by a first UE is described. The apparatus may include a processor and memory coupled to the processor. The processor and memory may be configured to receive control signaling indicating a first subset of a set of PSFCH RBs allocated for scheduling request transmission on a PSFCH and transmit, on the PSFCH and to a second UE, a scheduling request message in the first subset of the set of PSFCH RBs.

Another apparatus for wireless communications by a first UE is described. The apparatus may include means for receiving control signaling indicating a first subset of a set of PSFCH RBs allocated for scheduling request transmission on a PSFCH and means for transmitting, on the PSFCH and to a second UE, a scheduling request message in the first subset of the set of PSFCH RBs.

A non-transitory computer-readable medium storing code for wireless communications by a first UE is described. The code may include instructions executable by a processor to receive control signaling indicating a first subset of a set of PSFCH RBs allocated for scheduling request transmission on a PSFCH and transmit, on the PSFCH and to a second UE, a scheduling request message in the first subset of the set of PSFCH RBs.

In some examples of the method, apparatuses, and non-transitory computer-readable medium described herein, receiving the control signaling may further include operations, features, means, or instructions for receiving a first bit map indicating the first subset of the set of PSFCH RBs allocated for the scheduling request transmission.

Some examples of the method, apparatuses, and non-transitory computer-readable medium described herein may further include operations, features, means, or instructions for receiving, from the second UE, a group index associated with the first UE and determining the first subset of the set of PSFCH RBs allocated for the scheduling request transmission on the PSFCH based on the group index. In some examples, the first bit map may indicate the first subset of the set of PSFCH RBs allocated for the scheduling request transmission by a first set of multiple UEs associated with the group index, and the first bit map may further indicate at least a second subset of the set of PSFCH RBs allocated for the scheduling request transmission by a second set of multiple UEs associated with a second group index.

In some examples of the method, apparatuses, and non-transitory computer-readable medium described herein, the first bit map further indicates a set of slots in which the first subset of the set of PSFCH RBs may be allocated for the scheduling request transmission on the PSFCH, and the first bit map includes a set of bits, each bit of the set of bits indicating a RB in the set of PSFCH RBs, a RB in a sub-channel of the set of PSFCH RBs, a RB in a set of sub-channels of the set of PSFCH RBs, or a combination thereof.

Some examples of the method, apparatuses, and non-transitory computer-readable medium described herein may further include operations, features, means, or instructions for receiving a second bit map indicating a second subset of the set of PSFCH RBs allocated for hybrid automatic repeat request (HARQ) transmission on the PSFCH.

In some examples of the method, apparatuses, and non-transitory computer-readable medium described herein, the first subset of the set of PSFCH RBs at least partially overlaps with the second subset of the set of PSFCH RBs.

Some examples of the method, apparatuses, and non-transitory computer-readable medium described herein may further include operations, features, means, or instructions for selecting one or more RBs from the first subset of the set of PSFCH RBs, the transmitting including transmitting the scheduling request message in the selected one or more RBs.

Some examples of the method, apparatuses, and non-transitory computer-readable medium described herein may further include operations, features, means, or instructions for selecting the one or more RBs based on an identifier (ID) for the first UE, an ID for the second UE, a slot number, a sub-channel index for the PSFCH, a quantity of sensors/actuators (S/As), a group index associated with the first UE, or a combination thereof.

Some examples of the method, apparatuses, and non-transitory computer-readable medium described herein may further include operations, features, means, or instructions for receiving, from the second UE, a radio resource control (RRC) message configuring the first UE with the one or more RBs, the selecting including selecting the one or more RBs based on the RRC message.

Some examples of the method, apparatuses, and non-transitory computer-readable medium described herein may further include operations, features, means, or instructions for selecting an additional RB from a second subset of the set of PSFCH RBs based on a second selection procedure, the selecting the one or more RBs from the first subset of the set of PSFCH RBs being based on a first selection procedure different from the second selection procedure and transmitting, on the PSFCH, a HARQ message in the selected additional RB.

Some examples of the method, apparatuses, and non-transitory computer-readable medium described herein may further include operations, features, means, or instructions for receiving, from the second UE, a message indicating an offset value for the first selection procedure, the selected additional RB being distinct from the selected one or more RBs based on the offset value for the first selection procedure.

Some examples of the method, apparatuses, and non-transitory computer-readable medium described herein may further include operations, features, means, or instructions for determining to transmit both the scheduling request message and a HARQ indicator in a slot, the transmitting including transmitting a hybrid message indicating the scheduling request message and the HARQ indicator in one or more RBs of the first subset of the set of PSFCH RBs.

A method for wireless communications by a second UE is described. The method may include receiving control signaling indicating a first subset of a set of PSFCH RBs allocated for scheduling request reception on a PSFCH and receiving, on the PSFCH and from a first UE, a scheduling request message in the first subset of the set of PSFCH RBs.

An apparatus for wireless communications by a second UE is described. The apparatus may include a processor and memory coupled to the processor. The processor and memory may be configured to cause the apparatus to receive control signaling indicating a first subset of a set of PSFCH RBs allocated for scheduling request reception on a PSFCH and receive, on the PSFCH and from a first UE, a scheduling request message in the first subset of the set of PSFCH RBs.

Another apparatus for wireless communications by a second UE is described. The apparatus may include means for receiving control signaling indicating a first subset of a set of PSFCH RBs allocated for scheduling request reception on a PSFCH and means for receiving, on the PSFCH and from a first UE, a scheduling request message in the first subset of the set of PSFCH RBs.

A non-transitory computer-readable medium storing code for wireless communications by a second UE is described. The code may include instructions executable by a processor to receive control signaling indicating a first subset of a set of PSFCH RBs allocated for scheduling request reception on a PSFCH and receive, on the PSFCH and from a first UE, a scheduling request message in the first subset of the set of PSFCH RBs.

In some examples of the method, apparatuses, and non-transitory computer-readable medium described herein, receiving the control signaling may include operations, features, means, or instructions for receiving a first bit map indicating the first subset of the set of PSFCH RBs allocated for scheduling request reception.

Some examples of the method, apparatuses, and non-transitory computer-readable medium described herein may further include operations, features, means, or instructions for receiving a second bit map indicating a second subset of the set of PSFCH RBs allocated for HARQ reception on the PSFCH.

In some examples of the method, apparatuses, and non-transitory computer-readable medium described herein, the first subset of the set of PSFCH RBs at least partially overlaps with the second subset of the set of PSFCH RBs.

Some examples of the method, apparatuses, and non-transitory computer-readable medium described herein may further include operations, features, means, or instructions for transmitting, to the first UE, an RRC message configuring the first UE with one or more RBs from the first subset of the set of PSFCH RBs, the scheduling request message received in the one or more RBs based on the RRC message.

Some examples of the method, apparatuses, and non-transitory computer-readable medium described herein may further include operations, features, means, or instructions for transmitting, to the first UE, a message indicating an offset value for a first selection algorithm and receiving, on the PSFCH, a HARQ message in a second subset of the set of PSFCH RBs, the scheduling request message being received in one or more RBs selected based on the first selection algorithm and the HARQ message being received in an additional RB distinct from the one or more RBs based on the offset value for the first selection algorithm.

Some examples of the method, apparatuses, and non-transitory computer-readable medium described herein may further include operations, features, means, or instructions for transmitting, to a set of multiple UEs including at least the first UE, a set of multiple group indexes, each group index of the set of multiple group indexes associated with one or more UEs of the set of multiple UEs, and the scheduling request message being received in one or more RBs of the first subset of the set of PSFCH RBs based on a group index of the set of multiple group indexes associated with the first UE.

Some examples of the method, apparatuses, and non-transitory computer-readable medium described herein may further include operations, features, means, or instructions for determining that the scheduling request message may be transmitted to the second UE based on a slot in which the scheduling request message may be received, the first subset of the set of PSFCH RBs being allocated for scheduling request transmission to the second UE in the slot.

Some examples of the method, apparatuses, and non-transitory computer-readable medium described herein may further include operations, features, means, or instructions for determining that the scheduling request message may be transmitted to the second UE based on one or more RBs in which the scheduling request message may be received being selected based on an ID for the second UE.

A method for wireless communications by a base station is described. The method may include configuring a first subset of a set of PSFCH RBs for scheduling request transmission by a first UE to a second UE on a PSFCH and transmitting, to the first UE and the second UE, control signaling indicating the first subset of the set of PSFCH RBs allocated for the scheduling request transmission on the PSFCH.

An apparatus for wireless communications by a base station is described. The apparatus may include a processor and memory coupled to the processor. The processor and memory may be configured to configure a first subset of a set of PSFCH RBs for scheduling request transmission by a first UE to a second UE on a PSFCH and transmit, to the first UE and the second UE, control signaling indicating the first subset of the set of PSFCH RBs allocated for the scheduling request transmission on the PSFCH.

Another apparatus for wireless communications by a base station is described. The apparatus may include means for configuring a first subset of a set of PSFCH RBs for scheduling request transmission by a first UE to a second UE on a PSFCH and means for transmitting, to the first UE and the second UE, control signaling indicating the first subset of the set of PSFCH RBs allocated for the scheduling request transmission on the PSFCH.

A non-transitory computer-readable medium storing code for wireless communications by a base station is described. The code may include instructions executable by a processor to configure a first subset of a set of PSFCH RBs for scheduling request transmission by a first UE to a second UE on a PSFCH and transmit, to the first UE and the second UE, control signaling indicating the first subset of the set of PSFCH RBs allocated for the scheduling request transmission on the PSFCH.

In some examples of the method, apparatuses, and non-transitory computer-readable medium described herein, the control signaling may include a first bit map indicating the first subset of the set of PSFCH RBs allocated for the scheduling request transmission, and the method, apparatuses, and non-transitory computer-readable medium may include further operations, features, means, or instructions for configuring a second subset of the set of PSFCH RBs for HARQ transmission by the first UE to the second UE on the PSFCH and transmitting, to the first UE and the second UE, a second bit map indicating the second subset of the set of PSFCH RBs allocated for the HARQ transmission on the PSFCH.

A method for wireless communications at a first UE is described. The method may include receiving, from a second UE, signaling indicating one or more RBs for transmitting a scheduling request message to the second UE on a PSFCH, generating a waveform for the scheduling request message based on a quantity of RBs in the indicated one or more RBs, and transmitting, on the PSFCH and to the second UE, the scheduling request message in the indicated one or more RBs using the generated waveform.

An apparatus for wireless communications at a first UE is described. The apparatus may include a processor and memory coupled to the processor. The processor and memory may be configured to receive, from a second UE, signaling indicating one or more RBs for transmitting a scheduling request message to the second UE on a PSFCH, generate a waveform for the scheduling request message based on a quantity of RBs in the indicated one or more RBs, and transmit, on the PSFCH and to the second UE, the scheduling request message in the indicated one or more RBs using the generated waveform.

Another apparatus for wireless communications at a first UE is described. The apparatus may include means for receiving, from a second UE, signaling indicating one or more RBs for transmitting a scheduling request message to the second UE on a PSFCH, means for generating a waveform for the scheduling request message based on a quantity of RBs in the indicated one or more RBs, and means for transmitting, on the PSFCH and to the second UE, the scheduling request message in the indicated one or more RBs using the generated waveform.

A non-transitory computer-readable medium storing code for wireless communications at a first UE is described. The code may include instructions executable by a processor to receive, from a second UE, signaling indicating one or more RBs for transmitting a scheduling request message to the second UE on a PSFCH, generate a waveform for the scheduling request message based on a quantity of RBs in the indicated one or more RBs, and transmit, on the PSFCH and to the second UE, the scheduling request message in the indicated one or more RBs using the generated waveform.

In some examples of the method, apparatuses, and non-transitory computer-readable medium described herein, the quantity of RBs may include one RB, and the method, apparatuses, and non-transitory computer-readable medium may include further operations, features, means, or instructions for determining a first root Zadoff-Chu (ZC) sequence assigned to the second UE for a first slot, the generated waveform being based on the first root ZC sequence, a cyclic shift, or both and determining a second root ZC sequence assigned to the second UE for a second slot based on a pseudo-random number generator, a seed value, an ID of the second UE, or a combination thereof.

Some examples of the method, apparatuses, and non-transitory computer-readable medium described herein may further include operations, features, means, or instructions for generating a set of multiple bits for the scheduling request message, the set of multiple bits indicating an amount of data pending in a buffer for transmission to the second UE.

Some examples of the method, apparatuses, and non-transitory computer-readable medium described herein may further include operations, features, means, or instructions for selecting a cyclic shift, a preamble, or both for the scheduling request message to indicate an amount of data pending in a buffer for transmission to the second UE.

In some examples of the method, apparatuses, and non-transitory computer-readable medium described herein, the quantity of RBs may include two or more RBs, and the method, apparatuses, and non-transitory computer-readable medium may include further operations, features, means, or instructions for determining a root ZC sequence for the two or more RBs, the generated waveform being based on the root ZC sequence and selecting a cyclic shift from a set of valid cyclic shifts for the scheduling request message, the set of valid cyclic shifts being based on the quantity of RBs, one or more channel conditions of the PSFCH, or a combination thereof.

In some examples of the method, apparatuses, and non-transitory computer-readable medium described herein, the first UE may include an S/A and the second UE may include a programmable logic controller (PLC). Some examples of the method, apparatuses, and non-transitory computer-readable medium may include further operations, features, means, or instructions for determining the quantity of RBs based on a quantity of S/As associated with the PLC, a quantity of additional PLCs coexisting with the PLC, or a combination thereof.

A method for wireless communications at a second UE is described. The method may include transmitting, to a first UE, signaling indicating one or more RBs for receiving a scheduling request message from the first UE on a PSFCH and receiving, on the PSFCH and from the first UE, a waveform corresponding to the scheduling request message in the indicated one or more RBs, the waveform generated based on a quantity of RBs in the indicated one or more RBs.

An apparatus for wireless communications at a second UE is described. The apparatus may include a processor and memory coupled to the processor. The processor and memory may be configured to transmit, to a first UE, signaling indicating one or more RBs for receiving a scheduling request message from the first UE on a PSFCH and receive, on the PSFCH and from the first UE, a waveform corresponding to the scheduling request message in the indicated one or more RBs, the waveform generated based on a quantity of RBs in the indicated one or more RBs.

Another apparatus for wireless communications at a second UE is described. The apparatus may include means for transmitting, to a first UE, signaling indicating one or more RBs for receiving a scheduling request message from the first UE on a PSFCH and means for receiving, on the PSFCH and from the first UE, a waveform corresponding to the scheduling request message in the indicated one or more RBs, the waveform generated based on a quantity of RBs in the indicated one or more RBs.

A non-transitory computer-readable medium storing code for wireless communications at a second UE is described. The code may include instructions executable by a processor to transmit, to a first UE, signaling indicating one or more RBs for receiving a scheduling request message from the first UE on a PSFCH and receive, on the PSFCH and from the first UE, a waveform corresponding to the scheduling request message in the indicated one or more RBs, the waveform generated based on a quantity of RBs in the indicated one or more RBs.

A method for wireless communications by a first UE is described. The method may include determining a configuration for a PSFCH, the configuration indicating a set of PSFCH RBs, and receiving a first bit map indicating a first subset of the set of PSFCH RBs allocated for scheduling request transmission on the PSFCH and a second bit map indicating a second subset of the set of PSFCH RBs allocated for HARQ transmission on the PSFCH. The method may also include transmitting, on the PSFCH and to a second UE, a scheduling request message in the first subset of the set of PSFCH RBs.

An apparatus for wireless communications by a first UE is described. The apparatus may include a processor and memory coupled to the processor. The processor and memory may be configured to determine a configuration for a PSFCH, the configuration indicating a set of PSFCH RBs, and receive a first bit map indicating a first subset of the set of PSFCH RBs allocated for scheduling request transmission on the PSFCH and a second bit map indicating a second subset of the set of PSFCH RBs allocated for HARQ transmission on the PSFCH. The processor and memory may be further configured to transmit, on the PSFCH and to a second UE, a scheduling request message in the first subset of the set of PSFCH RBs.

Another apparatus for wireless communications by a first UE is described. The apparatus may include means for determining a configuration for a PSFCH, the configuration indicating a set of PSFCH RBs, and receiving a first bit map indicating a first subset of the set of PSFCH RBs allocated for scheduling request transmission on the PSFCH and a second bit map indicating a second subset of the set of PSFCH RBs allocated for HARQ transmission on the PSFCH. The apparatus may further include means for transmitting, on the PSFCH and to a second UE, a scheduling request message in the first subset of the set of PSFCH RBs.

A non-transitory computer-readable medium storing code for wireless communications by a first UE is described. The code may include instructions executable by a processor to determine a configuration for a PSFCH, the configuration indicating a set of PSFCH RBs, and receive a first bit map indicating a first subset of the set of PSFCH RBs allocated for scheduling request transmission on the PSFCH and a second bit map indicating a second subset of the set of PSFCH RBs allocated for HARQ transmission on the PSFCH. The code may further include instructions executable by the processor to transmit, on the PSFCH and to a second UE, a scheduling request message in the first subset of the set of PSFCH RBs.

Some examples of the method, apparatuses, and non-transitory computer-readable medium described herein may further include operations, features, means, or instructions for selecting one or more RBs from the first subset of the set of PSFCH RBs. In some examples, the transmitting may include transmitting the scheduling request message in the selected one or more RBs.

Some examples of the method, apparatuses, and non-transitory computer-readable medium described herein may further include operations, features, means, or instructions for selecting the one or more RBs based on an ID for the first UE, an ID for the second UE, a slot number, a sub-channel index for the PSFCH, a number of S/As, a group index associated with the first UE, or a combination thereof.

Some examples of the method, apparatuses, and non-transitory computer-readable medium described herein may further include operations, features, means, or instructions for receiving, from the second UE, a RRC message configuring the first UE with the one or more RBs. In some examples, the selecting may include selecting the one or more RBs based on the RRC message.

Some examples of the method, apparatuses, and non-transitory computer-readable medium described herein may further include operations, features, means, or instructions for selecting an additional RB from the second subset of the set of PSFCH RBs and transmitting, on the PSFCH, a HARQ message in the selected additional RB.

In some examples of the method, apparatuses, and non-transitory computer-readable medium described herein, the selecting the one or more RBs from the first subset of the set of PSFCH RBs may be based on a first selection algorithm, and the selecting the additional RB from the second subset of the set of PSFCH RBs may be based on a second selection algorithm different from the first selection algorithm.

Some examples of the method, apparatuses, and non-transitory computer-readable medium described herein may further include operations, features, means, or instructions for receiving, from the second UE, a message indicating an offset value for the first selection algorithm. In some examples, the selected additional RB may be distinct from the selected one or more RBs based on the offset value for the first selection algorithm.

Some examples of the method, apparatuses, and non-transitory computer-readable medium described herein may further include operations, features, means, or instructions for receiving, from the second UE, a group index associated with the first UE and determining the first subset of the set of PSFCH RBs allocated for scheduling request transmission on the PSFCH based on the group index.

In some examples of the method, apparatuses, and non-transitory computer-readable medium described herein, the first bit map may indicate the first subset of the set of PSFCH RBs allocated for scheduling request transmission by a first set of UEs associated with the group index, and the first bit map may further indicate a third subset of the set of PSFCH RBs allocated for scheduling request transmission by a second set of UEs associated with a second group index.

In some examples of the method, apparatuses, and non-transitory computer-readable medium described herein, the first subset of the set of PSFCH RBs may be time-division multiplexed (TDMed) with the third subset of the set of PSFCH RBs.

Some examples of the method, apparatuses, and non-transitory computer-readable medium described herein may further include operations, features, means, or instructions for determining to transmit both the scheduling request message and a HARQ indicator in a slot. In some examples, the transmitting may include operations, features, means, or instructions for transmitting a hybrid message indicating the scheduling request message and the HARQ indicator in one or more RBs of the first subset of the set of PSFCH RBs.

In some examples of the method, apparatuses, and non-transitory computer-readable medium described herein, receiving the first bit map and the second bit map may further include operations, features, means, or instructions for receiving, from a base station, a broadcast message indicating the first bit map and the second bit map.

In some examples of the method, apparatuses, and non-transitory computer-readable medium described herein, the first bit map may further indicate a set of slots in which the first subset of the set of PSFCH RBs may be allocated for scheduling request transmission on the PSFCH.

In some examples of the method, apparatuses, and non-transitory computer-readable medium described herein, the first bit map may further indicate a first slot in which the first subset of the set of PSFCH RBs may be allocated for scheduling request transmission to the second UE and a second slot in which the first subset of the set of PSFCH RBs may be allocated for scheduling request transmission to a third UE.

In some examples of the method, apparatuses, and non-transitory computer-readable medium described herein, the first bit map may include a set of bits, and each bit of the set of bits may indicate an RB in the set of PSFCH RBs, an RB in a sub-channel of the set of PSFCH RBs, an RB in a set of sub-channels of the set of PSFCH RBs, or a combination thereof.

In some examples of the method, apparatuses, and non-transitory computer-readable medium described herein, the first subset of the set of PSFCH RBs may at least partially overlap with the second subset of the set of PSFCH RBs.

A method for wireless communications by a first UE is described. The method may include determining a configuration for a PSFCH, the configuration indicating a set of PSFCH RBs, and receiving a first bit map indicating a first subset of the set of PSFCH RBs allocated for scheduling request reception on the PSFCH and a second bit map indicating a second subset of the set of PSFCH RBs allocated for HARQ reception on the PSFCH. The method may further include receiving, on the PSFCH and from a second UE, a scheduling request message in the first subset of the set of PSFCH RBs.

An apparatus for wireless communications by a first UE is described. The apparatus may include a processor and memory coupled to the processor. The processor and memory may be configured to determine a configuration for a PSFCH, the configuration indicating a set of PSFCH RBs, and receive a first bit map indicating a first subset of the set of PSFCH RBs allocated for scheduling request reception on the PSFCH and a second bit map indicating a second subset of the set of PSFCH RBs allocated for HARQ reception on the PSFCH. The processor and memory may be further configured to receive, on the PSFCH and from a second UE, a scheduling request message in the first subset of the set of PSFCH RBs.

Another apparatus for wireless communications by a first UE is described. The apparatus may include means for determining a configuration for a PSFCH, the configuration indicating a set of PSFCH RBs, and receiving a first bit map indicating a first subset of the set of PSFCH RBs allocated for scheduling request reception on the PSFCH and a second bit map indicating a second subset of the set of PSFCH RBs allocated for HARQ reception on the PSFCH. The apparatus may further include means for receiving, on the PSFCH and from a second UE, a scheduling request message in the first subset of the set of PSFCH RBs.

A non-transitory computer-readable medium storing code for wireless communications by a first UE is described. The code may include instructions executable by a processor to determine a configuration for a PSFCH, the configuration indicating a set of PSFCH RBs, and receive a first bit map indicating a first subset of the set of PSFCH RBs allocated for scheduling request reception on the PSFCH and a second bit map indicating a second subset of the set of PSFCH RBs allocated for HARQ reception on the PSFCH. The code may further include instructions executable by the processor to receive, on the PSFCH and from a second UE, a scheduling request message in the first subset of the set of PSFCH RBs.

Some examples of the method, apparatuses, and non-transitory computer-readable medium described herein may further include operations, features, means, or instructions for transmitting, to the second UE, an RRC message configuring the second UE with one or more RBs from the first subset of the set of PSFCH RBs. In some examples, the scheduling request message received in the one or more RBs may be based on the RRC message.

Some examples of the method, apparatuses, and non-transitory computer-readable medium described herein may further include operations, features, means, or instructions for receiving, on the PSFCH, a HARQ message in the second subset of the set of PSFCH RBs.

Some examples of the method, apparatuses, and non-transitory computer-readable medium described herein may further include operations, features, means, or instructions for transmitting, to the second UE, a message indicating an offset value for a first selection algorithm, the scheduling request message transmitted in one or more RBs selected based on the first selection algorithm and the HARQ message transmitted in an additional RB distinct from the one or more RBs based on the offset value for the first selection algorithm.

Some examples of the method, apparatuses, and non-transitory computer-readable medium described herein may further include operations, features, means, or instructions for transmitting, to a set of UEs including at least the second UE, a set of group indexes, each group index of the set of group indexes associated with one or more UEs of the set of UEs. In some examples, the scheduling request message may be received in one or more RBs of the first subset of the set of PSFCH RBs based on a group index of the set of group indexes associated with the second UE.

Some examples of the method, apparatuses, and non-transitory computer-readable medium described herein may further include operations, features, means, or instructions for determining that the scheduling request message is transmitted to the first UE based on a slot in which the scheduling request message is received. In some examples, the first subset of the set of PSFCH RBs may be allocated for scheduling request transmission to the first UE in the slot.

Some examples of the method, apparatuses, and non-transitory computer-readable medium described herein may further include operations, features, means, or instructions for determining that the scheduling request message is transmitted to the first UE based on one or more RBs in which the scheduling request message is received being selected based on an ID for the first UE.

A method for wireless communications at a first UE is described. The method may include determining data pending in a buffer for transmission to a second UE, selecting one or more RBs for transmitting a scheduling request message to the second UE on a PSFCH based on the data pending in the buffer, generating a waveform for the scheduling request message based on a number of RBs in the selected one or more RBs, and transmitting, on the PSFCH and to the second UE, the scheduling request message in the selected one or more RBs using the generated waveform.

An apparatus for wireless communications at a first UE is described. The apparatus may include a processor and memory coupled to the processor. The processor and memory may be configured to determine data pending in a buffer for transmission to a second UE, select one or more RBs for transmitting a scheduling request message to the second UE on a PSFCH based on the data pending in the buffer, generate a waveform for the scheduling request message based on a number of RBs in the selected one or more RBs, and transmit, on the PSFCH and to the second UE, the scheduling request message in the selected one or more RBs using the generated waveform.

Another apparatus for wireless communications at a first UE is described. The apparatus may include means for determining data pending in a buffer for transmission to a second UE, selecting one or more RBs for transmitting a scheduling request message to the second UE on a PSFCH based on the data pending in the buffer, generating a waveform for the scheduling request message based on a number of RBs in the selected one or more RBs, and transmitting, on the PSFCH and to the second UE, the scheduling request message in the selected one or more RBs using the generated waveform.

A non-transitory computer-readable medium storing code for wireless communications at a first UE is described. The code may include instructions executable by a processor to determine data pending in a buffer for transmission to a second UE, select one or more RBs for transmitting a scheduling request message to the second UE on a PSFCH based on the data pending in the buffer, generate a waveform for the scheduling request message based on a number of RBs in the selected one or more RBs, and transmit, on the PSFCH and to the second UE, the scheduling request message in the selected one or more RBs using the generated waveform.

In some examples of the method, apparatuses, and non-transitory computer-readable medium described herein, the number of RBs may be one RB. Some examples of the method, apparatuses, and non-transitory computer-readable medium described herein may further include operations, features, means, or instructions for determining a root ZC sequence assigned to the second UE, the generated waveform being based on the root ZC sequence, a cyclic shift, or both.

In some examples of the method, apparatuses, and non-transitory computer-readable medium described herein, the root ZC sequence may be assigned to the second UE for a first slot. Some examples of the method, apparatuses, and non-transitory computer-readable medium described herein may further include operations, features, means, or instructions for determining a second root ZC sequence assigned to the second UE for a second slot based on a pseudo-random number generator, a seed value, an ID of the second UE, or a combination thereof.

Some examples of the method, apparatuses, and non-transitory computer-readable medium described herein may further include operations, features, means, or instructions for generating a set of bits for the scheduling request message, the set of bits indicating an amount of data pending in the buffer for transmission to the second UE.

Some examples of the method, apparatuses, and non-transitory computer-readable medium described herein may further include operations, features, means, or instructions for selecting a cyclic shift, a preamble, or both for the scheduling request message to indicate an amount of data pending in the buffer for transmission to the second UE.

In some examples of the method, apparatuses, and non-transitory computer-readable medium described herein, the number of RBs may include two or more RBs. Some examples of the method, apparatuses, and non-transitory computer-readable medium described herein may further include operations, features, means, or instructions for determining a root ZC sequence for the two or more RBs, the generated waveform being based on the root ZC sequence.

Some examples of the method, apparatuses, and non-transitory computer-readable medium described herein may further include operations, features, means, or instructions for selecting a cyclic shift from a set of valid cyclic shifts for the scheduling request message, the set of valid cyclic shifts being based on the number of RBs, one or more channel conditions of the PSFCH, or a combination thereof.

Some examples of the method, apparatuses, and non-transitory computer-readable medium described herein may further include operations, features, means, or instructions for receiving, from the second UE, a message indicating the number of RBs. In some examples, the selecting the one or more RBs may be based on the message.

In some examples of the method, apparatuses, and non-transitory computer-readable medium described herein, the first UE may include an S/A and the second UE may include a PLC. Some examples of the method, apparatuses, and non-transitory computer-readable medium described herein may further include operations, features, means, or instructions for determining the number of RBs based on a number of S/As associated with the PLC, a number of additional PLCs coexisting with the PLC, or a combination thereof.

In some examples of the method, apparatuses, and non-transitory computer-readable medium described herein, the number of RBs may include one RB, and the generated waveform may include a physical uplink control channel (PUCCH) format 0 waveform.

DETAILED DESCRIPTION

Figure 1:
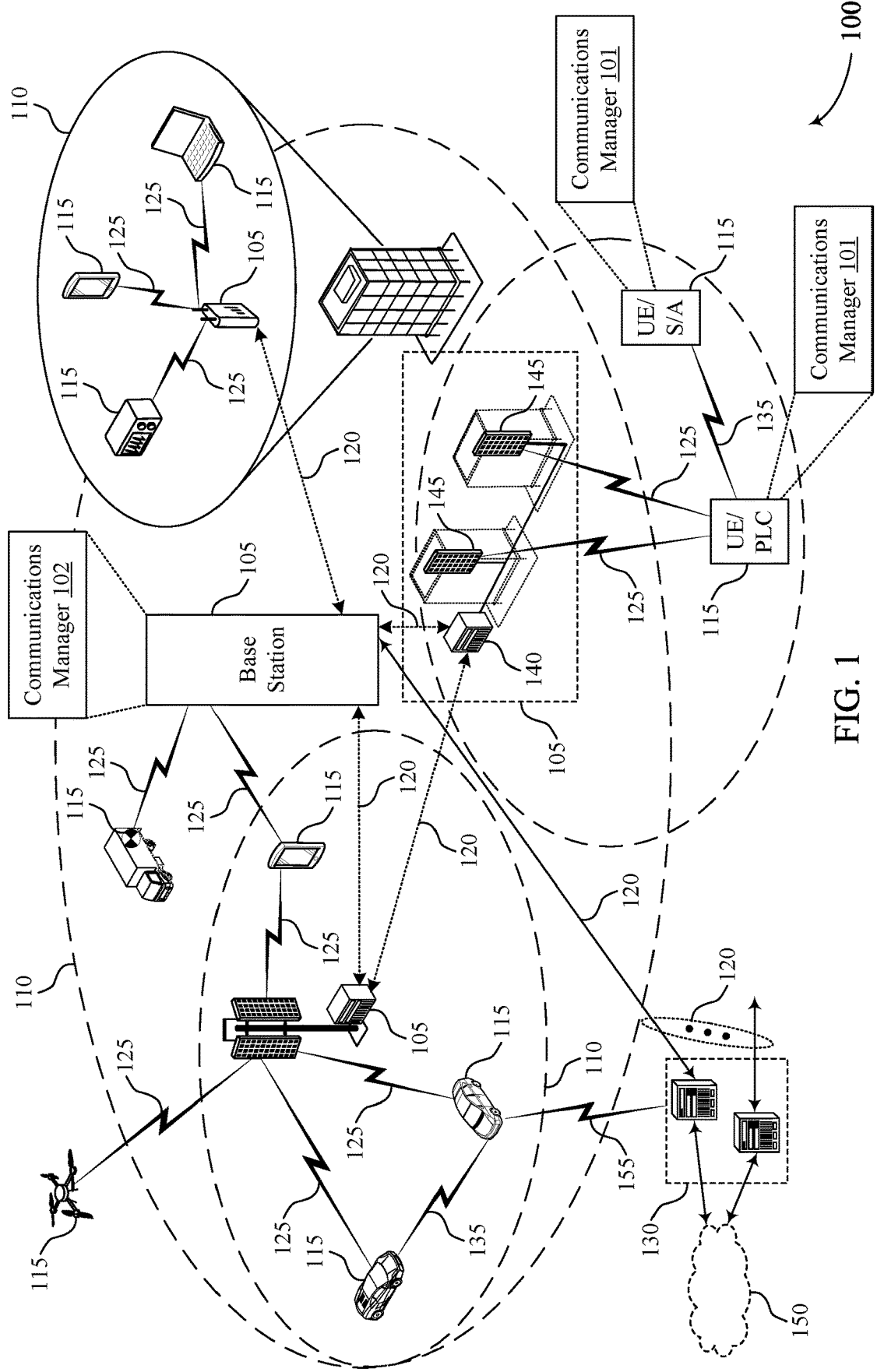
FIGS. 1 and 2 illustrate examples of wireless communications systems that support resource mapping for a scheduling request on a PSFCH in accordance with one or more aspects of the present disclosure.

Some wireless communications systems may include communication devices, such as a UE or a base station (e.g., an eNodeB (eNB), a next-generation NodeB or a giga-NodeB, either of which may be referred to as a gNB, or some other base station), that may transmit feedback messages (e.g., HARQ messages), report a scheduling request, or both via resources of a physical sidelink feedback channel (PSFCH), which may be referred to as PSFCH resources. The PSFCH may be an example of a communication channel between UEs in a wireless communications system that is configured to carry feedback information between UEs. The PSFCH resources may be resources of the PSFCH allocated for HARQ transmission or reception. For example, a first UE (e.g., a programmable logic controller (PLC) of an industrial Internet of Things (IIoT) system or some other transmitting device, such as another type of UE or a base station) may transmit sidelink data to one or more other UEs (e.g., a sensor/actuator (S/A) of an IIoT system, or some other receiving device) via a PSFCH. For example, in some systems, such as an IIoT system, a PLC may be an example of a UE providing centralized control for a set of other UEs. The other UEs—referred to as S/As—may receive configuration and scheduling information from the PLC over sidelink communication channels. In some cases, the PSFCH may be configured with sidelink feedback resources (e.g., a set of PSFCH RBs) that may be allocated for the receiving UEs to transmit sidelink feedback. The receiving devices may transmit HARQ messages indicating positive acknowledgment (ACK) or negative acknowledgment (NACK) via the PSFCH resources (e.g., each HARQ message may be transmitted via one RB of the sidelink feedback resources). In some examples, to support efficient usage of the PSFCH resources and reduce the quantity of unused PSFCH resources in the wireless communications system, base stations, UEs, or both may reuse the PSFCH resources for scheduling request communication.

To support a more efficient utilization of the PSFCH resources, the transmitting UE and the receiving UEs may receive control signaling from a base station or another network node that indicates a first subset of the PSFCH resources allocated for scheduling request transmission or reception. In some examples, the control signaling may include a first bit map indicating the first subset of the PSFCH resources that are allocated for scheduling request transmission or reception, a second bit map indicating a second subset of the PSFCH resources that are allocated for HARQ transmission or reception, or both. The control signaling (e.g., including the first and second bit maps) may thereby allocate a first subset of PSFCH resources for scheduling requests, which may provide for the one or more receiving UEs to use the PSFCH resources more efficiently. For example, the PSFCH resources that are unused by devices for HARQ transmission or reception may instead be used by the one or more receiving UEs to transmit scheduling requests to one or more transmitting UEs.

A first UE (e.g., a receiving UE) may select one or more RBs from the first subset of resources (e.g., the first subset of the PSFCH RBs allocated for scheduling request transmission) for transmitting a scheduling request, an RB from the second subset of resources for transmitting a HARQ message, or both. The first UE may transmit a scheduling request message on the selected one or more RBs of the PSFCH for transmitting the scheduling request, and a second UE (e.g., a transmitting UE) may receive the scheduling request message on the selected one or more RBs (e.g., from the first subset of the PSFCH RBs allocated for scheduling request reception at the second UE). The second UE (e.g., the transmitting UE) may transmit a sidelink grant to—or may otherwise configure sidelink transmission resources for—the first UE in response to the scheduling request message.

In some examples, the RBs of the first subset of resources may overlap with (e.g., be the same as) one or more RBs of the second subset of resources (e.g., the control signaling may allocate overlapping resources for HARQ transmission or reception and scheduling request transmission or reception). In some such examples, a receiving UE may select the RBs for scheduling request transmission based on one or more RB selection parameters to avoid a resource collision with one or more RBs selected for HARQ transmission. In another example, the receiving UE may select the RBs for transmitting a scheduling request based on signaling, such as an RRC message, from another UE that may configure the UE with the one or more RBs. Additionally or alternatively, the receiving UE may select the same resources for transmitting a HARQ feedback message as the resources selected for transmitting a scheduling request (e.g., a feedback message and scheduling request may be multiplexed within an RB). In some examples, the RBs of the first subset of resources may be different from the RBs of the second subset of resources (e.g., the resources may be mutually orthogonal), and the receiving UE may select the RBs for transmitting a scheduling request from the first subset of resources (e.g., without potentially colliding with a HARQ transmission).

A receiving UE may generate a waveform for transmitting the scheduling request based on a quantity of the RBs that the UE selects for transmitting the scheduling request. For example, if the UE transmits a scheduling request via a single RB, the scheduling request may be transmitted according to a first waveform type. Additionally or alternatively, if the UE transmits the scheduling request via multiple RBs, the scheduling request may be transmitted according to a different waveform type. In some cases, the UE may generate the waveform based on a number of root sequences (e.g., root ZC sequences), a number of cyclic shifts, or both. In some examples, the UE may select the number of RBs for transmitting a scheduling request to reduce interference associated with the scheduling request transmission. For example, the UE may select the number of RBs based on a number of UEs (e.g., a number of PLCs, a number of S/As, or both) that may use the PSFCH resources to reduce interference between the scheduling request transmissions. As such, a UE may transmit a scheduling request in one or more PSFCH RBs using techniques, such as waveform generation, to mitigate interference caused by the scheduling request and improve communication reliability.

The network may thereby transmit control signaling to one or more sidelink UEs to indicate an allocation of a first subset of PSFCH resources for scheduling request transmission or reception, which may provide for more efficient utilization of sidelink resources. The control signaling may provide for a receiving UE to transmit both scheduling request and HARQ messages via resources configured as PSFCH resources to improve efficiency, improve communication reliability, and reduce latency. Similarly, the control signaling may provide for a transmitting UE to receive both scheduling request and HARQ messages via the PSFCH resources for improved efficiency, improved communication reliability, and reduced latency.

Aspects of the disclosure are initially described in the context of wireless communications systems. Additional aspects are described with reference to communication RB allocations and process flows. Aspects of the disclosure are further illustrated by and described with reference to apparatus diagrams, system diagrams, and flowcharts that relate to resource mapping for a scheduling request on a PSFCH.

FIG. 1 illustrates an example of a wireless communications system 100 that supports resource mapping for a scheduling request on a PSFCH in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via a core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNB, a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which mafy, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or RBs) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). The region from 300 MHz to 3 GHz may be known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A sidelink UE 115 may be an example of a PLC of an IIoT communications system or an S/A of the IIoT communications system. In some examples, a UE 115 that transmits data messages to one or more other UEs 115 may be referred to as a transmitting UE 115 or a PLC. A PLC may provide centralized control of a set of other UEs 115 in a system. A UE 115 that receives the data message and transmits feedback in response to the data message 115 may be referred to as a receiving UE 115 or an S/A. For example, an S/A may be an example of a UE 115 in an IIoT communications system controlled by (e.g., scheduled by, receiving data from) a PLC.

In some examples, a sidelink UE 115, such as a receiving UE 115 or an S/A, may include a communications manager 101 configured to transmit a scheduling request via a subset of PSFCH RBs. For example, a UE 115 may determine a configuration for a PSFCH that may include a set of PSFCH RBs. The UE 115 may receive, from a base station 105 including a communications manager 102, control signaling including a first bit map that may indicate a first subset of a set of PSFCH RBs allocated for scheduling request transmission on the PSFCH, and the UE 115 may receive a second bit map that may indicate a second subset of the PSFCH RBs allocated for HARQ transmission. In some examples, the UE 115 may receive the bit maps from another UE 115 or from a base station 105. For example, a base station 105 may configure and transmit the control signaling using a communications manager 102. A UE 115 may receive the control signaling directly from the base station 105 or, in some examples, may receive the control signaling from the base station 105 via a UE 115—such as a PLC—forwarding the control signaling to one or more other UEs 115. The receiving UE 115 may select one or more RBs of the first subset of RBs for transmitting a scheduling request. In some examples, the selection may be based on one or more selection parameters, an RRC configuration message received at the UE, the allocation of the RBs, or a combination thereof. The UE 115 may select RBs for transmitting the scheduling request that may be different from RBs that the UE 115 or another UE 115 may select for transmitting a HARQ message in order to reduce potential interference between the scheduling request and the HARQ message. Additionally or alternatively, the UE 115 may multiplex a HARQ message and a scheduling request within a single RB (e.g., the UE 115 may transmit each message using a different cyclic shift within the RB). In some cases, the UE 115 may generate a waveform for transmitting the scheduling request message, and the waveform may be based on the number of RBs selected. For example, the waveform may be generated based on a number of root sequences (e.g., root ZC sequences), a number of cyclic shifts, or both. In some examples, the UE 115 may determine a number of RBs for transmitting a scheduling request to improve the performance of the waveform and reduce interference.

Figure 2:
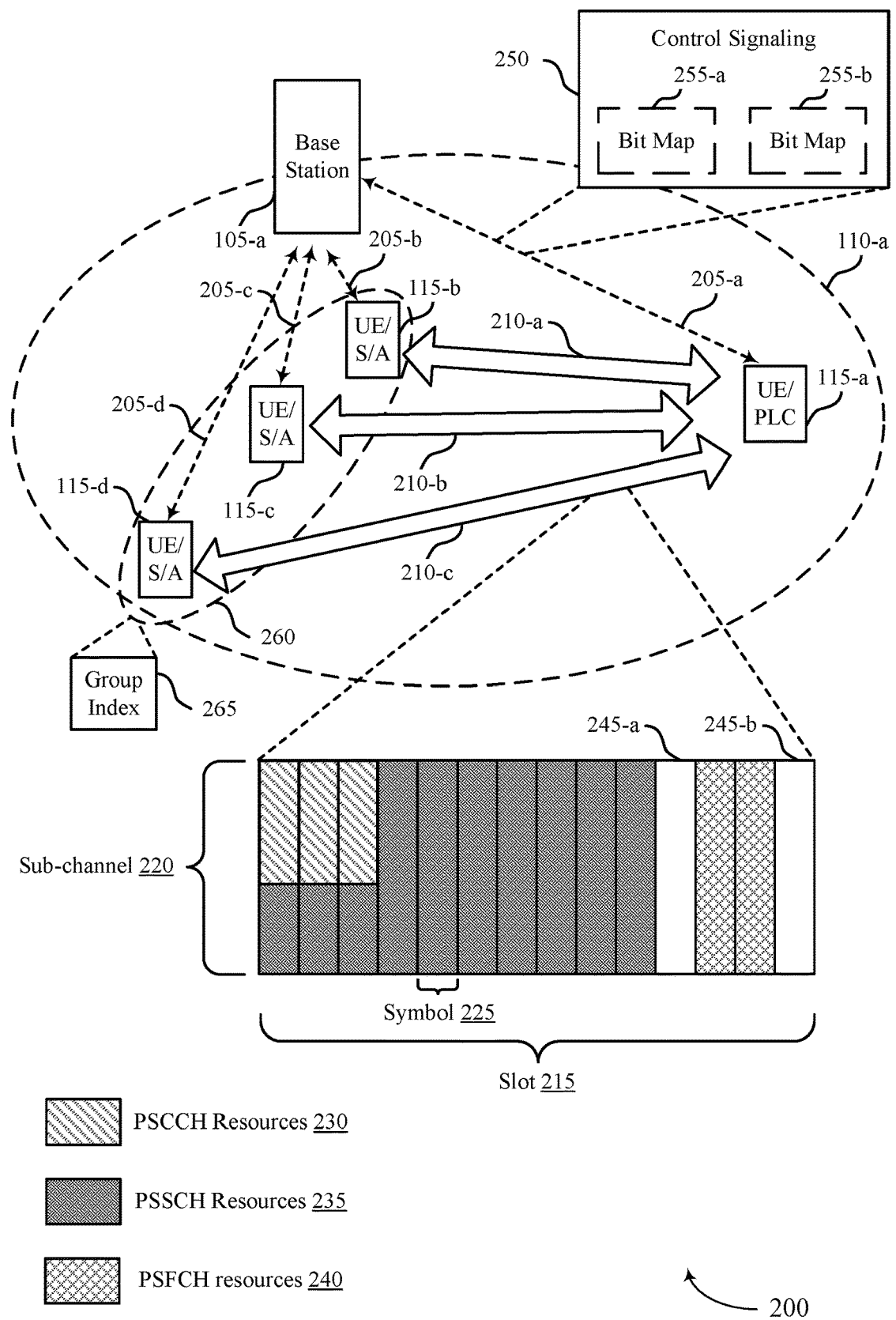

FIG. 2 illustrates an example of a wireless communications system 200 that supports resource mapping for a scheduling request on a PSFCH in accordance with one or more aspects of the present disclosure. The wireless communications system 200 may include base station 105-*a* and UEs 115-*a*, 115-*b*, 115-*c*, and 115-*d*, which may be examples of a base station 105 and UEs 115 as described with reference to FIG. 1. Additionally or alternatively, UEs 115-*a*, 115-*b*, 115-*c*, and 115-*d* may be examples of, or may include, a PLC, an S/A (e.g., devices that may support IIoT communications), or some other device. UEs 115-*a*, 115-*b*, 115-*c*, and 115-*d* may support sidelink communications via the sidelink communication links 210 (e.g., sidelink communication links 210-*a*, 210-*b*, and 210-*c*). Each UE 115 may communicate with base station 105-*a* via a communication link 205 (e.g., communication links 205-*a*, 205-*b*, 205-*c*, and 205-*d*) within coverage area 110-*a*. In some examples, a sub-channel 220 of a sidelink communication link 210 may be configured with one or more PSFCH resources 240, and a UE 115 may use the PSFCH resources 240 to transmit a HARQ message, a scheduling request, or both to another UE 115.

The UEs 115 of the wireless communications system 200 may communicate via sidelink communication links 210, which may include one or more sub-channels 220 and one or more slots 215. A slot 215, as illustrated in FIG. 2, may include some number of symbols 225 (e.g., 14 OFDM symbols 225 within the slot 215), and the sub-channel 220 may include some number of RBs (e.g., one sub-channel 220 may include 10, 50, 100, or some other number of RBs). The resources included in a sub-channel 220 of a sidelink communication link 210 may be allocated as the physical sidelink control channel (PSCCH) resources 230, the physical sidelink shared channel (PSSCH) resources 235, the PSFCH resources 240, or some combination thereof. For example, one or more of the symbols 225 and the RBs of the sub-channel 220 may be configured for each of the PSCCH resources 230, the PSSCH resources 235, or the PSFCH resources 240. Additionally or alternatively, the sub-channel 220 may include one or more gaps 245, such as gaps 245-*a* and 245-*b*, configured before and after the PSFCH resources 240 within the sub-channel 220. In some examples, sidelink control information (SCI) transmitted via the PSCCH resources 230 may inform one or more receiving UEs 115 of the resource allocation for the PSSCH resources 235 (e.g., information transmitted via a PSCCH may inform a single receiving UE 115 or a group 260 of receiving UEs 115 of the location of the PSSCH resources for receiving sidelink data).

In some examples, a sub-channel 220, a slot 215, or both, may be configured to include the PSFCH resources 240 for a receiving UE 115 (e.g., a UE 115 receiving sidelink communications via a respective sidelink communication link 210) to report feedback, such as a HARQ message, for the data received via the PSSCH resources 235. In some examples, the PSFCH resources 240 may be configured by a higher layer parameter (e.g., the location of the PSFCH resources 240 may be indicated to a receiving UE 115 via a bit map), and the configuration may indicate a set of PSFCH RBs (e.g., physical resource blocks (PRBs)). The PSFCH resources 240 may be configured to occupy some number of symbols 225 (e.g., two OFDM symbols 225) and some number of RBs of the sub-channel 220. In one example, the reserved PSFCH resources 240 may occupy the same number of RBs as the corresponding sub-channel 220. Additionally or alternatively, the PSFCH resources 240 may occupy some other number of RBs, or the sub-channel 220 may not include the PSFCH resources 240.

The PSFCH resources 240 may be configured with one or more sidelink feedback parameters, such as a feedback period, a feedback gap, a number of cyclic shifts, or some combination thereof. The PSFCH resources 240 may be configured with a periodicity such that the PSFCH resources 240 may be reserved in some number of the sub-channels 220 or some number of the slots 215 to be communicated via a sidelink communication link 210. For example, the feedback period may indicate that the PSFCH resources 240 are reserved in every other slot 215, every fourth slot 215, or some other number of slots 215 (e.g., there may be one or more options for configuring the feedback period, such as {0, 1, 2, 4}). In some examples, the feedback period may indicate that the PSFCH resources 240 are disabled (e.g., if the feedback period is {0}). A feedback gaps may be configured for a UE 115 specifying a time (e.g., a minimum number of slots, such as {2, 3}) between the PSSCH resources 235 for receiving a sidelink data message and the PSFCH resources 240 for transmitting feedback for the sidelink data message. In one example, the feedback gap may be configured for UE 115-d to receive and decode a sidelink data message from UE 115-a and determine whether to transmit a HARQ feedback message via the PSFCH resources 240. Additionally or alternatively, the network may configure a number of cyclic shifts for the PSFCH resources 240 (e.g., a number of cyclic shifts may be configured for each PSFCH RB, and each cyclic shift may be mutually orthogonal). For example, a number of multiplexing cycle shift pairs, such as {1, 2, 3, 4, 6}, may be supported for a PSFCH transmission based on the configuration. The PSFCH resources 240 and the corresponding parameters may be configured by a bitmap, such as rbSetPSFCH. In some examples, base station 105-a may configure the PSFCH resources 240 for the UEs 115.

In the example of FIG. 2, UE 115-d may receive a sidelink data message from UE 115-a via PSSCH resources 235 (e.g., in the slot 215 or a previous slot). UE 115-d may perform a decoding procedure on the sidelink data message, and if UE 115-d is unable to receive or decode the data message, UE 115-d may transmit a NACK via the PSFCH resources 240. Additionally or alternatively, if UE 115-d successfully receives and decodes the data message, UE 115-d may transmit an ACK via the PSFCH resources 240, or no feedback message (e.g., during groupcast communications, if the group 260 of UEs 115 receives the sidelink data message). In some examples, the PSFCH resources 240 may not be configured in the slot 215 in which a feedback message for the data message is ready for transmission (e.g., the PSFCH resources 240 may be configured in every other slot), and UE 115-d may transmit the feedback message for the data message via the next slot 215 that is configured with the PSFCH resources 240. The feedback message may be transmitted via one or more of the symbols 225 and one or more of the RBs configured for sidelink feedback. In one example, the HARQ message may be a single bit, and UE 115-d may transmit the message via one symbol 225 and one RB of the sidelink feedback resources. Additionally or alternatively, UE 115-d may transmit the HARQ message via some other number of symbols 225 or some other number of RBs.

In the case of groupcast communications, one or more receiving UEs 115 may share the PSFCH resources 240. For example, UE 115-a may transmit a groupcast sidelink data message to the group 260 of UEs 115-b, 115-c, and 115-d, and each of the receiving UEs 115-b, 115-c, and 115-d may transmit a HARQ feedback message for the data message to UE 115-a via the PSFCH resources 240 configured for the groupcast data message. UE 115-b may transmit a first HARQ message via a first symbol 225 and a first RB, and UE 115-c may transmit a second HARQ message via a second symbol 225 and a second RB. Additionally or alternatively, UEs 115-b and 115-c may share a symbol 225, an RB, or both, of the PSFCH resources 240 (e.g., UEs 115-b and 115-c may multiplex the respective feedback messages within a feedback resource). In some examples, the group 260 of UEs 115 may be identified according to a group index 265.

In some examples, the PSFCH resources 240 configured by the network may be under-utilized by the one or more receiving UEs 115. For example, the PSFCH resources 240 may be configured to occupy multiple RBs (e.g., 10, 50, 100, or some other number of RBs), and a receiving UE 115 may use a single RB of the configured PSFCH resources 240 to transmit a HARQ message. As such, a percentage of the PSFCH resources 240 that are used may be small (e.g., 1-10 percent of the PSFCH resources 240 may be used, and 90-99 percent of the PSFCH resources 240 may be unused). If each RB is configured with a number of cyclic shifts, the resource utilization may further decrease (e.g., because a UE 115 may transmit one or more messages via a single RB by using each cyclic shift of the RB). In one example, as the number of cyclic shifts configured per RB increases, the resource utilization may decrease (e.g., there may be up to six cyclic shifts configured for each RB of the PSFCH resources 240, and the resource utilization may decrease by a factor of six). In some examples, the utilization of the configured PSFCH resources 240 may increase if multiple UEs 115 share the PSFCH resources 240 (e.g., if multiple UEs 115 use the PSFCH resources 240 for transmitting HARQ messages) or if the feedback period is larger (e.g., if the PSFCH resources 240 are configured in fewer slots 215).

As described herein, the network may configure the PSFCH resources 240 with a first subset of resources allocated for scheduling request transmission and a second subset of resources allocated for HARQ transmission to improve the resource utilization. Base station 105-a may transmit control signaling 250 to one or more UEs 115 in geographic coverage area 110-a to indicate the first and second subsets of resources. In some examples, the control signaling 250 may include a first bit map 255-a, a second bit map 255-b, or both, and the bit maps 255 may indicate the first and second subsets of resources. For example, receiving UE 115-d and transmitting UE 115-a may receive the control signaling 250 including first bit map 255-a that may indicate a subset of the PSFCH resources 240 that may be allocated for scheduling request transmissions (e.g., a scheduling request resource pool). Additionally or alternatively, receiving UE 115-d and transmitting UE 115-a may receive a second bit map 255-b that may indicate a second subset of the PSFCH resources 240 that may be allocated for HARQ transmissions (e.g., a HARQ resource pool). Receiving UE 115-d may select one or more RBs of the scheduling request resource pool for transmitting a scheduling request, and receiving UE 115-d may select another RB of the HARQ resource pool for transmitting a HARQ message.

In some examples, UE 115-d may select the RBs based on one or more RB selection parameters such as an ID of UE 115-d, an ID of transmitter UE 115-a, a slot number, a sub-channel index for the PSFCH, a number of S/As or other devices, a group index 265 associated with the UE 115 (e.g., the UEs 115 may be configured in groups of one or more UEs 115, such as the group 260, and each group may correspond to a respective group index 265), or some combination thereof. The RB selection parameters for selecting a scheduling request RB may be the same as or different from the RB selection parameters for selecting a HARQ RB. UE 115-d may select the one or more HARQ RBs based on a HARQ RB selection algorithm that may include the one or more HARQ RB selection parameters, and UE 115-d may select the scheduling request RBs based on a scheduling request RB selection algorithm that may include the one or more scheduling request RB selection parameters. In some examples, transmitting UE 115-a may transmit signaling to UE 115-d indicating one or more RBs for UE 115-d to select for transmitting a scheduling request message.

In some examples, transmitting UE 115-a may transmit an indication of the group index 265 to receiving UEs 115-b, 115-c, and 115-d. The receiving UEs 115 may determine a first subset of the PSFCH resources 240 that are allocated for a scheduling request transmission based on the group index 265. The first bit map 255-a may, in some examples, indicate that the first subset of the PSFCH resources 240 are allocated for scheduling request transmission specifically by a first group 260 of UEs 115-b, 115-c, and 115-d that are associated with the group index 265. The first bit map 255-a may additionally or alternatively indicate a second subset of the set of PSFCH resources 240 that are allocated for scheduling request transmission specifically by a second group of UEs 115 associated with a different group index (not pictured in FIG. 2).

Receiving UE 115-d may generate a waveform for transmitting a scheduling request based on the number of RBs that UE 115-d selects for transmitting the scheduling request. For example, if UE 115-d transmits a scheduling request via a single RB, the scheduling request may be transmitted according to a first waveform type. Additionally or alternatively, if UE 115-d transmits the scheduling request via multiple RBs, the scheduling request may be transmitted according to a different waveform type. In some cases, UE 115-d may generate the waveform based on a number of root sequences (e.g., root ZC sequences), a number of cyclic shifts, or both. In some examples, UE 115-d may select the number of RBs for transmitting a scheduling request to reduce interference associated with the scheduling request transmission. For example, UE 115-d may select the number of RBs based on a number of PLCs in the system, such as UE 115-a and any other PLCs, a number of S/As in the system, such as UEs 115-b, 115-c, 115-d, and any other S/As, or a combination thereof that may use the PSFCH resources 240. As a quantity of RBs allocated for scheduling request transmission and reception increases, a size of available (e.g., orthogonal or low-correlation) waveform sequences that UEs 115 may use increases. In some examples, UE 115-d may be assigned a waveform sequence from the available (e.g., orthogonal or low-correlation) waveform sequences for the scheduling request to reduce interference between the scheduling request transmissions. As such, receiving UEs 115-b, 115-c, and 115-d may transmit scheduling requests, HARQ messages, or both in one or more PSFCH RBs.

Thus, a sub-channel 220 may be configured with a set of PSFCH resources 240, and the UEs 115 using the sub-channel 220 may receive control signaling 250 including one or more bit maps 255 that may indicate a subset of resources within a scheduling request resource pool and another subset of resources within a HARQ resource pool. A UE 115 (e.g., an S/A in an IIOT system) may select one or more RBs of the scheduling request resource pool for transmitting a scheduling request to another UE 115 (e.g., a PLC in the IIOT system), select an RB of the HARQ resource pool for transmitting a HARQ message to another UE 115 (e.g., the PLC in the IIOT system), or both. The UEs 115 may use one or more methods for avoiding resource collisions to efficiently utilize the PSFCH resources 240.

Figure 3:
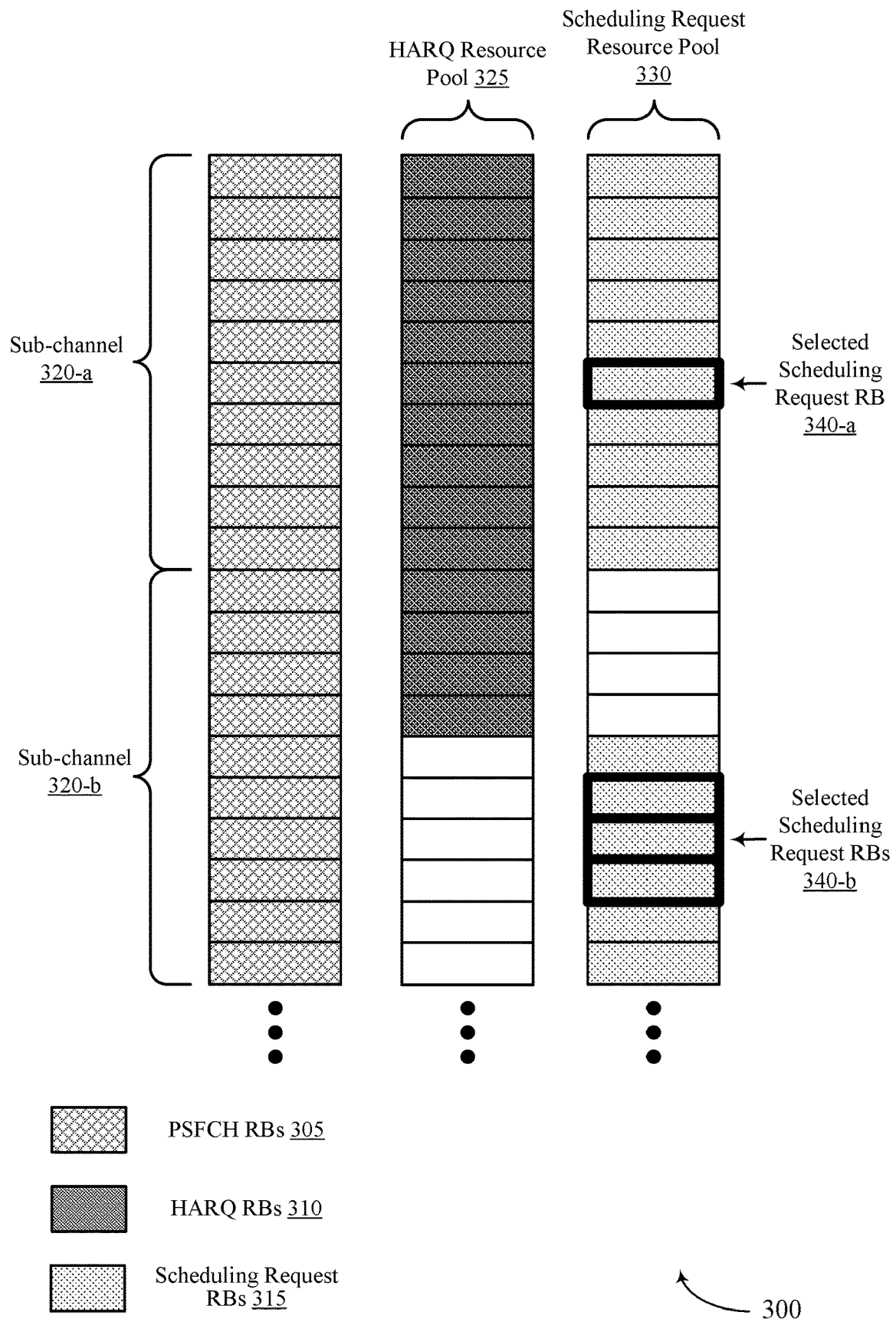
FIG. 3 illustrates an example of a resource mapping diagram that supports resource mapping for a scheduling request on a PSFCH in accordance with one or more aspects of the present disclosure.

FIG. 3 illustrates an example of a resource mapping diagram 300 that supports resource mapping for a scheduling request on a PSFCH in accordance with one or more aspects of the present disclosure. The resource mapping diagram 300 may include one or more sub-channels 320 (e.g., sub-channels 320-a and 320-b), which may be configured with some number of PSFCH RBs 305 (e.g., 10 RBs of a sub-channel may be configured as PSFCH RBs 305). The PSFCH RBs 305 may be examples of the configured PSFCH resources 240 as described with reference to FIG. 2. The resource mapping diagram 300 may illustrate an allocation of the configured set of PSFCH RBs 305 of sub-channel 320-a and sub-channel 320-b to a HARQ resource pool 325, a scheduling request resource pool 330, or both. In some examples, a UE 115 may use the allocated RBs for transmitting one or more HARQ messages (e.g., via one or more of the HARQ RBs 310) and one or more scheduling requests (e.g., via one or more of the scheduling request RBs 315) to improve the utilization of the PSFCH RBs 305.

Sub-channels 320-a and 320-b may be examples of a sub-channel 220 within a slot 215 as described with reference to FIG. 2. In some examples, the sub-channels 320 may include some number of RBs within a slot (e.g., 10-100 RBs may be reserved for each sub-channel 320). As described with reference to FIG. 2, in some cases, a sub-channel 320 may be configured with one or more PSFCH resources for a UE 115 to transmit HARQ messages. In the example of FIG. 3, sub-channels 320-a and 320-b may be configured with the set of PSFCH RBs 305 (e.g., in the example of FIG. 3, sub-channels 320-a and 320-b may each include 10 RBs configured for sidelink feedback). One or more UEs 115 may use the PSFCH RBs 305 for transmitting sidelink feedback, such as HARQ messages. However, in some cases, each UE 115 transmitting sidelink feedback may use a single PSFCH RB 305 for transmitting a HARQ message. As such, the PSFCH RBs 305 may be under-utilized (e.g., a small number of the configured PSFCH RBs 305 may be used by the UEs 115 in a wireless communications system).

To improve resource utilization, the network may configure the set of PSFCH RBs 305 for transmitting HARQ messages, for transmitting scheduling requests, or both. For example, the set of PSFCH RBs 305 may be re-allocated to the HARQ resource pool 325 and the scheduling request resource pool 330. In some examples, the RBs that are configured as scheduling request RBs 315 within the scheduling request resource pool 330 may be configured such that each UE 115 in the network may access the scheduling request resources without a grant from a network entity, such as a base station 105 or a PLC (e.g., the scheduling request RBs 315 may be similar to random access channel (RACH) resources).

A network entity, such as a base station 105 or a PLC, may transmit control signaling to the UEs 115 to indicate an allocation of the set of PSFCH RBs 305. For example, the control signaling may indicate a first subset of the set of PSFCH RBs 305 allocated for a scheduling request transmission, which may be the scheduling request RBs 315. In some examples, the network may configure one or more bit maps for allocating (e.g., mapping) the PSFCH RBs 305, and the control signaling may convey the one or more bit maps. For example, each PSFCH RB 305 may be represented by a bit in a list of bits, and each bit may indicate an allocation of an RB within a sub-channel 320. Each bit may indicate an allocation of a PSFCH RB 305 as a HARQ RB 310, a scheduling request RB 315, or both. In some examples, the bit maps may be configured by a base station 105 (e.g., the bit maps may be pre-configured by the base station 105, or the bit maps may be updated dynamically by the base station 105). The bit maps may be broadcast to one or more receiving UEs 115 via higher layer signaling (e.g., the base station 105 may configure the bit maps and convey the bit maps via RRC signaling). In some examples, the bit maps may be transmitted as control information via a control channel or shared data channel.

A first bit map (e.g., a bit map conveyed via a first field in the upper layer, such as sl-PSFCH-rb-set-r16), may be configured for indicating which RBs of the set of PSFCH RBs 305 may be used for HARQ transmissions (e.g., the first bit map may indicate the HARQ RBs 310 reserved for HARQ transmissions within the HARQ resource pool 325, such as HARQrbSetPSFCH), and a second bit map (e.g., a second bit map conveyed via a second field in the upper layer, such as sl-PSFCH-SR-rb-Set) may be configured for indicating which RBs of the set of PSFCH RBs 305 may be used for transmitting a scheduling request (e.g., the second bit map may indicate the scheduling request RBs 315 reserved for scheduling request transmission within the scheduling request resource pool 330, such as SRrb-SetPSFCH). The first and second bit maps may represent examples of the bit maps 255 described with reference to FIG. 2.

The respective bit maps may indicate a first subset of the PSFCH RBs 305 that may be reserved as the scheduling request RBs 315 in the scheduling request resource pool 330 and a second subset of the PSFCH RBs 305 that may be reserved as the HARQ RBs 310 in the HARQ resource pool 325. In some examples, each bit map may indicate a mapping for each RB within the HARQ resource pool 325 and the scheduling request resource pool 330. Additionally or alternatively, each bit map may indicate a mapping of each RB within a sub-channel 320, such as sub-channel 320-*a* (e.g., the bit map may indicate whether each RB of sub-channel 320-*a* is configured as a HARQ RB 310, a scheduling request RB 315, or both), and the mapping pattern within sub-channel 320-*a* may be repeated for each sub-channel 320 within the HARQ resource pool 325 and the scheduling request resource pool 330. In another example, each bit may indicate a mapping for a single RB within a number of sub-channels 320 (e.g., a periodicity indicating the RB allocation within every X sub-channel 320), and the pattern may repeat for every X sub-channels 320 in the HARQ resource pool 325 and the scheduling request resource pool 330. In some examples, the scheduling request RBs 315 in the scheduling request resource pool 330 may be split into sets of RBs. For example, each subset of the scheduling request RBs 315 may be used by a different group of UEs 115. The subsets of scheduling request RBs 315 may be indicated to UEs 115 via higher layer signaling.

The bit maps for allocating the PSFCH RBs 305 may be the same or different over time. For example, each bit map may be associated with a slot, and the bit maps may change over time (e.g., the bit maps may be different for different slots). In one example, the bit maps may indicate a first allocation of the PSFCH RBs 305 for even slots and a second allocation of the PSFCH RBs 305 for odd slots. Additionally or alternatively, the bit maps may remain constant over time (e.g., the bit maps may indicate the same resource allocation for each slot).

The bit maps may allocate the HARQ RBs 310 and the scheduling request RBs 315 in the same or different RBs within the sub-channels 320. For example, the HARQ RBs 310 may be mutually orthogonal with the scheduling request RBs 315, the HARQ RBs 310 may overlap with the scheduling request RBs 315, or the HARQ RBs 310 may partially overlap with the scheduling request RBs 315. In one example, some of the PSFCH RBs 305 of sub-channel 320-*b* may be configured as HARQ RBs 310, and the remaining PSFCH RBs 305 of sub-channel 320-*b* may be configured as scheduling request RBs 315 (e.g., the HARQ RBs 310 and the scheduling request RBs 315 may be mutually orthogonal, and may not overlap). In another example, each of the PSFCH RBs 305 of sub-channel 320-*a* may be configured as both HARQ RBs 310 and scheduling request RBs 315. In the example of sub-channel 320-*b*, a UE 115 may select one or more of the scheduling request RBs 315 for transmitting a scheduling request without interfering with the HARQ RBs 310. In the example of sub-channel 320-*a*, a UE 115 may select one or more of the scheduling request RBs 315 for transmitting a scheduling request that may be the same as the HARQ RB 310 selected by the UE 115 or another UE 115 for transmitting a HARQ message or a scheduling request. In some examples, the scheduling request and the HARQ message may be multiplexed within the same RB. If the UE 115 selects the same RB for more than one transmission, there may be a resource collision. For example, if two or more UEs 115 transmit messages via the same RB, a receiving device may be unable to differentiate the traffic.

To avoid resource collisions, in some examples, one or more UEs 115 may select one or more RBs for transmitting a scheduling request based on one or more scheduling request RB selection parameters and a first algorithm, and the UEs 115 may select an additional RB for transmitting a HARQ message based on one or more HARQ RB selection parameters and a second algorithm that may be different from the first algorithm. By using an algorithm for selecting RBs, the UEs 115 may refrain from selecting the same RB for transmitting a scheduling request that may have been selected by another UE 115, the same UE 115, or both for transmitting a HARQ message or another scheduling request. Additionally or alternatively, a UE 115 may receive a message, such as an RRC message, from another UE 115 (e.g., a controlling UE 115, such as a PLC). The message may indicate to the receiving UE 115 which RBs of the scheduling request RBs 315 to select for transmitting a scheduling request. In some examples, the message may indicate an offset value for the second algorithm, and the UE 115 may receive a HARQ message via an RB selected based on the offset value. For example, the offset value may indicate an offset (e.g., in RBs, or some other offset unit) from a boundary of the sub-channel 320-*a*.

In some examples, the HARQ RB selection parameters for a UE 115 to select a HARQ RB 310 for transmitting a HARQ message may include a transmitter ID, an ID of the UE 115 (e.g., during groupcast communications each UE 115 may be configured with an ID), the number of candidate RBs and associated cyclic shifts for the HARQ occasion (e.g., the number of candidate HARQ RBs 310 may depend on the sub-channel 320 and the number of HARQ messages to be transmitted), an offset value for a selection algorithm, or a combination thereof. More than one UE 115 may transmit a HARQ message via the same HARQ RB 310 if the UEs 115 use different cyclic shifts within the selected HARQ RB 310 (e.g., the cyclic shifts within the HARQ RB 310 may be mutually orthogonal, such that a UE 115 receiving the HARQ messages may be able to differentiate between the HARQ messages). In one example, if two UEs 115 determine to transmit two HARQ messages in one slot, the UEs 115 may use an algorithm based on the HARQ RB selection parameters for selecting the HARQ RBs 310 for transmitting the messages. For example, a UE 115 (e.g., an S/A) may transmit a HARQ message to another UE 115 (e.g., a PLC) in response to a data message. In one example, the ID of the PLC (e.g., the UE 115 receiving the HARQ message) may be represented by $P_{ID}$, the ID of the S/A (e.g., the UE 115 transmitting the HARQ message) may be represented by $M_{ID}$, and the number of candidate RBs multiplied by the number of cyclic shifts may be represented by R. The UE 115 may determine a HARQ RB 310 to select from the HARQ resource pool 325 based on the equation $(P_{ID}+M_{ID})$ mod R. In one example, a first UE 115 may determine that the HARQ RBs 310 with indices 0 to 4 may be available for transmitting a first HARQ message based on the algorithm, and a second UE 115 may select one or more of the HARQ RBs 310 with indices 5 to 9 for transmitting the second HARQ message. In some examples, a UE 115 may use a single HARQ RB 310, or some other number of the HARQ RBs 310, for transmitting a HARQ message.

As described herein, a UE 115 may select a single RB or a group of RBs from the scheduling request resource pool 330 for reporting a scheduling request based on one or more scheduling request RB selection parameters and the first algorithm. For example, a UE 115 (e.g., an S/A) may identify data pending in a buffer for transmission to another UE 115 (e.g., a PLC) and may trigger a scheduling request to obtain resources for transmitting the pending data on the sidelink. The scheduling request RBs 315 that are selected by the UE 115 may be referred to as selected scheduling request RBs 340. For example, a UE 115 may use selected scheduling request RB 340-a for transmitting a first scheduling request in sub-channel 320-a, and a UE 115 may use selected scheduling request RBs 340-b for transmitting a second scheduling request in sub-channel 320-b. If the subset of RBs allocated as scheduling request RBs 315 and the subset of RBs allocated as HARQ RBs 310 do not overlap, such as in sub-channel 320-b, the UE 115 may select any of the scheduling request RBs 315 from the scheduling request RB pool 330 within sub-channel 320-b for transmitting a scheduling request. For example, the UEs 115 may use a scheduling request RB selection algorithm that mitigates collisions between scheduling requests for different UEs 115 independent of the HARQ RB selection algorithm. Additionally or alternatively, if the scheduling request RBs 315 and the HARQ RBs 310 overlap (e.g., as in sub-channel 320-a), the UE 115 may select the scheduling request RBs 315 based on one or more scheduling request RB selection parameters to avoid a resource collision with HARQ messages and other scheduling requests. The scheduling request RB selection parameters may include the PLC identifier (ID) (e.g., a UE ID for the UE 115 receiving the scheduling request), the S/A ID (e.g., a UE ID for the UE 115 transmitting the scheduling request), a slot number, an index of the sub-channel 320, a number of other UEs 115 sharing the resources, a group index or group ID, or some other parameter for selecting one or more scheduling request RBs 315.

In some examples, the UE 115 may use a first algorithm for selecting the selected scheduling request RBs 340. The first algorithm may be based on the scheduling request RB selection parameters, and the first algorithm may be the same as or different from a second algorithm used for selecting a HARQ RB 310 (e.g., as described herein). For example, the UE 115 may select one or more of the scheduling request RBs 315 to be the selected scheduling request RBs 340 based on a modified PLC ID, a modified S/A ID (e.g., a modified ID of the UE 115 assigned for groupcast communications), a number of RBs that are available for the scheduling request (e.g., a number of candidate RBs of the scheduling request RBs 315 within the scheduling request resource pool 330), an associated number of cyclic shifts available for the one or more scheduling request RBs 315, or a combination thereof. If the scheduling request RBs 315 in the scheduling request resource pool 330 overlap with the HARQ RBs 310 in the HARQ resource pool 325, the PLC ID (e.g., an ID of the device receiving the scheduling request) used for determining the selected scheduling request RBs 340 may be modified from the PLC ID used for selecting the HARQ RBs 310. For example, the modified PLC ID, $P'_{ID}$, may be determined as $P'_{ID}=P_{ID}+\Delta P$, where $\Delta P$ may be zero if the HARQ RBs 310 and the scheduling request RBs 315 do not overlap. In some examples, the PLC ID modifier (e.g., the $\Delta P$ value for calculating the modified PLC ID) may be indicated to a UE 115 via SCI to ensure that the selected scheduling request RBs 340 are orthogonal to the HARQ RBs 310 used for transmitting feedback messages (e.g., if a controlling UE 115 communicates with three UEs 115 with IDs 0, 1, and 2, the controlling UE 115 may set $\Delta P$ to 3 to avoid resource collisions). Additionally or alternatively, if a group of UEs 115 transmits scheduling requests via the scheduling request RBs 315, the controlling UE 115 may modify the ID (e.g., $M'_{ID}$) of each UE 115 such that the controlling UE 115 may identify each UE 115, or a group of the UEs 115, when receiving the respective scheduling requests via the selected scheduling request RBs 340 (e.g., via a preamble transmitted with the scheduling request).

In some examples, the selection of RBs for transmitting a scheduling request may be configured by the network. A UE 115 may receive an RRC message that may indicate which RBs of the scheduling request RBs 315 the UE 115 may use for transmitting a scheduling request. In some examples, a device (e.g., a base station 105, a PLC, a UE 115, or some other device) may configure a scheduling request periodicity of the scheduling request RBs 315 (e.g., the device may configure an index for the scheduling request RBs 315 via RRC signaling). If the number of receiving UEs 115 is larger than the number of available scheduling request RBs 315 multiplied by the number of available cyclic shifts within the scheduling request RBs 315, the controlling UE 115 may TDM the scheduling request RBs 315 (e.g., for individual UEs 115 or for groups of UEs 115). In one example, one group of UEs 115 may access the scheduling request RBs 315 during even slots, and another group of UEs 115 may access the scheduling request RBs 315 during odd slots. Additionally or alternatively, the scheduling request resources configured by each of a set of controlling UEs 115 may be split in the time domain. For example, a first controlling UE 115 (e.g., a first PLC) may configure the selection of the scheduling request RBs 315 in a first slot for a first set of UEs 115 (e.g., S/As) communicating with the first controlling UE 115, and a second controlling UE 115 (e.g., a second PLC) may configure the selection of the scheduling request RBs 315 in a second slot for a second set of UEs 115 (e.g., S/As) communicating with the second controlling UE 115. In some such cases, the controlling UEs 115 may coordinate UE IDs (e.g., the controlling UEs 115 may share ΔP values) to distinguish the scheduling request destinations for the UEs 115, or a base station 105 may configure the controlling UE IDs such that the UEs 115 may transmit scheduling requests to the correct controlling UEs 115.

In some examples, a UE 115 may transmit a HARQ message and a scheduling request via the same RB to reduce the number of resources used. The HARQ message and the scheduling request may be multiplexed within the single resource (e.g., selected scheduling request RB 340-*a* may be the same as the HARQ RB 310 selected for transmitting a HARQ message). In one example, a UE 115 may transmit a HARQ message and a scheduling request in the same slot. The UE 115 may use an algorithm, such as one of the algorithms described above, to determine selected scheduling request RB 340-*a* and a HARQ RB 310 (e.g., an additional RB). Based on the algorithms, the HARQ RB 310 may be different from selected scheduling request RB 340-*a* to avoid a resource collision (e.g., the UE 115 may transmit the HARQ message via an RB with index 0 within sub-channel 320-*a*, and the scheduling request via an RB with index 5 within sub-channel 320-*a*). However, in some cases, the UE 115 may determine to transmit both the HARQ message and the scheduling request via the same RB (e.g., the transmissions may be multiplexed within selected scheduling request RB 340-*a*) to reduce the number of resources used. In some examples, the UE 115 may transmit on one RB to indicate HARQ information, while the UE 115 may transmit on a different RB to indicating joint HARQ information with a scheduling request (e.g., a hybrid HARQ and scheduling request message).

As described herein, a UE 115 may generate a waveform for transmitting a scheduling request based on the number of RBs used for transmitting the scheduling request. For example, as described above, a UE 115 may determine to transmit a scheduling request via selected scheduling request RB 340-*a*, via selected scheduling request RBs 340-*b*, or both. The scheduling request may be transmitted using a first waveform via the single selected scheduling request RB 340-*a* and using a second waveform via the selected scheduling request RBs 340-*b*. In some examples, the UE 115 may determine a number of selected scheduling request RBs 340 to transmit the scheduling request based on an amount of data pending in a buffer to be transmitted. For example, the scheduling request may be one or more bits. A one-bit scheduling request may indicate that data is pending in a buffer for transmission, while a multi-bit scheduling request may indicate an amount of data pending in the buffer. In some examples, the waveform may be generated based on the amount of data pending in the buffer indicated by the scheduling request. In one example, a multi-bit scheduling request may indicate to a controlling UE 115 (e.g., a PLC) that a UE 115 has data to transmit, how much data the UE 115 has pending for transmission (e.g., based on one or more thresholds), a type of data to be transmitted, or a combination thereof (e.g., using a coarse buffer status).

If a scheduling request occupies a single RB, the scheduling request may be transmitted according to a first waveform format (e.g., a PUCCH format 0 waveform). For example, each RB may be configured with a number of root sequences (e.g., 30 root sequences, or some other number of root sequences), and each root sequence may further support a number of cyclic shifts (e.g., up to 12 cyclic shifts per root sequence) that may be mutually orthogonal. If a scheduling request is transmitted via a single RB, a UE 115 may generate a waveform based on the configured number of root sequences and cyclic shifts associated with the RB. Each controlling UE 115 (e.g., each PLC) may be assigned a group number (e.g., a group ZC number associated with a root sequence). In some examples, the group number may change over time (e.g., based on a pseudo-random number generator as a function of some ID or seed). If a scheduling request is transmitted via a single RB, the scheduling request waveform may be generated according to a group number of the corresponding controlling UE 115 (e.g., a root sequence assigned to the controlling UE 115) to reduce interference among controlling UEs 115.

Additionally or alternatively, the number of root sequences for a scheduling request waveform may increase if the scheduling request occupies multiple RBs (e.g., selected scheduling request RBs 340-*b*). The number of sequences associated with a waveform for transmitting a scheduling request may be determined based on a number of RBs available for transmitting the scheduling request (e.g., if there are X selected scheduling request RBs 340, there may be 12X-1 root sequences). The UE 115 may select a cyclic shift for transmitting the scheduling request waveform from a set of valid cyclic shifts. The number of valid cyclic shifts supported by each root sequence may be determined based on the number of selected scheduling request RBs 340 (e.g., each root sequence may support 12X cyclic shifts, which may represent the R' value in the equation for a UE 115 to select RBs for transmitting a scheduling request), one or more channel conditions, or both. For example, there may be an increased number of orthogonally mutual cyclic shifts if the number of selected scheduling request RBs 340 increases, and each of the cyclic shifts may be configured for a UE 115 to transmit a scheduling request. To mitigate the negative effects of delay spread that may occur as a result of the increased number of cyclic shifts, a number of cyclic shifts may be blocked and a subset of the cyclic shifts may be identified as "valid" cyclic shifts. The UE 115 may determine the number of valid cyclic shifts according to $12X/C_V$, where $C_V$ represents the minimum cyclic shift between sequences. Thus, a channel with a large delay spread may be associated with a smaller set of valid cyclic shifts than a channel with a smaller delay spread. As such, by selecting a cyclic shift from the set of valid cyclic shifts for transmitting the scheduling request waveform, interference among scheduling requests may be reduced.

The number of selected scheduling request RBs 340 may be determined by a UE 115 based on the number of other UEs 115 in the system (e.g., the number of S/As per PLC, the number of S/As for a specific PLC, the number of coexisting PLCs, or a combination thereof) to improve transmission power and reduce interference. For example, if there is a large number of PLCs (e.g., greater than a threshold number of PLCs), a UE 115 may select a large number of selected scheduling request RBs 340 (e.g., greater than a threshold number of RBs). Such a selection may increase the number of root sequences and cyclic shifts available for transmitting scheduling requests. In some examples, each UE 115 may be assigned a cyclic shift for transmitting a scheduling request, and each cyclic shift may be mutually orthogonal. However, increasing the number of selected scheduling request RBs 340 may result in more interfering sources and reduced interference power. A small number of selected scheduling request RBs 340 (e.g., below a threshold) may allow for UEs 115 to use different RBs for transmitting scheduling requests, which may reduce interference and increase the transmit power (e.g., because fewer root sequences may be reused).

As described herein, one or more sub-channels 320 may be configured with a set of PSFCH RBs 305, which may be mapped to a HARQ resource pool 325 that may include one or more HARQ RBs 310 allocated for HARQ transmission and a scheduling request resource pool 330 that may include one or more scheduling request RBs 315 allocated for scheduling request transmission. A UE 115 may receive an indication of the re-allocation of the PSFCH RBs 305, and the UE 115 may select one or more resources for transmitting a scheduling request and one or more resources for transmitting a HARQ message based on a first algorithm and a second algorithm, respectively, for selecting the RBs while avoiding resource collisions. As such, the PSFCH RBs 305 may be used more efficiently for sidelink communications.

Figure 4:
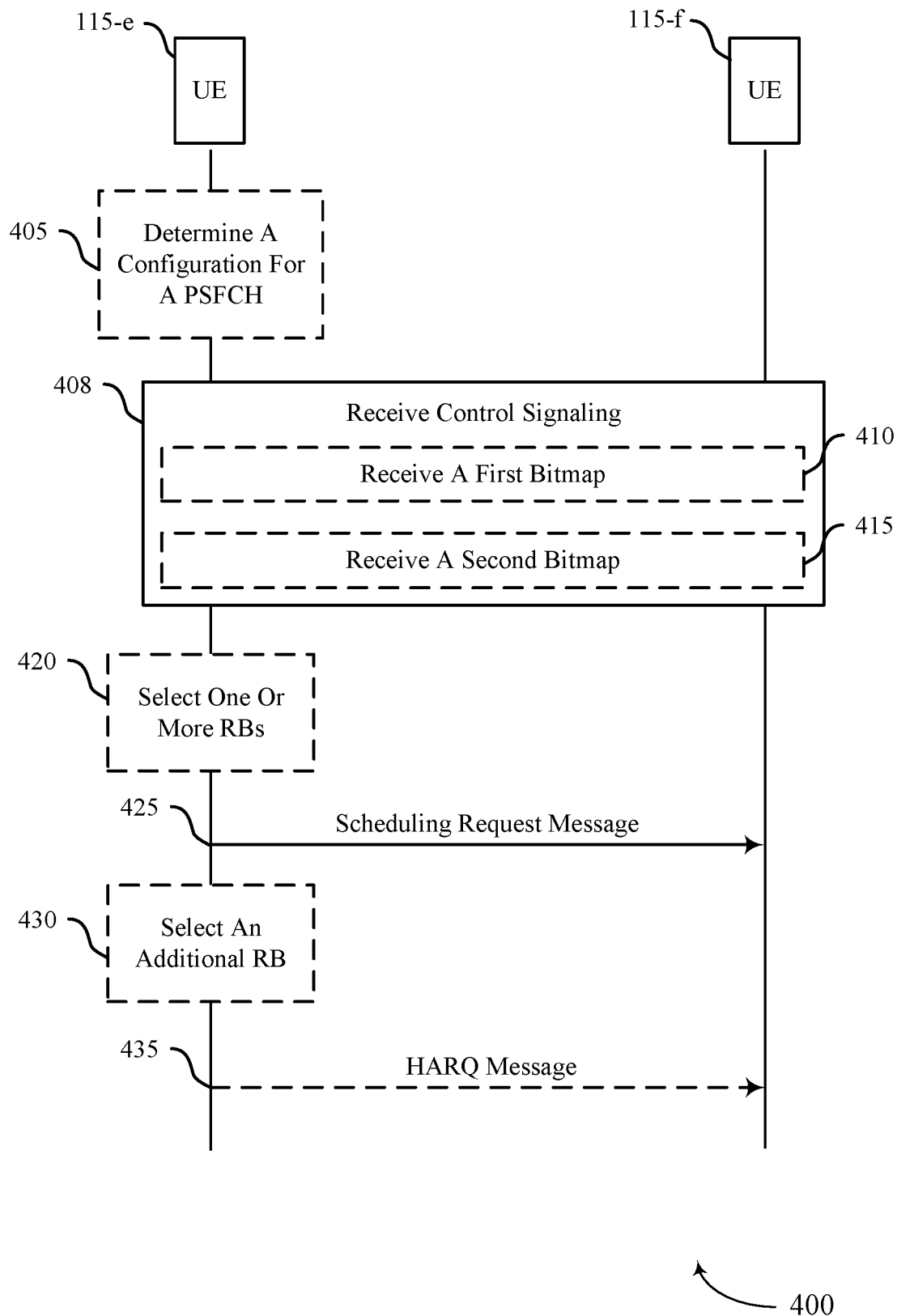
FIGS. 4 and 5 illustrate examples of process flows that support resource mapping for a scheduling request on a PSFCH in accordance with one or more aspects of the present disclosure.

FIG. 4 illustrates an example of a process flow 400 that supports resource mapping for a scheduling request on a PSFCH in accordance with one or more aspects of the present disclosure. In some examples, the process flow 400 may implement various aspects of the present disclosure described with reference to FIGS. 1 through 3. The process flow 400 may include UE 115-*e* and UE 115-*f*, which may be examples of UEs 115 as described with reference to FIGS. 1 through 3. In some examples, UE 115-*e* may transmit a scheduling request message to UE 115-*f* using one or more PSFCH RBs, which may improve the utilization of the PSFCH RBs. It is understood that the devices and nodes described by the process flow 400 may communicate with or be coupled with other devices or nodes that are not illustrated. For instance, UE 115-*e* and UE 115-*f* may communicate with one or more other UEs 115, base stations 105, PLCs, S/As, or other devices. Alternative examples of the following may be implemented, where some steps are performed in a different order than described or are not performed at all. In some cases, a step may include additional features not mentioned below, or further steps may be added.

At 405, UE 115-*e* may determine a configuration for a PSFCH. The configuration may indicate a set of PSFCH RBs. For example, the configuration may indicate a set of RBs of a sub-channel that may be reserved for transmitting sidelink feedback, such as HARQ messages. The configuration may be received from the network via RRC signaling.

At 408, UE 115-*e* and UE 115-*f* may receive control signaling. The control signaling may indicate a first subset of a set of PSFCH RBs allocated for scheduling request transmission on a PSFCH. In some examples, the control signaling may include a first bit map, a second bit map, or both. For example, at 410, UE 115-*e* and UE 115-*f* may receive a first bit map. The first bit map may indicate the first subset of the set of PSFCH RBs that may be allocated for scheduling request transmission on the PSFCH. The first bit map may be transmitted by a base station 105 or some other network entity. For example, the first bit map may be transmitted via a broadcast message to UEs 115-*e*, 115-*f*, and one or more other UEs 115. In some other examples, UEs 115-*e* and 115-*f* may be pre-configured with the first bit map.

At 415, UE 115-*e* and UE 115-*f* may receive a second bit map. The second bit map may indicate a second subset of the set of PSFCH RBs that may be allocated for HARQ transmission on the PSFCH. The second bit map may be transmitted by a base station 105 or some other network entity. For example, the second bit map may be transmitted via a broadcast message to UEs 115-*e*, 115-*f*, and one or more other UEs 115. In some other examples, UEs 115-*e* and 115-*f* may be pre-configured with the second bit map.

At 420, in some cases, UE 115-*e* may select one or more RBs from the first subset of the set of PSFCH RBs indicated at 410. UE 115-*e* may select the one or more RBs for transmitting a scheduling request message. In some examples, UE 115-*e* may select the RBs based on an ID for UE 115-*e*, an ID for UE 115-*f*, a slot number for transmitting the scheduling request, a sub-channel index for the PSFCH, a number of S/As, a group index associated with UE 115-*e* (e.g., UE 115-*f* may group UEs 115 into multiple groups using upper layer signaling over the sidelink), or some combination thereof. In some examples, UE 115-*e* may select the one or more RBs based on a first procedure (e.g., a first algorithm). Additionally or alternatively, UE 115-*e* may receive an RRC message that may configure UE 115-*e* with the one or more RBs, and UE 115-*e* may select the one or more RBs based on the RRC message.

At 425, UE 115-*e* may transmit a scheduling request message on the PSFCH to UE 115-*f*. The scheduling request message may be transmitted in the first subset of the set of PSFCH RBs. In some examples, the scheduling request message may be transmitted using the one or more RBs selected from the first subset at 420. UE 115-*f* may grant UE 115-*e* resources for a sidelink transmission based on the scheduling request message.

At 430, in some cases, UE 115-*e* may select an additional RB from the second subset of the set of PSFCH RBs. UE 115-*e* may select the additional RB for transmitting a HARQ message. In some examples, UE 115-*e* may select the additional RB based on a second procedure (e.g., a second algorithm) for selecting HARQ RBs.

At 435, in some cases, UE 115-*e* may transmit a HARQ message to UE 115-*f*. UE 115-*e* may transmit the HARQ message using the additional RB selected at 430. Based on the HARQ message, UE 115-*f* may determine whether to retransmit a sidelink message to UE 115-*e*.

Figure 5:
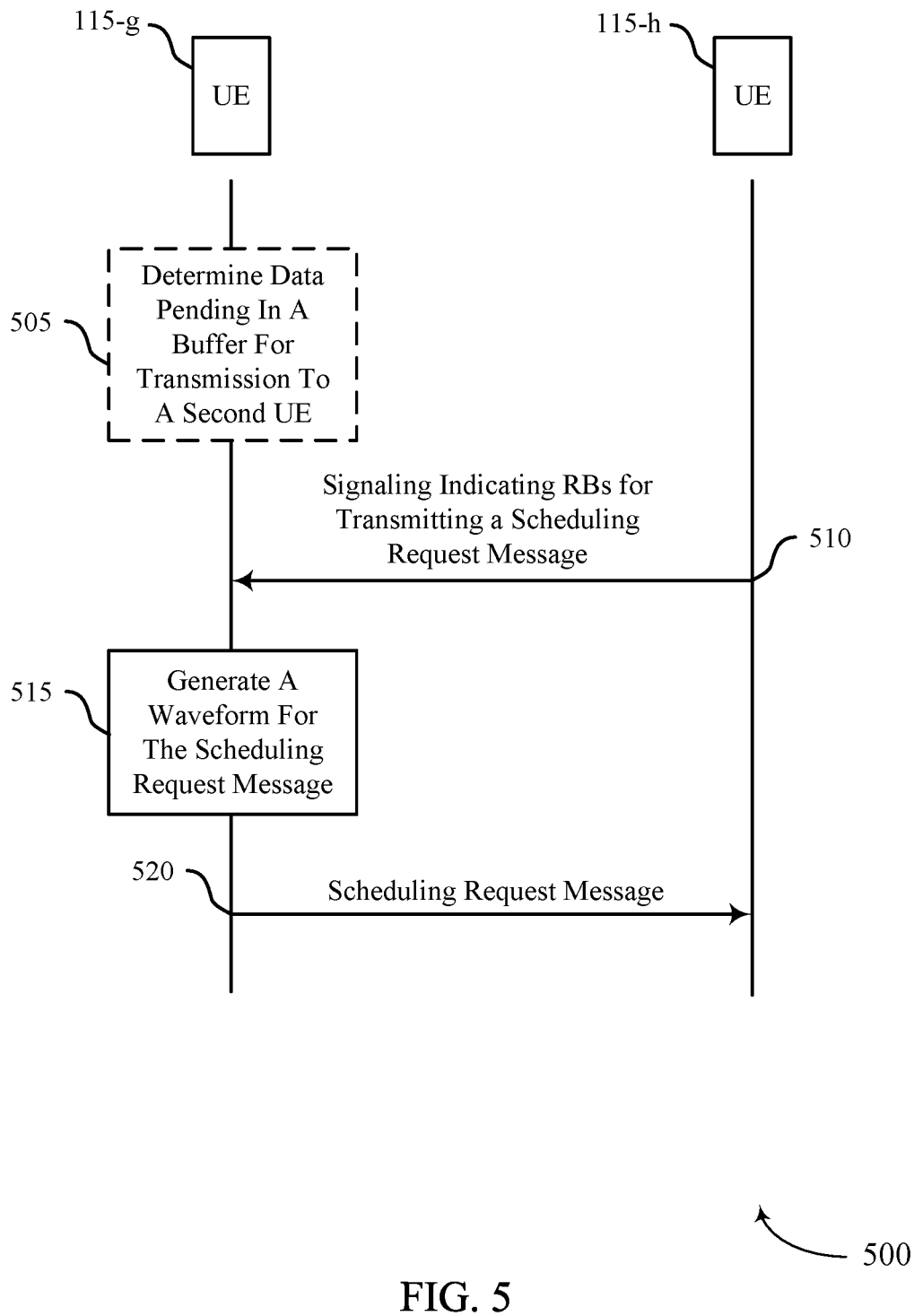

FIG. 5 illustrates an example of a process flow 500 that supports resource mapping for a scheduling request on a PSFCH in accordance with one or more aspects of the present disclosure. In some examples, the process flow 500 may implement various aspects of the present disclosure described with reference to FIGS. 1 through 4. The process flow 500 may include UE 115-*g* and UE 115-*h*, which may be examples of UEs 115 as described with reference to FIGS. 1 through 4. In some examples, UE 115-*g* may generate a waveform for transmitting a scheduling request message to UE 115-*h* using one or more PSFCH RBs, which may improve the utilization of the PSFCH RBs. It is understood that the devices and nodes described by the process flow 500 may communicate with or be coupled with other devices or nodes that are not illustrated. For instance, UE 115-*g* and UE 115-*h* may communicate with one or more other UEs 115, base stations 105, PLCs, S/As, or other devices. Alternative examples of the following may be implemented, where some steps are performed in a different order than described or are not performed at all. In some cases, a step may include additional features not mentioned below, or further steps may be added.

At 505, UE 115-*g* may determine data pending in a buffer for transmission to UE 115-*h*. For example, UE 115-*g* may determine that UE 115-*g* has data to transmit based on the amount of data pending in the buffer, and UE 115-*g* may determine whether to transmit a scheduling request to request resources for transmitting the data. UE 115-*g* may generate a number of bits for a scheduling request message, and the number of bits may indicate an amount of the data pending in the buffer for transmission to UE 115-*h*. Additionally or alternatively, UE 115-*g* may select a cyclic shift, a preamble, or both, for the scheduling request message to indicate the amount of data pending in the buffer.

UE 115-*g* may select one or more RBs for transmitting a scheduling request message to UE 115-*h* on a PSFCH. UE 115-*g* may select the one or more RBs based on the data pending in the buffer as determined at 505. For example, at 510, UE 115-*g* may receive, from UE 115-*h*, signaling indicating one or more RBs for transmitting a scheduling request message to UE 115-*h* on a PSFCH. In some cases, UE 115-*g* may select the one or more RBs based on a number of other devices (e.g., S/As) associated with UE 115-*h* (e.g., which may be an example of a PLC), a number of additional controlling UEs 115 or PLCs, or a combination thereof.

At 515, UE 115-*g* may generate a waveform for the scheduling request message. UE 115-*g* may generate the waveform based on a quantity of RBs in the set of RBs indicated (or otherwise selected) at 510. In some examples, UE 115-*g* may generate the waveform based on a root ZC sequence assigned to UE 115-*h*, a root ZC sequence for the one or more selected RBs, or both.

At 520, UE 115-*g* may transmit the scheduling request message on the PSFCH to UE 115-*h*. UE 115-*g* may transmit the scheduling request message in the one or more RBs indicated (or otherwise selected) at 510 and using the waveform generated at 515.

Figure 6:
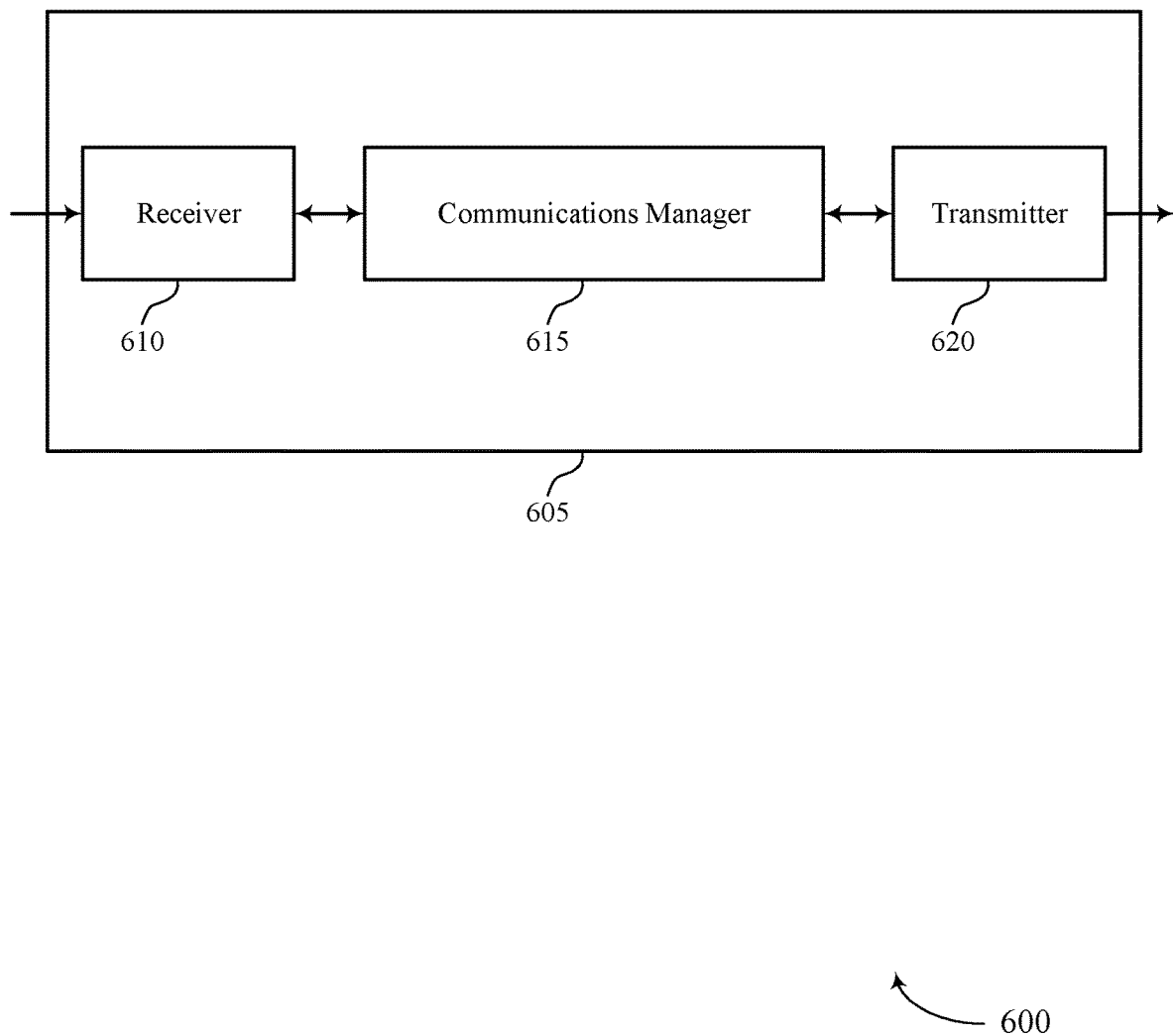
FIGS. 6 and 7 show block diagrams of devices that support resource mapping for a scheduling request on a PSFCH in accordance with one or more aspects of the present disclosure.

FIG. 6 shows a block diagram 600 of a device 605 that supports resource mapping for a scheduling request on a PSFCH in accordance with one or more aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to resource mapping for a scheduling request on a PSFCH, etc.). Information may be passed on to other components of the device 605. The receiver 610 may be an example of aspects of the transceiver 920 described with reference to FIG. 9. The receiver 610 may utilize a single antenna or a set of antennas.

In some examples, the communications manager 615 may receive control signaling indicating a first subset of a set of PSFCH RBs allocated for scheduling request transmission on a PSFCH and transmit, on the PSFCH and to a second UE, a scheduling request message in the first subset of the set of PSFCH RBs.

In some examples, the communications manager 615 may receive control signaling indicating a first subset of a set of PSFCH RBs allocated for scheduling request reception on a PSFCH and receive, on the PSFCH and from a first UE, a scheduling request message in the first subset of the set of PSFCH RBs.

In some examples, the communications manager 615 may receive, from a second UE, signaling indicating one or more RBs for transmitting a scheduling request message to the second UE on a PSFCH, generate a waveform for the scheduling request message based on a quantity of RBs in the indicated one or more RBs, and transmit, on the PSFCH and to the second UE, the scheduling request message in the indicated one or more RBs using the generated waveform.

In some examples, the communications manager 615 may transmit, to a first UE, signaling indicating one or more RBs for receiving a scheduling request message from the first UE on a PSFCH and receive, on the PSFCH and from the first UE, a waveform corresponding to the scheduling request message in the indicated one or more RBs, the waveform generated based on a quantity of RBs in the indicated one or more RBs.

In some examples, the communications manager 615 may determine a configuration for a PSFCH, the configuration indicating a set of PSFCH RBs, receive a first bit map indicating a first subset of the set of PSFCH RBs allocated for scheduling request transmission on the PSFCH and a second bit map indicating a second subset of the set of PSFCH RBs allocated for HARQ transmission on the PSFCH, and transmit, on the PSFCH and to a second UE, a scheduling request message in the first subset of the set of PSFCH RBs.

In some examples, the communications manager 615 may determine a configuration for a PSFCH, the configuration indicating a set of PSFCH RBs, receive a first bit map indicating a first subset of the set of PSFCH RBs allocated for scheduling request reception on the PSFCH and a second bit map indicating a second subset of the set of PSFCH RBs allocated for HARQ reception on the PSFCH, and receive, on the PSFCH and from a second UE, a scheduling request message in the first subset of the set of PSFCH RBs.

Additionally or alternatively, the communications manager 615 may determine data pending in a buffer for transmission to a second UE, select one or more RBs for transmitting a scheduling request message to the second UE on a PSFCH based on the data pending in the buffer, generate a waveform for the scheduling request message based on a number of RBs in the selected one or more RBs, and transmit, on the PSFCH and to the second UE, the scheduling request message in the selected one or more RBs using the generated waveform. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

The communications manager 615 may be an example of means for performing various aspects of resource mapping for scheduling requests on a PSFCH as described herein. The communications manager 615, or its sub-components, may be implemented in hardware (e.g., in communications management circuitry). The circuitry may comprise of a processor, a DSP, an ASIC, an FPGA or other programmable logic device, discrete gate or transistor logic, discrete hardware components, or any combination thereof designed to perform the functions described in the present disclosure.

In another implementation, the communications manager 615, or its sub-components, may be implemented in code (e.g., as communications management software or firmware) executed by a processor, or any combination thereof. If implemented in code executed by a processor, the functions of the communications manager 615, or its sub-components may be executed by a general-purpose processor, a DSP, an ASIC, an FPGA, or another programmable logic device.

In some examples, the communications manager 615 may be configured to perform various operations (e.g., receiving, transmitting, determining, selecting, generating, or any other operations) using or otherwise in cooperation with the receiver 610, the transmitter 620, or both.

One implementation of the communications manager 615 as described herein may provide for a more efficient utilization of sidelink resources. For example, a sub-channel may be configured with a set of PSFCH resources, and the device 605 (e.g., a UE 115, S/A, PLC, base station 105, or some other device) may transmit both scheduling request and HARQ messages via the resources configured as PSFCH resources. The device 605 may select RBs for transmitting HARQ messages and scheduling requests based on one or more RB selection parameters, an algorithm, an RRC configuration message, or a combination thereof to reduce resource collisions within the sub-channel. As such, the device 605 and one or more other devices 605 within the network may use more of the PSFCH resources if the resources are configured for both HARQ transmission and scheduling request transmission than if the PSFCH resources are configured for sidelink feedback alone.

Another implementation may allow for the device 605 to select one or more resources for transmitting a scheduling request to reduce interference experienced at a device receiving the scheduling request. For example, the device 605 may select the one or more resources for transmitting a scheduling request based on an algorithm or procedure, and the device 605 may thereby select resources that will not interfere with resources for transmitting feedback messages or resources selected by other devices 605. Additionally or alternatively, a waveform used for transmitting a scheduling request may depend on the number of RBs selected for transmitting the scheduling request, and the device 605 may select the RBs for transmitting the scheduling request to improve the performance of the scheduling request waveform and to reduce interference. For example, the number of root sequence and cyclic shift options for a scheduling request waveform may depend on the number of RBs selected for transmitting the scheduling request, and the device 605 may select the number of RBs based on the number of other devices sharing the sidelink resources to provide for sufficient scheduling request opportunities and to reduce interference in the network.

Figure 7:
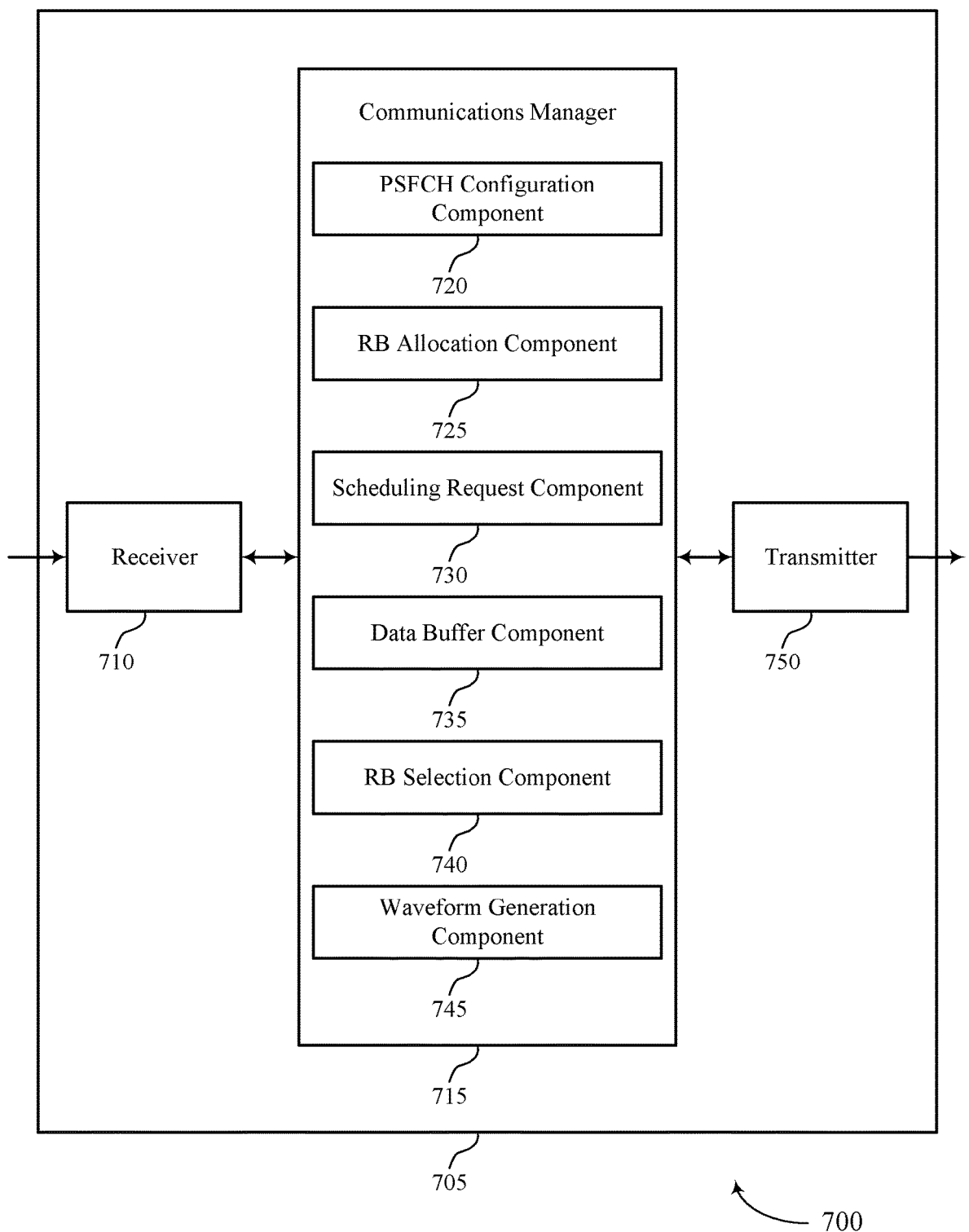

FIG. 7 shows a block diagram 700 of a device 705 that supports resource mapping for a scheduling request on a PSFCH in accordance with one or more aspects of the present disclosure. The device 705 may be an example of aspects of a device 605 or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to resource mapping for a scheduling request on a PSFCH, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a PSFCH configuration component 720, an RB allocation component 725, a scheduling request component 730, a data buffer component 735, an RB selection component 740, a waveform generation component 745, or any combination of these or other components. The communications manager 715 may be an example of aspects of the communications manager 910 described herein.

The RB allocation component 725 may receive control signaling indicating a first subset of a set of PSFCH RBs allocated for scheduling request transmission on a PSFCH. The scheduling request component 730 may transmit, on the PSFCH and to a second UE, a scheduling request message in the first subset of the set of PSFCH RBs.

The RB allocation component 725 may receive control signaling indicating a first subset of a set of PSFCH RBs allocated for scheduling request reception on a PSFCH. The scheduling request component 730 may receive, on the PSFCH and from a first UE, a scheduling request message in the first subset of the set of PSFCH RBs.

The RB allocation component 725 may receive, from a second UE, signaling indicating one or more RBs for transmitting a scheduling request message to the second UE on a PSFCH. The waveform generation component 745 may generate a waveform for the scheduling request message based on a quantity of RBs in the indicated one or more RBs. The scheduling request component 730 may transmit, on the PSFCH and to the second UE, the scheduling request message in the indicated one or more RBs using the generated waveform.

The RB allocation component 725 may transmit, to a first UE, signaling indicating one or more RBs for receiving a scheduling request message from the first UE on a PSFCH. The scheduling request component 730 may receive, on the PSFCH and from the first UE, a waveform corresponding to the scheduling request message in the indicated one or more RBs, the waveform generated based on a quantity of RBs in the indicated one or more RBs.

The PSFCH configuration component 720 may determine a configuration for a PSFCH, the configuration indicating a set of PSFCH RBs. The RB allocation component 725 may receive a first bit map indicating a first subset of the set of PSFCH RBs allocated for scheduling request transmission on the PSFCH and a second bit map indicating a second subset of the set of PSFCH RBs allocated for HARQ transmission on the PSFCH. The scheduling request component 730 may transmit, on the PSFCH and to a second UE, a scheduling request message in the first subset of the set of PSFCH RBs.

The PSFCH configuration component 720 may determine a configuration for a PSFCH, the configuration indicating a set of PSFCH RBs. The RB allocation component 725 may receive a first bit map indicating a first subset of the set of PSFCH RBs allocated for scheduling request reception on the PSFCH and a second bit map indicating a second subset of the set of PSFCH RBs allocated for HARQ reception on the PSFCH. The scheduling request component 730 may receive, on the PSFCH and from a second UE, a scheduling request message in the first subset of the set of PSFCH RBs.

The data buffer component 735 may determine data pending in a buffer for transmission to a second UE. The RB selection component 740 may select one or more RBs for transmitting a scheduling request message to the second UE on a PSFCH based on the data pending in the buffer. The waveform generation component 745 may generate a waveform for the scheduling request message based on a number of RBs in the selected one or more RBs. The scheduling request component 730 may transmit, on the PSFCH and to the second UE, the scheduling request message in the selected one or more RBs using the generated waveform.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
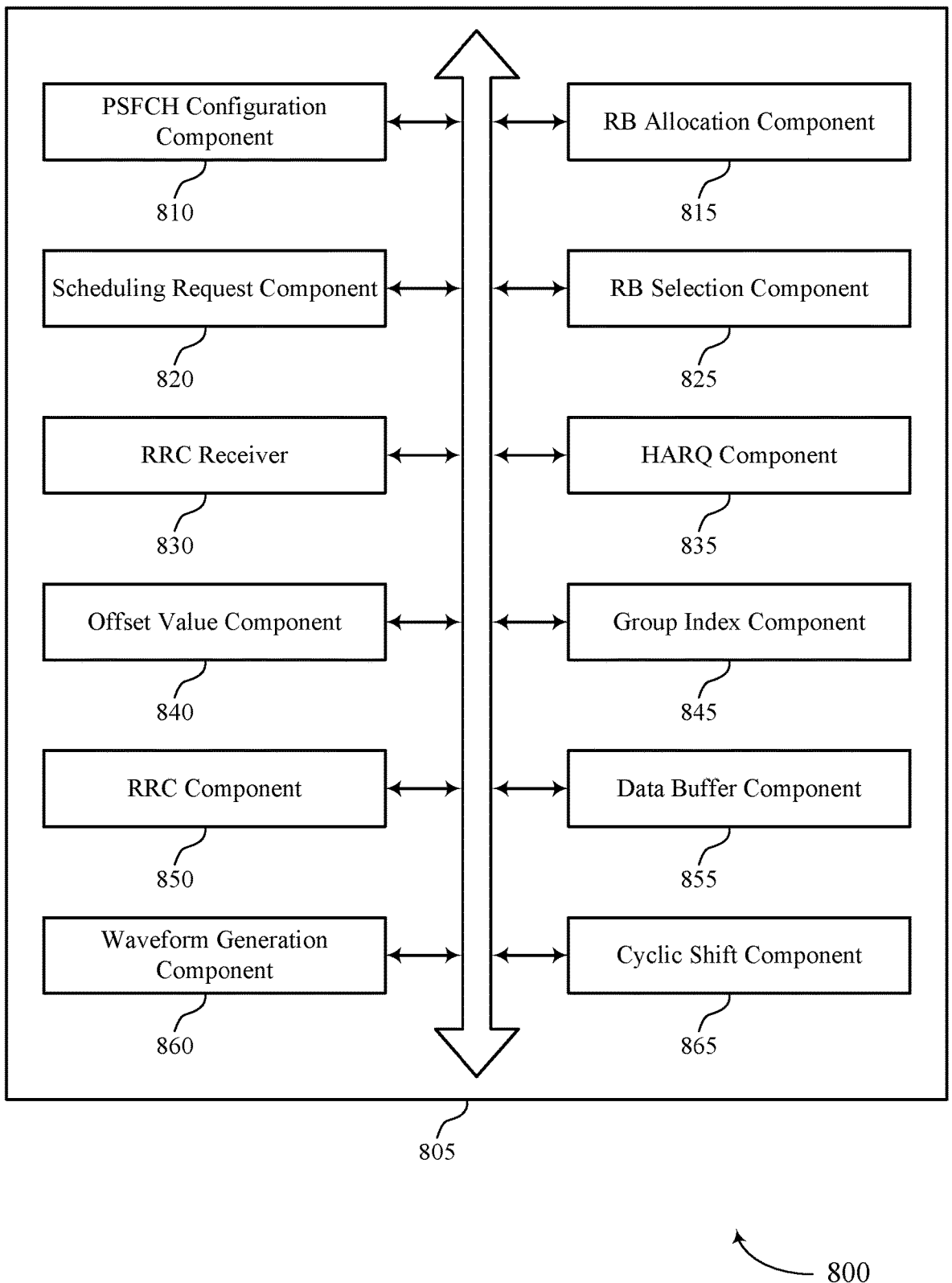
FIG. 8 shows a block diagram of a communications manager that supports resource mapping for a scheduling request on a PSFCH in accordance with one or more aspects of the present disclosure.

FIG. 8 shows a block diagram 800 of a communications manager 805 that supports resource mapping for a scheduling request on a PSFCH in accordance with one or more aspects of the present disclosure. The communications manager 805 may be an example of aspects of a communications manager 615, a communications manager 715, or a communications manager 910 described herein. The communications manager 805 may include a PSFCH configuration component 810, an RB allocation component 815, a scheduling request component 820, an RB selection component 825, an RRC receiver 830, a HARQ component 835, an offset value component 840, a group index component 845, an RRC component 850, a data buffer component 855, a waveform generation component 860, a cyclic shift component 865, or any combination of these or other components. Each of these components may communicate, directly or indirectly, with one another (e.g., via one or more buses). The communications manager 805 may be implemented at a first UE.

The RB allocation component 815 may receive control signaling indicating a first subset of a set of PSFCH RBs allocated for scheduling request transmission on a PSFCH. The scheduling request component 820 may transmit, on the PSFCH and to a second UE, a scheduling request message in the first subset of the set of PSFCH RBs.

The RB allocation component 815 may receive control signaling indicating a first subset of a set of PSFCH RBs allocated for scheduling request reception on a PSFCH. The scheduling request component 820 may receive, on the PSFCH and from a first UE, a scheduling request message in the first subset of the set of PSFCH RBs.

The RB allocation component 815 may receive, from a second UE, signaling indicating one or more RBs for transmitting a scheduling request message to the second UE on a PSFCH. The waveform generation component 860 may generate a waveform for the scheduling request message based on a quantity of RBs in the indicated one or more RBs. The scheduling request component 820 may transmit, on the PSFCH and to the second UE, the scheduling request message in the indicated one or more RBs using the generated waveform.

The RB allocation component 815 may transmit, to a first UE, signaling indicating one or more RBs for receiving a scheduling request message from the first UE on a PSFCH. The scheduling request component 820 may receive, on the PSFCH and from the first UE, a waveform corresponding to the scheduling request message in the indicated one or more RBs, the waveform generated based at least in part on a quantity of RBs in the indicated one or more RBs.

The PSFCH configuration component 810 may determine a configuration for a PSFCH, the configuration indicating a set of PSFCH RBs. The RB allocation component 815 may receive a first bit map indicating a first subset of the set of PSFCH RBs allocated for scheduling request transmission on the PSFCH and a second bit map indicating a second subset of the set of PSFCH RBs allocated for HARQ transmission on the PSFCH. The scheduling request component 820 may transmit, on the PSFCH and to a second UE, a scheduling request message in the first subset of the set of PSFCH RBs.

In some examples, the RB selection component 825 may select one or more RBs from the first subset of the set of PSFCH RBs, and the transmitting may involve transmitting the scheduling request message in the selected one or more RBs.

In some examples, the RB selection component 825 may select the one or more RBs based on an ID for the first UE, an ID for the second UE, a slot number, a sub-channel index for the PSFCH, a number of S/As, a group index associated with the first UE, or a combination thereof.

The RRC receiver 830 may receive, from the second UE, an RRC message configuring the first UE with the one or more RBs, and the selecting may involve selecting the one or more RBs based on the RRC message.

In some examples, the RB selection component 825 may select an additional RB from the second subset of the set of PSFCH RBs. In some such examples, the HARQ component 835 may transmit, on the PSFCH, a HARQ message in the selected additional RB.

In some cases, the selecting the one or more RBs from the first subset of the set of PSFCH RBs is based on a first selection procedure, and the selecting the additional RB from the second subset of the set of PSFCH RBs is based on a second selection procedure different from the first selection procedure.

The offset value component 840 may receive, from the second UE, a message indicating an offset value for the first selection procedure, the selected additional RB being distinct from the selected one or more RBs based on the offset value for the first selection procedure.

The group index component 845 may receive, from the second UE, a group index associated with the first UE. In some such examples, the RB allocation component 815 may determine the first subset of the set of PSFCH RBs allocated for scheduling request transmission on the PSFCH based on the group index.

In some cases, the first bit map indicates the first subset of the set of PSFCH RBs allocated for scheduling request transmission by a first set of UEs associated with the group index. In some such cases, the first bit map further indicates a third subset of the set of PSFCH RBs allocated for scheduling request transmission by a second set of UEs associated with a second group index.

In some cases, the first subset of the set of PSFCH RBs is TDMed with the third subset of the set of PSFCH RBs.

In some examples, the scheduling request component 820 may determine to transmit both the scheduling request message and a HARQ indicator in a slot, and the transmitting may involve transmitting a hybrid message indicating the scheduling request message and the HARQ indicator in one or more RBs of the first subset of the set of PSFCH RBs.

In some examples, receiving the first bit map and the second bit map may involve the RB allocation component 815 receiving, from a base station, a broadcast message indicating the first bit map and the second bit map.

In some cases, the first bit map further indicates a set of slots in which the first subset of the set of PSFCH RBs is allocated for scheduling request transmission on the PSFCH.

In some cases, the first bit map further indicates a first slot in which the first subset of the set of PSFCH RBs is allocated for scheduling request transmission to the second UE and a second slot in which the first subset of the set of PSFCH RBs is allocated for scheduling request transmission to a third UE.

In some cases, the first bit map includes a set of bits, each bit of the set of bits indicating an RB in the set of PSFCH RBs, an RB in a sub-channel of the set of PSFCH RBs, an RB in a set of sub-channels of the set of PSFCH RBs, or a combination thereof.

In some cases, the first subset of the set of PSFCH RBs at least partially overlaps with the second subset of the set of PSFCH RBs.

The PSFCH configuration component 810 may determine a configuration for a PSFCH, the configuration indicating a set of PSFCH RBs. The RB allocation component 815 may receive a first bit map indicating a first subset of the set of PSFCH RBs allocated for scheduling request reception on the PSFCH and a second bit map indicating a second subset of the set of PSFCH RBs allocated for HARQ reception on the PSFCH. The scheduling request component 820 may receive, on the PSFCH and from a second UE, a scheduling request message in the first subset of the set of PSFCH RBs.

The RRC component 850 may transmit, to the second UE, an RRC message configuring the second UE with one or more RBs from the first subset of the set of PSFCH RBs, the scheduling request message received in the one or more RBs based on the RRC message.

In some examples, the HARQ component 835 may receive, on the PSFCH, a HARQ message in the second subset of the set of PSFCH RBs.

In some examples, the offset value component 840 may transmit, to the second UE, a message indicating an offset value for a first selection procedure, the scheduling request message transmitted in one or more RBs selected based on the first selection procedure and the HARQ message transmitted in an additional RB distinct from the one or more RBs based on the offset value for the first selection procedure.

In some examples, the group index component 845 may transmit, to a set of UEs including at least the second UE, a set of group indexes, each group index of the set of group indexes associated with one or more UEs of the set of UEs, and the scheduling request message being received in one or more RBs of the first subset of the set of PSFCH RBs based on a group index of the set of group indexes associated with the second UE.

In some examples, the RB allocation component 815 may determine that the scheduling request message is transmitted to the first UE based on a slot in which the scheduling request message is received, the first subset of the set of PSFCH RBs being allocated for scheduling request transmission to the first UE in the slot.

In some examples, the RB selection component 825 may determine that the scheduling request message is transmitted to the first UE based on one or more RBs in which the scheduling request message is received being selected based on an ID for the first UE.

The data buffer component 855 may determine data pending in a buffer for transmission to a second UE. The RB selection component 825 may select one or more RBs for transmitting a scheduling request message to the second UE on a PSFCH based on the data pending in the buffer. The waveform generation component 860 may generate a waveform for the scheduling request message based on a number of RBs in the selected one or more RBs. The scheduling request component 820 may transmit, on the PSFCH and to the second UE, the scheduling request message in the selected one or more RBs using the generated waveform.

In some examples, the number of RBs includes one RB, and the waveform generation component 860 may determine a root ZC sequence assigned to the second UE, the generated waveform being based on the root ZC sequence, a cyclic shift, or both.

In some examples, the root ZC sequence may be assigned to the second UE for a first slot, and the waveform generation component 860 may determine a second root ZC sequence assigned to the second UE for a second slot based on a pseudo-random number generator, a seed value, an ID of the second UE, or a combination thereof.

In some examples, the scheduling request component 820 may generate a set of bits for the scheduling request message, the set of bits indicating an amount of data pending in the buffer for transmission to the second UE.

In some examples, the data buffer component 855 may select a cyclic shift, a preamble, or both for the scheduling request message to indicate an amount of data pending in the buffer for transmission to the second UE.

In some examples, the number of RBs may include two or more RBs, and the waveform generation component 860 may determine a root ZC sequence for the two or more RBs, the generated waveform being based on the root ZC sequence.

The cyclic shift component 865 may select a cyclic shift from a set of valid cyclic shifts for the scheduling request message, the set of valid cyclic shifts being based on the number of RBs, one or more channel conditions of the PSFCH, or a combination thereof.

In some examples, the RB selection component 825 may receive, from the second UE, a message indicating the number of RBs, the selecting the one or more RBs being based on the message.

In some examples, the first UE may be an example of an S/A and the second UE may be an example of a PLC, and the RB selection component 825 may determine the number of RBs based on a number of S/As associated with the PLC, a number of additional PLCs coexisting with the PLC, or a combination thereof.

In some cases, the number of RBs includes one RB, and the generated waveform includes a PUCCH format 0 waveform.

Figure 9:
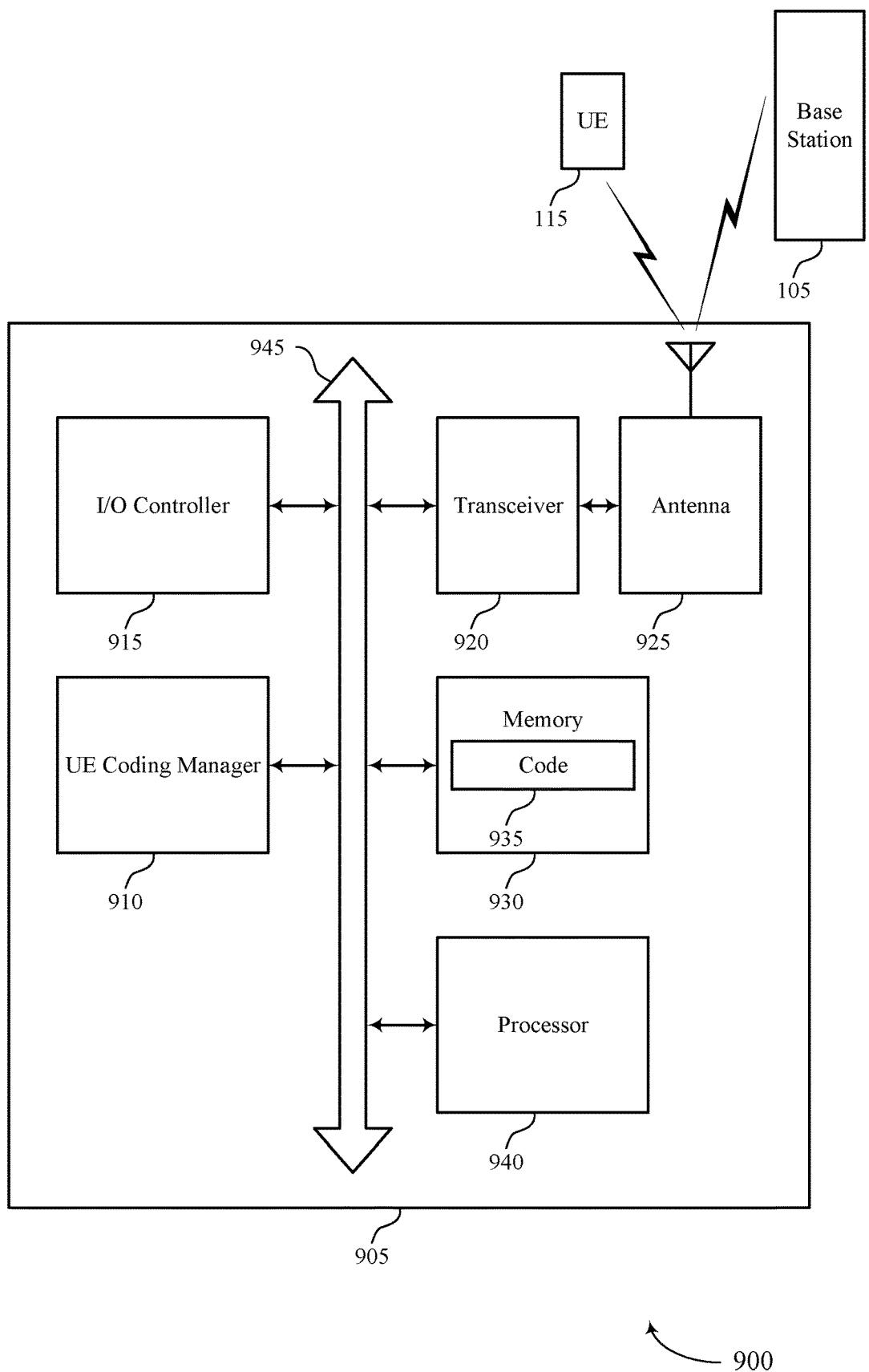
FIG. 9 shows a diagram of a system including a device that supports resource mapping for a scheduling request on a PSFCH in accordance with one or more aspects of the present disclosure.

FIG. 9 shows a diagram of a system 900 including a device 905 that supports resource mapping for a scheduling request on a PSFCH in accordance with one or more aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive control signaling indicating a first subset of a set of PSFCH RBs allocated for scheduling request transmission on a PSFCH and transmit, on the PSFCH and to a second UE, a scheduling request message in the first subset of the set of PSFCH RBs. Additionally or alternatively, the communications manager 910 may receive control signaling indicating a first subset of a set of PSFCH RBs allocated for scheduling request reception on a PSFCH and receive, on the PSFCH and from a first UE, a scheduling request message in the first subset of the set of PSFCH RBs. Additionally or alternatively, the communications manager 910 may receive, from a second UE, signaling indicating one or more RBs for transmitting a scheduling request message to the second UE on a PSFCH, generate a waveform for the scheduling request message based on a quantity of RBs in the indicated one or more RBs, and transmit, on the PSFCH and to the second UE, the scheduling request message in the indicated one or more RBs using the generated waveform. Additionally or alternatively, the communications manager 910 may transmit, to a first UE, signaling indicating one or more RBs for receiving a scheduling request message from the first UE on a PSFCH and receive, on the PSFCH and from the first UE, a waveform corresponding to the scheduling request message in the indicated one or more RBs, the waveform generated based on a quantity of RBs in the indicated one or more RBs.

The communications manager 910 may determine a configuration for a PSFCH, the configuration indicating a set of PSFCH RBs, receive a first bit map indicating a first subset of the set of PSFCH RBs allocated for scheduling request transmission on the PSFCH and a second bit map indicating a second subset of the set of PSFCH RBs allocated for HARQ transmission on the PSFCH, and transmit, on the PSFCH and to a second UE, a scheduling request message in the first subset of the set of PSFCH RBs. Additionally or alternatively, the communications manager 910 may determine a configuration for a PSFCH, the configuration indicating a set of PSFCH RBs, receive a first bit map indicating a first subset of the set of PSFCH RBs allocated for scheduling request reception on the PSFCH and a second bit map indicating a second subset of the set of PSFCH RBs allocated for HARQ reception on the PSFCH, and receive, on the PSFCH and from a second UE, a scheduling request message in the first subset of the set of PSFCH RBs. Additionally or alternatively, the communications manager 910 may determine data pending in a buffer for transmission to a second UE, select one or more RBs for transmitting a scheduling request message to the second UE on a PSFCH based on the data pending in the buffer, generate a waveform for the scheduling request message based on a number of RBs in the selected one or more RBs, and transmit, on the PSFCH and to the second UE, the scheduling request message in the selected one or more RBs using the generated waveform.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting resource mapping for a scheduling request on a PSFCH).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
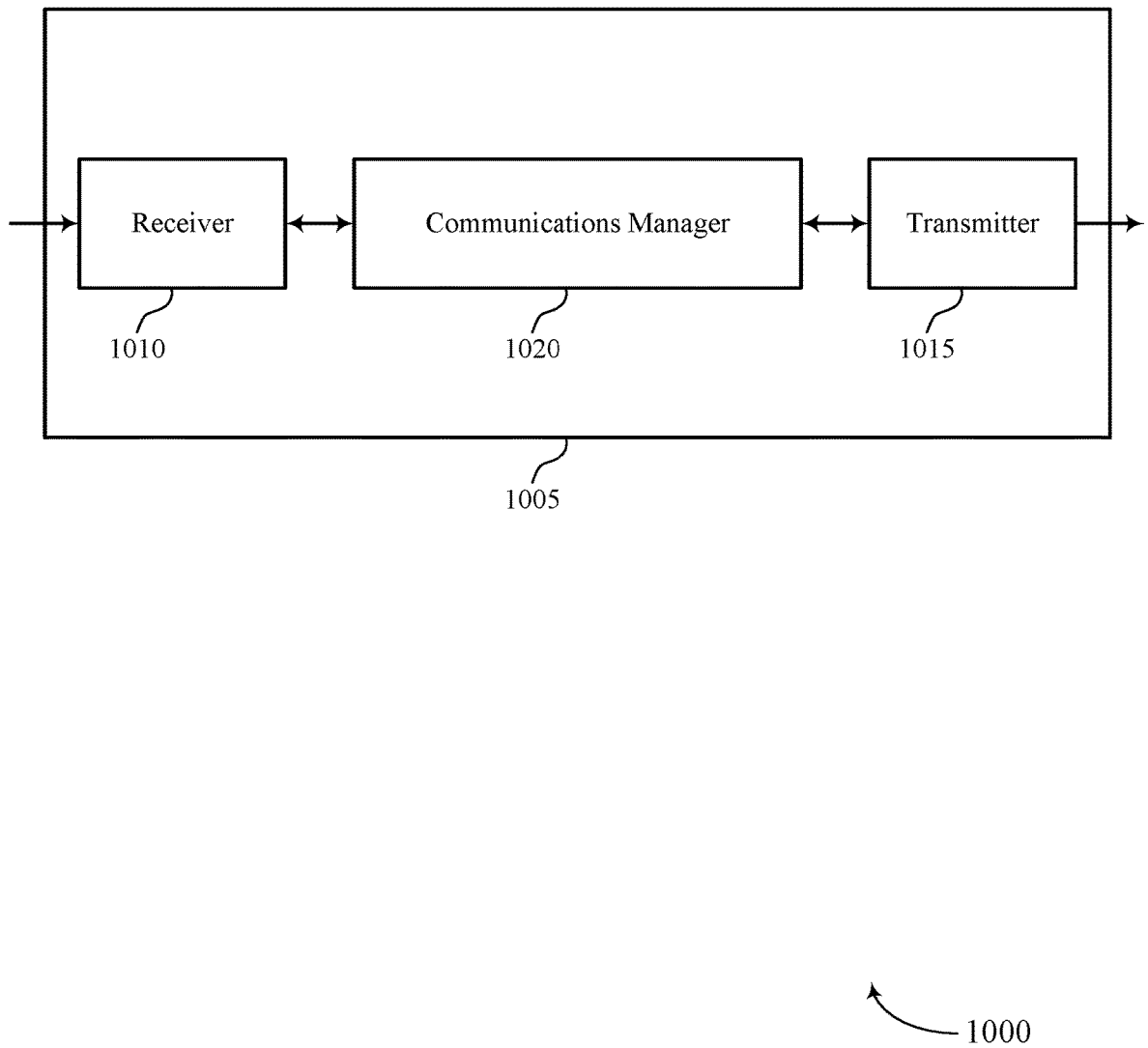
FIGS. 10 and 11 show block diagrams of devices that support resource mapping for a scheduling request on a PSFCH in accordance with one or more aspects of the present disclosure.

FIG. 10 shows a block diagram 1000 of a device 1005 that supports resource mapping for a scheduling request on a PSFCH in accordance with one or more aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to resource mapping for a scheduling request on a PSFCH). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to resource mapping for a scheduling request on a PSFCH). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of resource mapping for a scheduling request on a PSFCH as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled to the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications by a base station in accordance with examples as disclosed herein. For example, the communications manager 1020 may be configured as or otherwise support a means for configuring a first subset of a set of PSFCH RBs for scheduling request transmission by a first UE to a second UE on a PSFCH. The communications manager 1020 may be configured as or otherwise support a means for transmitting, to the first UE and the second UE, control signaling indicating the first subset of the set of PSFCH RBs allocated for the scheduling request transmission on the PSFCH.

Figure 11:
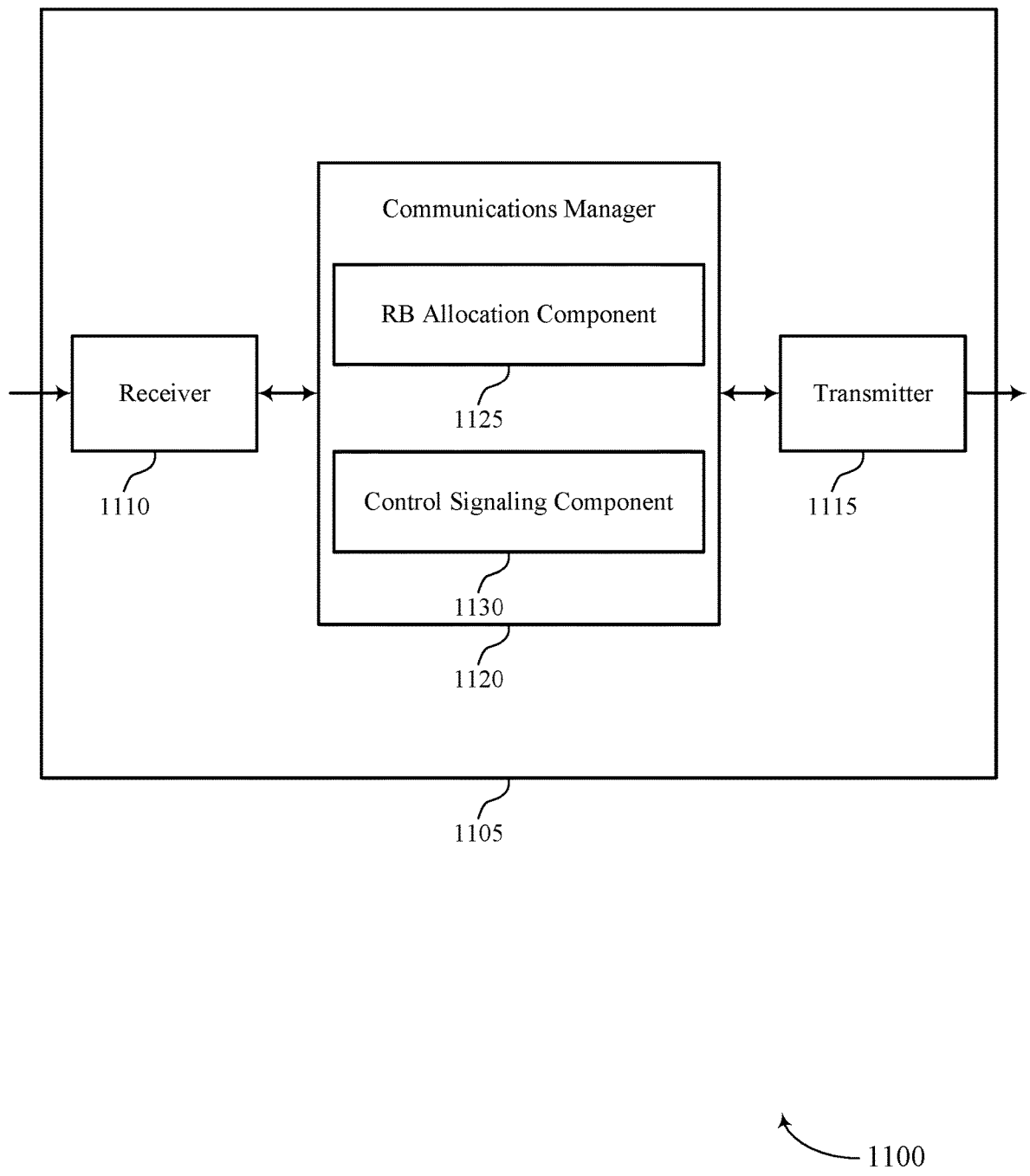

FIG. 11 shows a block diagram 1100 of a device 1105 that supports resource mapping for a scheduling request on a PSFCH in accordance with one or more aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to resource mapping for a scheduling request on a PSFCH). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to resource mapping for a scheduling request on a PSFCH). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of resource mapping for a scheduling request on a PSFCH as described herein. For example, the communications manager 1120 may include an RB allocation component 1125, a control signaling component 1130, or both. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications by a base station in accordance with examples as disclosed herein. The RB allocation component 1125 may be configured as or otherwise support a means for configuring a first subset of a set of PSFCH RBs for scheduling request transmission by a first UE to a second UE on a PSFCH. The control signaling component 1130 may be configured as or otherwise support a means for transmitting, to the first UE and the second UE, control signaling indicating the first subset of the set of PSFCH RBs allocated for the scheduling request transmission on the PSFCH.

Figure 12:
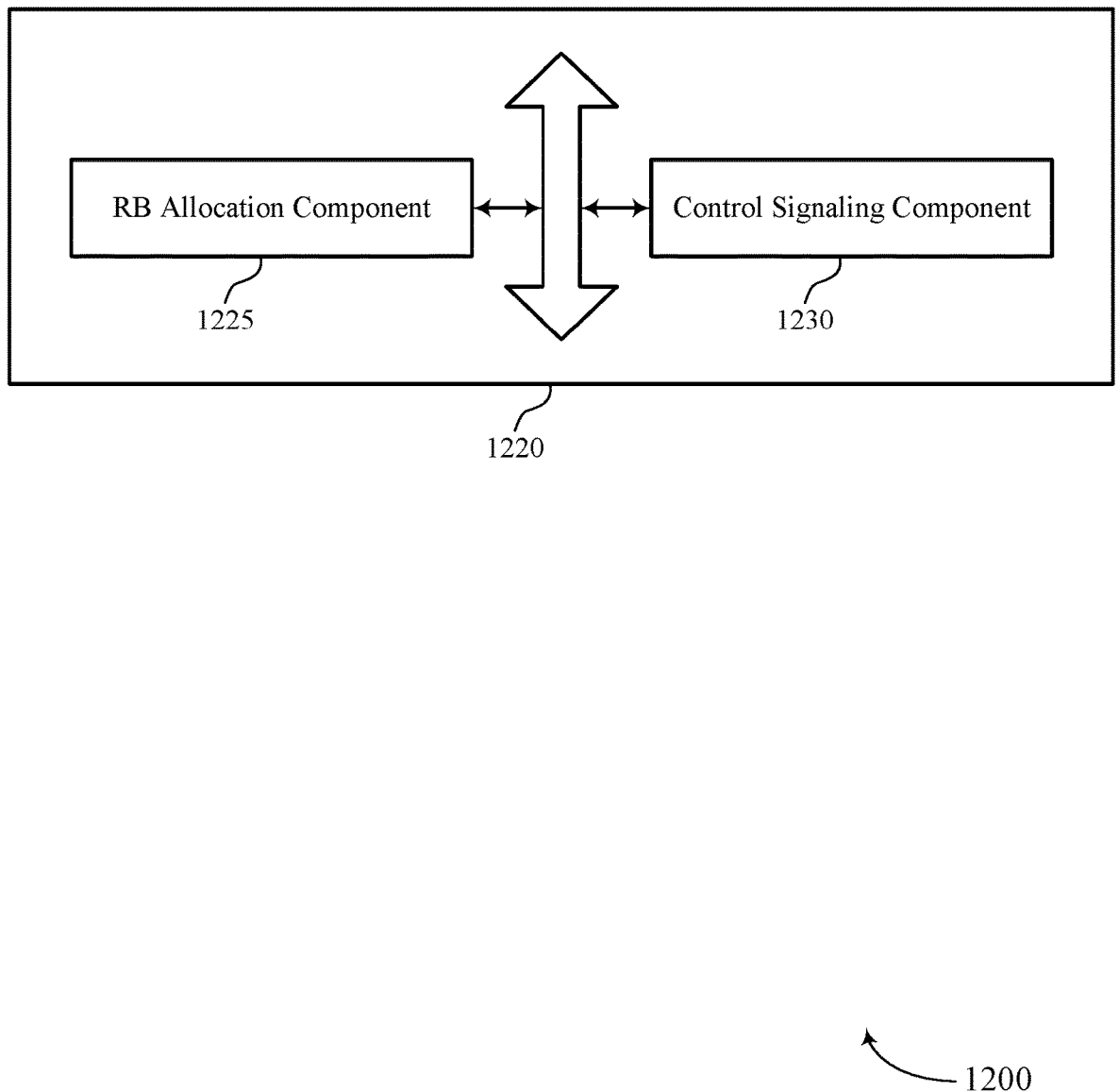
FIG. 12 shows a block diagram of a communications manager that supports resource mapping for a scheduling request on a PSFCH in accordance with one or more aspects of the present disclosure.

FIG. 12 shows a block diagram 1200 of a communications manager 1220 that supports resource mapping for a scheduling request on a PSFCH in accordance with one or more aspects of the present disclosure. The communications manager 1220 may be an example of aspects of a communications manager 1020, a communications manager 1120, or both as described herein. The communications manager 1220, or various components thereof, may be an example of means for performing various aspects of resource mapping for a scheduling request on a PSFCH as described herein. For example, the communications manager 1220 may include an RB allocation component 1225, a control signaling component 1230, or both. Each of these components may communicate, directly or indirectly, with one another (e.g., via one or more buses).

The communications manager 1220 may support wireless communications by a base station in accordance with examples as disclosed herein. The RB allocation component 1225 may be configured as or otherwise support a means for configuring a first subset of a set of PSFCH RBs for scheduling request transmission by a first UE to a second UE on a PSFCH. The control signaling component 1230 may be configured as or otherwise support a means for transmitting, to the first UE and the second UE, control signaling indicating the first subset of the set of PSFCH RBs allocated for the scheduling request transmission on the PSFCH.

In some examples, the control signaling may include a first bit map indicating the first subset of the set of PSFCH RBs allocated for the scheduling request transmission. In some examples, the RB allocation component 1225 may be configured as or otherwise support a means for configuring a second subset of the set of PSFCH RBs for HARQ transmission by the first UE to the second UE on the PSFCH. In some examples, the control signaling component 1230 may be configured as or otherwise support a means for transmitting, to the first UE and the second UE, a second bit map indicating the second subset of the set of PSFCH RBs allocated for the HARQ transmission on the PSFCH.

Figure 13:
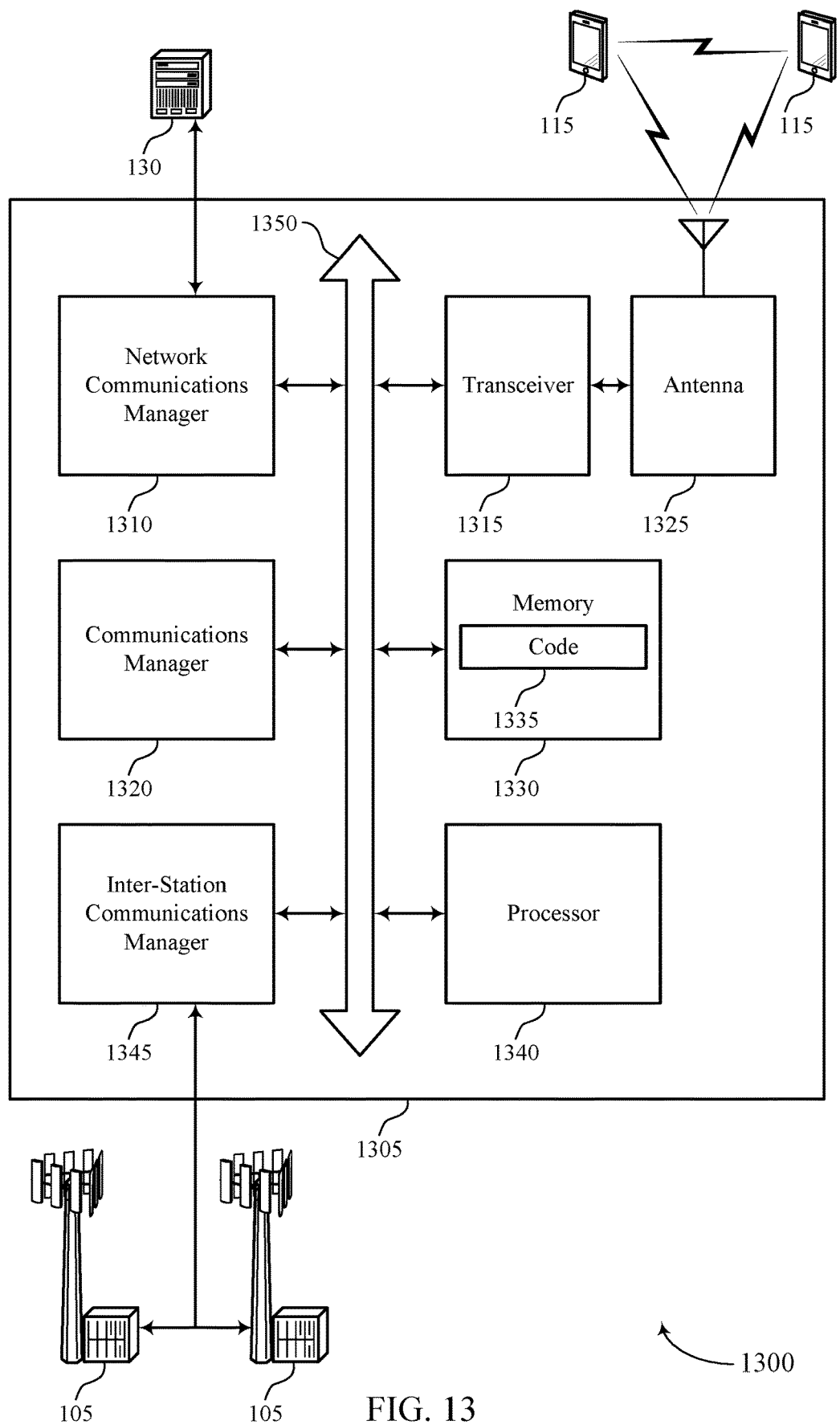
FIG. 13 shows a diagram of a system including a device that supports resource mapping for a scheduling request on a PSFCH in accordance with one or more aspects of the present disclosure.

FIG. 13 shows a diagram of a system 1300 including a device 1305 that supports resource mapping for a scheduling request on a PSFCH in accordance with one or more aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting resource mapping for a scheduling request on a physical sidelink feedback channel). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications by a base station in accordance with examples as disclosed herein. For example, the communications manager 1320 may be configured as or otherwise support a means for configuring a first subset of a set of PSFCH RBs for scheduling request transmission by a first UE to a second UE on a PSFCH. The communications manager 1320 may be configured as or otherwise support a means for transmitting, to the first UE and the second UE, control signaling indicating the first subset of the set of PSFCH RBs allocated for the scheduling request transmission on the PSFCH.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of resource mapping for a scheduling request on a PSFCH as described herein, or the processor 1340 and the memory 1330 may be otherwise configured to perform or support such operations.

Figure 14:
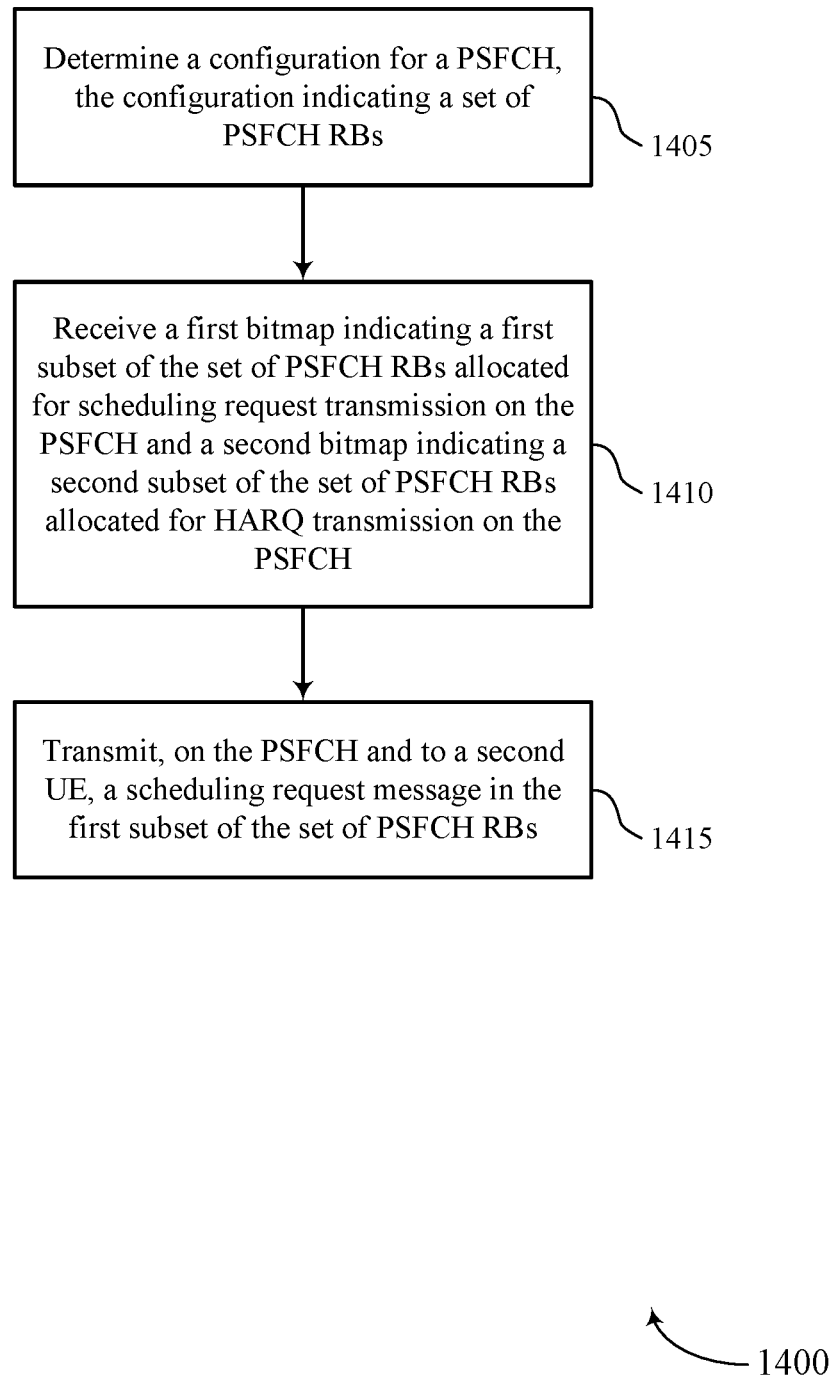
FIGS. 14 through 24 show flowcharts illustrating methods that support resource mapping for a scheduling request on a PSFCH in accordance with one or more aspects of the present disclosure.

FIG. 14 shows a flowchart illustrating a method 1400 that supports resource mapping for a scheduling request on a PSFCH in accordance with one or more aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine a configuration for a PSFCH, the configuration indicating a set of PSFCH RBs. The operations of 1405 may be performed according to the methods described herein. In some examples, aspects of the operations of 1405 may be performed by a PSFCH configuration component as described with reference to FIGS. 6 through 9.

At 1410, the UE may receive a first bit map indicating a first subset of the set of PSFCH RBs allocated for scheduling request transmission on the PSFCH and a second bit map indicating a second subset of the set of PSFCH RBs allocated for HARQ transmission on the PSFCH. The operations of 1410 may be performed according to the methods described herein. In some examples, aspects of the operations of 1410 may be performed by an RB allocation component as described with reference to FIGS. 6 through 9.

At 1415, the UE may transmit, on the PSFCH and to a second UE, a scheduling request message in the first subset of the set of PSFCH RBs. The operations of 1415 may be performed according to the methods described herein. In some examples, aspects of the operations of 1415 may be performed by a scheduling request component as described with reference to FIGS. 6 through 9.

Figure 15:
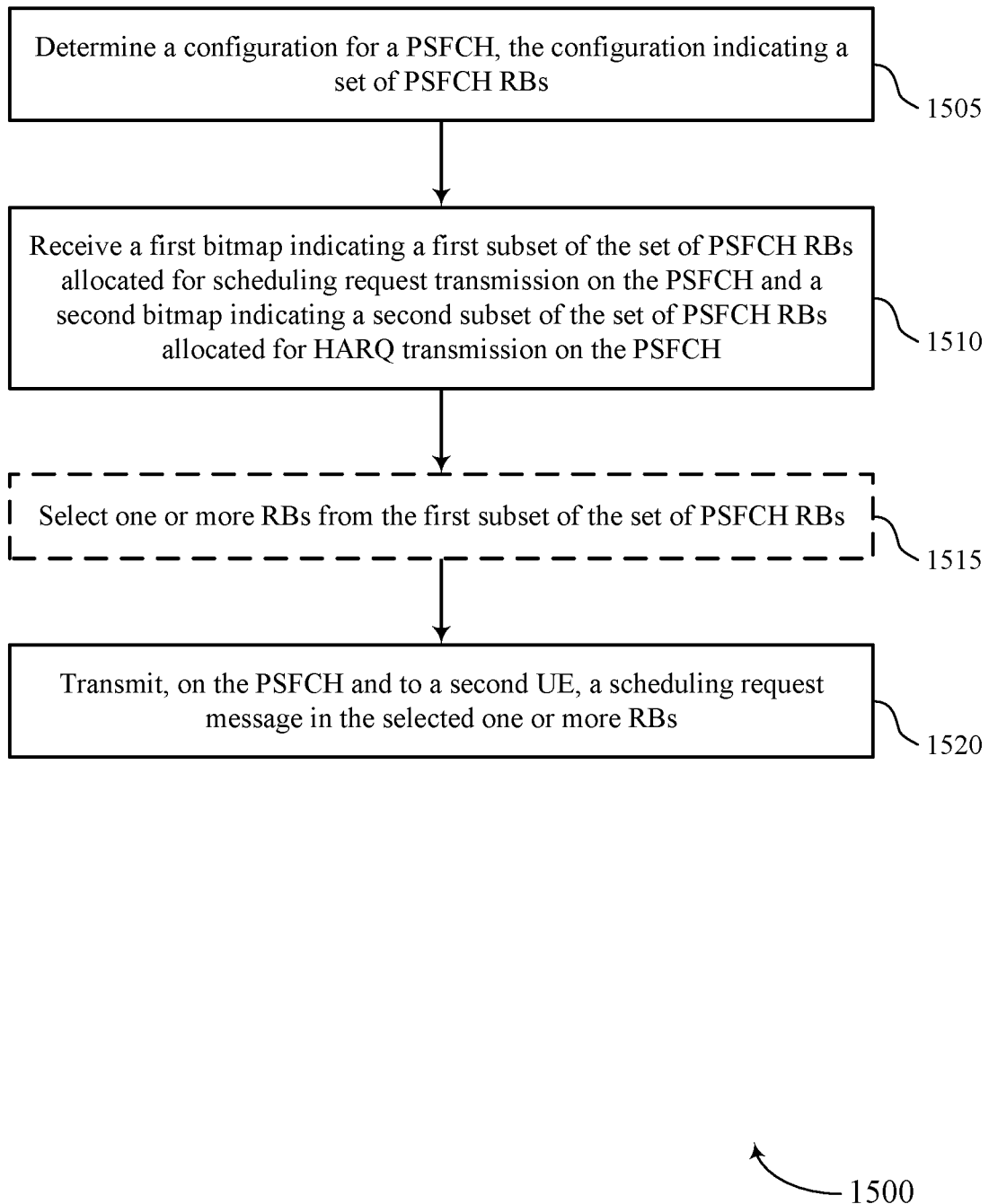

FIG. 15 shows a flowchart illustrating a method 1500 that supports resource mapping for a scheduling request on a PSFCH in accordance with one or more aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine a configuration for a PSFCH, the configuration indicating a set of PSFCH RBs. The operations of 1505 may be performed according to the methods described herein. In some examples, aspects of the operations of 1505 may be performed by a PSFCH configuration component as described with reference to FIGS. 6 through 9.

At 1510, the UE may receive a first bit map indicating a first subset of the set of PSFCH RBs allocated for scheduling request transmission on the PSFCH and a second bit map indicating a second subset of the set of PSFCH RBs allocated for HARQ transmission on the PSFCH. The operations of 1510 may be performed according to the methods described herein. In some examples, aspects of the operations of 1510 may be performed by an RB allocation component as described with reference to FIGS. 6 through 9.

At 1515, the UE may select one or more RBs from the first subset of the set of PSFCH RBs. The operations of 1515 may be performed according to the methods described herein. In some examples, aspects of the operations of 1515 may be performed by an RB selection component as described with reference to FIGS. 6 through 9.

At 1520, the UE may transmit, on the PSFCH and to a second UE, a scheduling request message in the selected one or more RBs. The operations of 1520 may be performed according to the methods described herein. In some examples, aspects of the operations of 1520 may be performed by a scheduling request component as described with reference to FIGS. 6 through 9.

Figure 16:
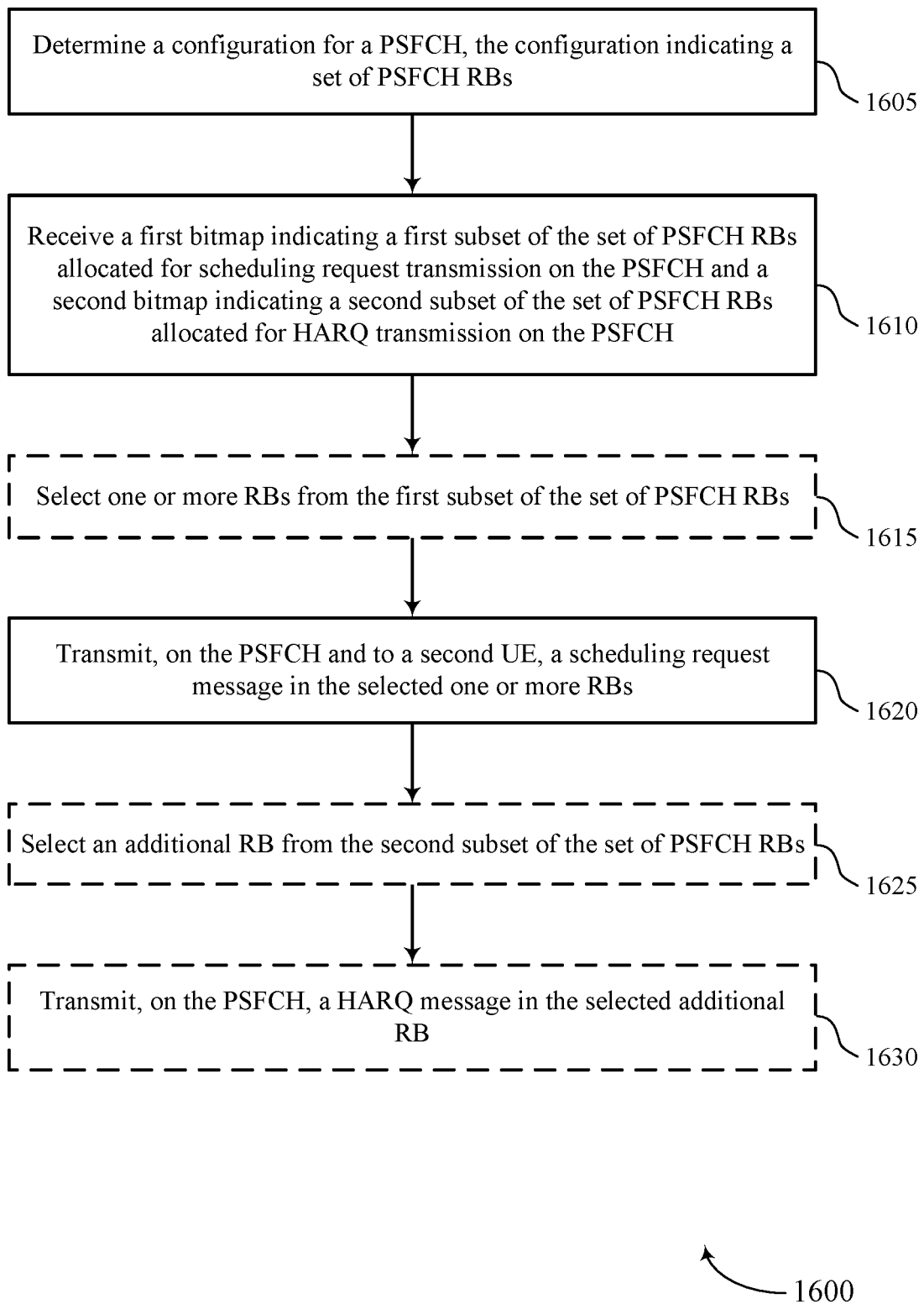

FIG. 16 shows a flowchart illustrating a method 1600 that supports resource mapping for a scheduling request on a PSFCH in accordance with one or more aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine a configuration for a PSFCH, the configuration indicating a set of PSFCH RBs. The operations of 1605 may be performed according to the methods described herein. In some examples, aspects of the operations of 1605 may be performed by a PSFCH configuration component as described with reference to FIGS. 6 through 9.

At 1610, the UE may receive a first bit map indicating a first subset of the set of PSFCH RBs allocated for scheduling request transmission on the PSFCH and a second bit map indicating a second subset of the set of PSFCH RBs allocated for HARQ transmission on the PSFCH. The operations of 1610 may be performed according to the methods described herein. In some examples, aspects of the operations of 1610 may be performed by an RB allocation component as described with reference to FIGS. 6 through 9.

At 1615, the UE may select one or more RBs from the first subset of the set of PSFCH RBs. The operations of 1615 may be performed according to the methods described herein. In some examples, aspects of the operations of 1615 may be performed by an RB selection component as described with reference to FIGS. 6 through 9.

At 1620, the UE may transmit, on the PSFCH and to a second UE, a scheduling request message in the selected one or more RBs. The operations of 1620 may be performed according to the methods described herein. In some examples, aspects of the operations of 1620 may be performed by a scheduling request component as described with reference to FIGS. 6 through 9.

At 1625, the UE may select an additional RB from the second subset of the set of PSFCH RBs. The operations of 1625 may be performed according to the methods described herein. In some examples, aspects of the operations of 1625 may be performed by an RB selection component as described with reference to FIGS. 6 through 9.

At 1630, the UE may transmit, on the PSFCH, a HARQ message in the selected additional RB. The operations of 1630 may be performed according to the methods described herein. In some examples, aspects of the operations of 1630 may be performed by a HARQ component as described with reference to FIGS. 6 through 9.

Figure 17:
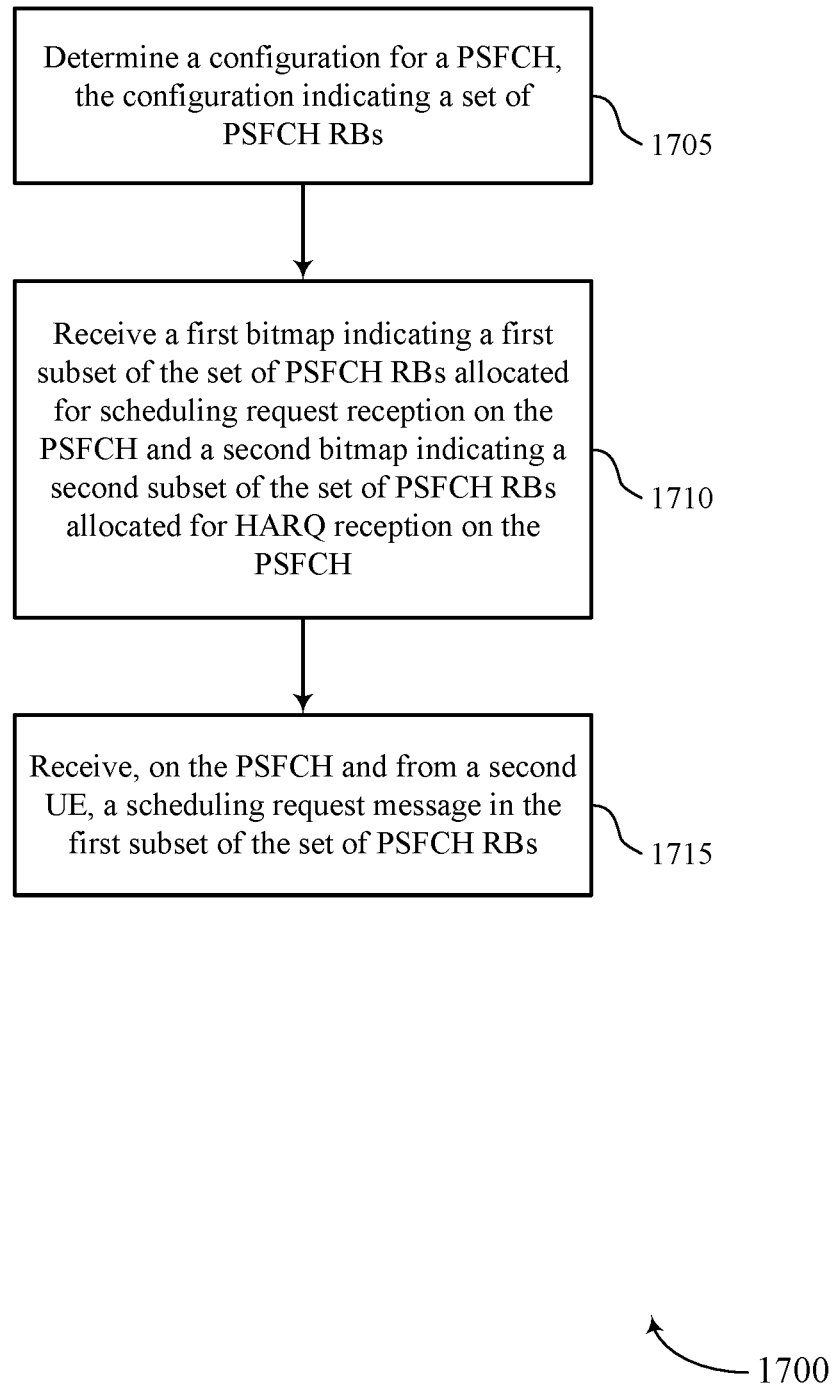

FIG. 17 shows a flowchart illustrating a method 1700 that supports resource mapping for a scheduling request on a PSFCH in accordance with one or more aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may determine a configuration for a PSFCH, the configuration indicating a set of PSFCH RBs. The operations of 1705 may be performed according to the methods described herein. In some examples, aspects of the operations of 1705 may be performed by a PSFCH configuration component as described with reference to FIGS. 6 through 9.

At 1710, the UE may receive a first bit map indicating a first subset of the set of PSFCH RBs allocated for scheduling request reception on the PSFCH and a second bit map indicating a second subset of the set of PSFCH RBs allocated for HARQ reception on the PSFCH. The operations of 1710 may be performed according to the methods described herein. In some examples, aspects of the operations of 1710 may be performed by an RB allocation component as described with reference to FIGS. 6 through 9.

At 1715, the UE may receive, on the PSFCH and from a second UE, a scheduling request message in the first subset of the set of PSFCH RBs. The operations of 1715 may be performed according to the methods described herein. In some examples, aspects of the operations of 1715 may be performed by a scheduling request component as described with reference to FIGS. 6 through 9.

Figure 18:
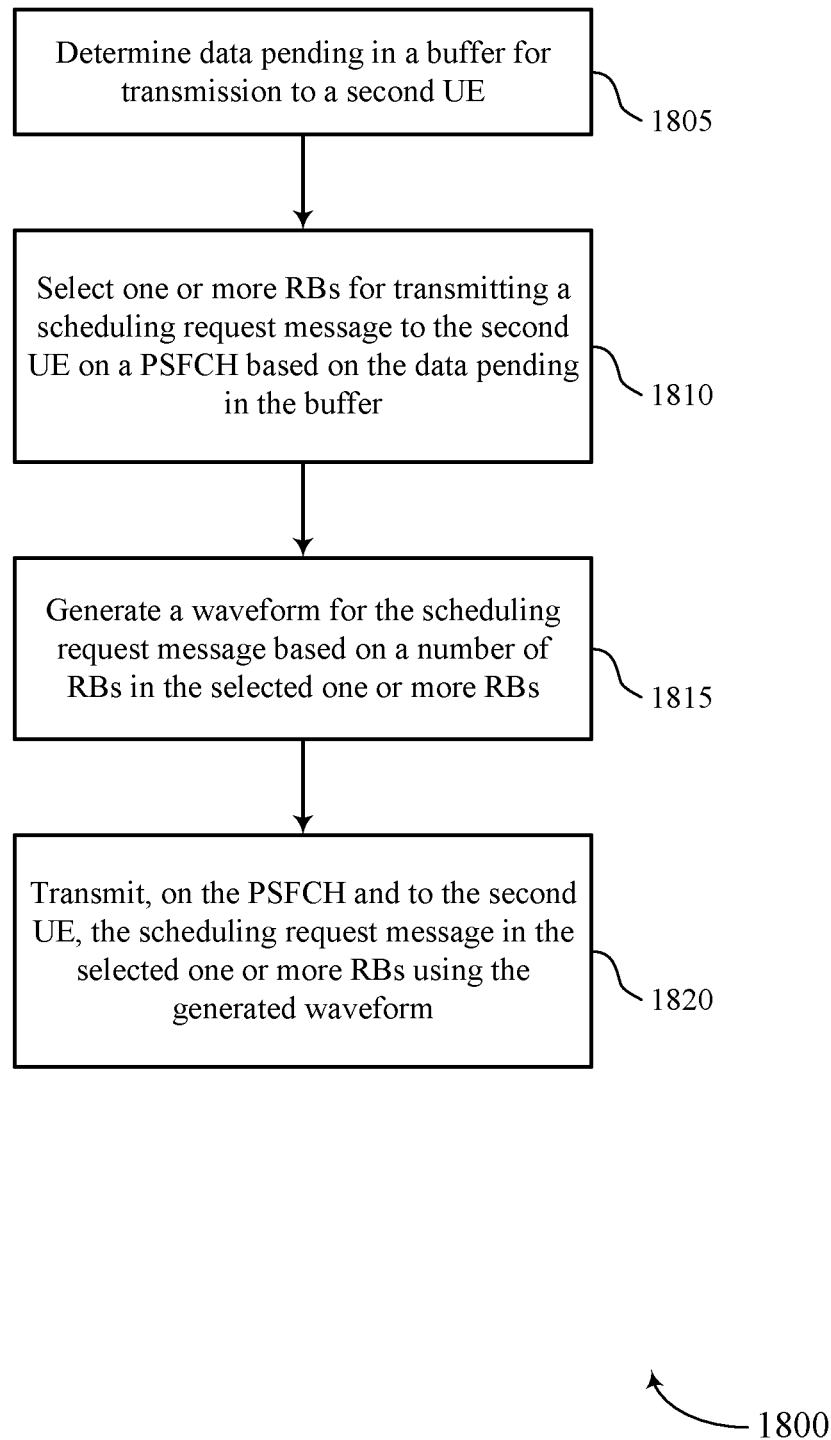

FIG. 18 shows a flowchart illustrating a method 1800 that supports resource mapping for a scheduling request on a PSFCH in accordance with one or more aspects of the present disclosure. The operations of method 1800 may be implemented by a UE 115 or its components as described herein. For example, the operations of method 1800 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1805, the UE may determine data pending in a buffer for transmission to a second UE. The operations of 1805 may be performed according to the methods described herein. In some examples, aspects of the operations of 1805 may be performed by a data buffer component as described with reference to FIGS. 6 through 9.

At 1810, the UE may select one or more RBs for transmitting a scheduling request message to the second UE on a PSFCH based on the data pending in the buffer. The operations of 1810 may be performed according to the methods described herein. In some examples, aspects of the operations of 1810 may be performed by an RB selection component as described with reference to FIGS. 6 through 9.

At 1815, the UE may generate a waveform for the scheduling request message based on a number of RBs in the selected one or more RBs. The operations of 1815 may be performed according to the methods described herein. In some examples, aspects of the operations of 1815 may be performed by a waveform generation component as described with reference to FIGS. 6 through 9.

At 1820, the UE may transmit, on the PSFCH and to the second UE, the scheduling request message in the selected one or more RBs using the generated waveform. The operations of 1820 may be performed according to the methods described herein. In some examples, aspects of the operations of 1820 may be performed by a scheduling request component as described with reference to FIGS. 6 through 9.

Figure 19:
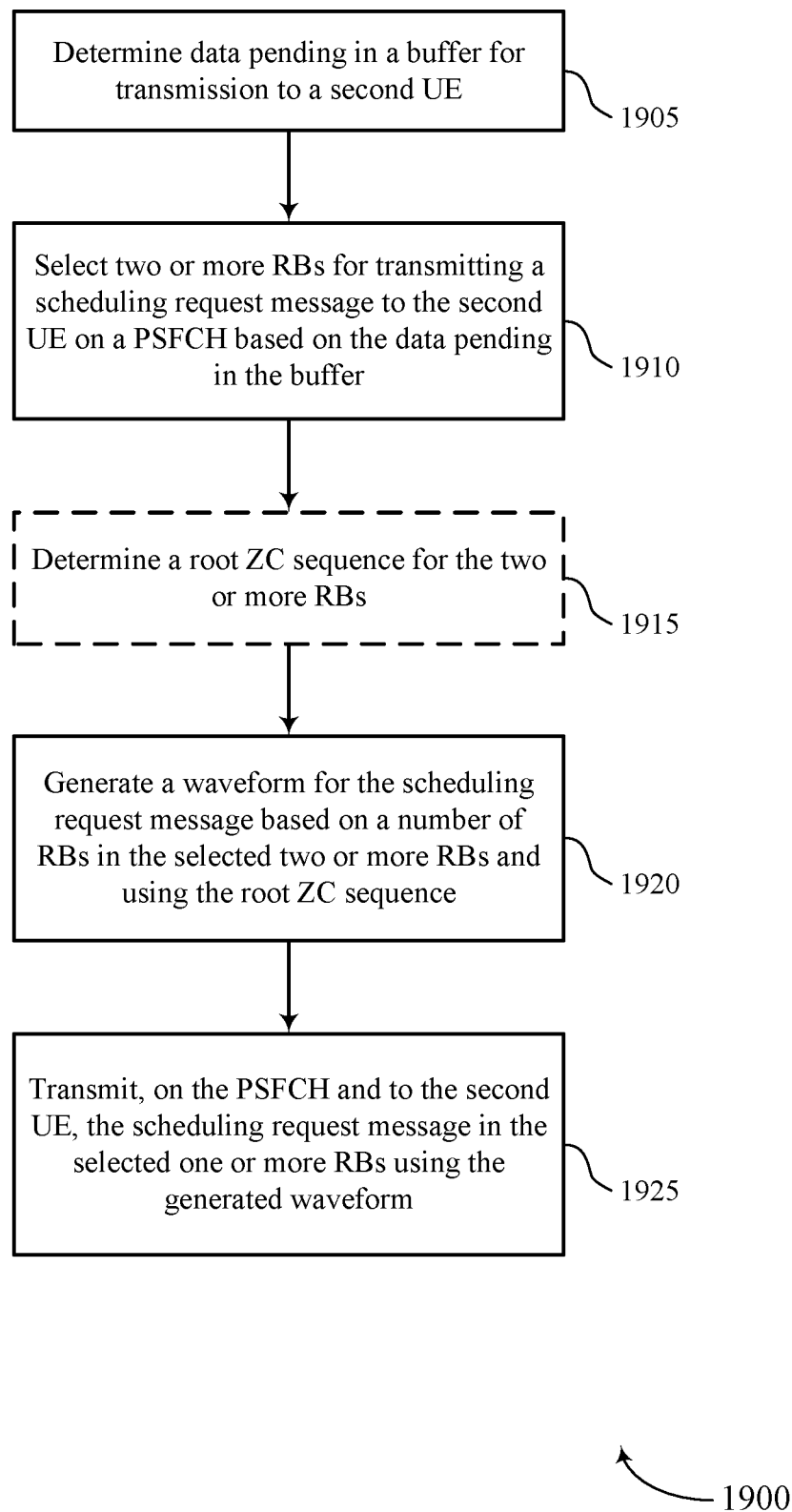

FIG. 19 shows a flowchart illustrating a method 1900 that supports resource mapping for a scheduling request on a PSFCH in accordance with one or more aspects of the present disclosure. The operations of method 1900 may be implemented by a UE 119 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may determine data pending in a buffer for transmission to a second UE. The operations of 1905 may be performed according to the methods described herein. In some examples, aspects of the operations of 1905 may be performed by a data buffer component as described with reference to FIGS. 6 through 9.

At 1910, the UE may select two or more RBs for transmitting a scheduling request message to the second UE on a PSFCH based on the data pending in the buffer. The operations of 1910 may be performed according to the methods described herein. In some examples, aspects of the operations of 1910 may be performed by an RB selection component as described with reference to FIGS. 6 through 9.

At 1915, the UE may determine a root ZC sequence for the two or more RBs. The operations of 1915 may be performed according to the methods described herein. In some examples, aspects of the operations of 1915 may be performed by a waveform generation component as described with reference to FIGS. 6 through 9.

At 1920, the UE may generate a waveform for the scheduling request message based on a number of RBs in the selected two or more RBs, the generated waveform based on the root ZC sequence. The operations of 1920 may be performed according to the methods described herein. In some examples, aspects of the operations of 1920 may be performed by a waveform generation component as described with reference to FIGS. 6 through 9.

At 1925, the UE may transmit, on the PSFCH and to the second UE, the scheduling request message in the selected two or more RBs using the generated waveform. The operations of 1925 may be performed according to the methods described herein. In some examples, aspects of the operations of 1925 may be performed by a scheduling request component as described with reference to FIGS. 6 through 9.

Figure 20:
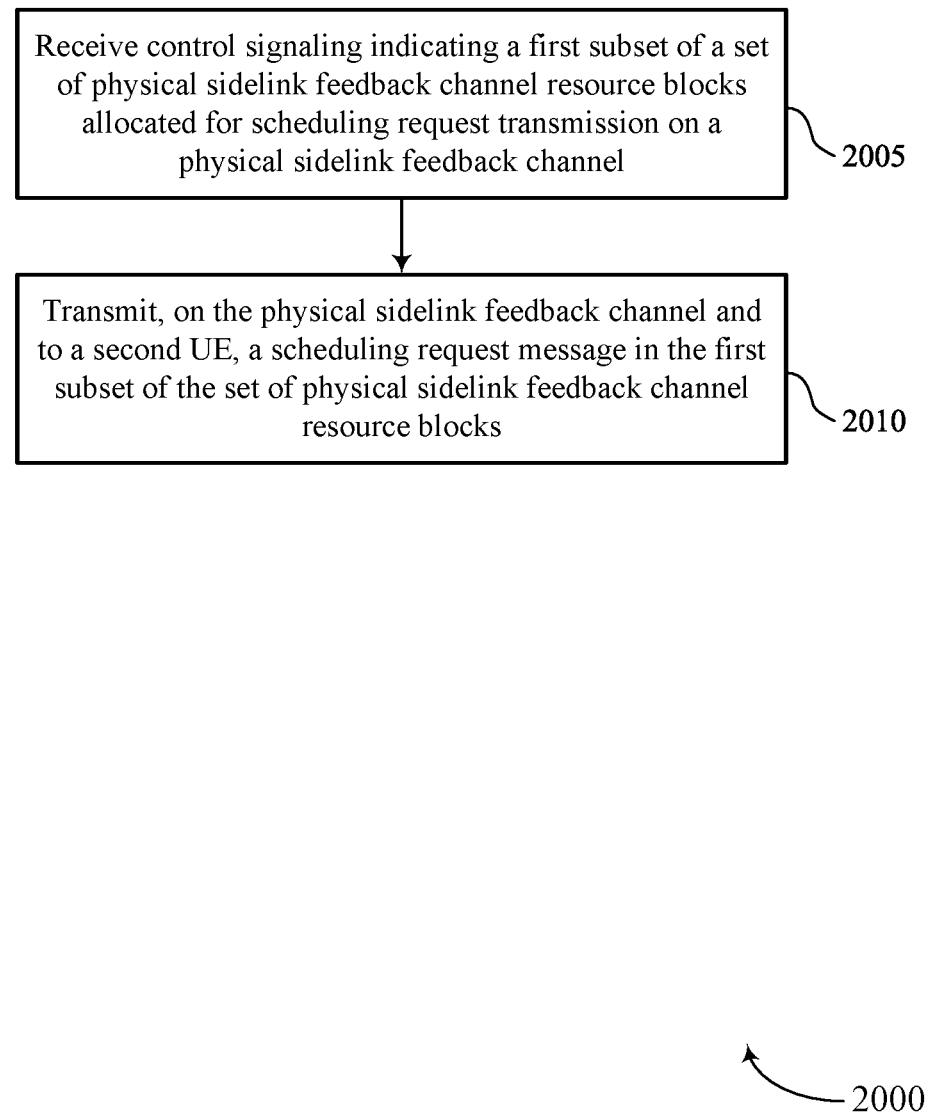

FIG. 20 shows a flowchart illustrating a method 2000 that supports resource mapping for a scheduling request on a PSFCH in accordance with one or more aspects of the present disclosure. The operations of the method 2000 may be implemented by a UE or its components as described herein. For example, the operations of the method 2000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 2005, the method may include receiving control signaling indicating a first subset of a set of PSFCH RBs allocated for scheduling request transmission on a PSFCH. The operations of 2005 may be performed in accordance with examples as disclosed herein. In some examples, aspects of the operations of 2005 may be performed by an RB allocation component as described with reference to FIGS. 6 through 9.

At 2010, the method may include transmitting, on the PSFCH and to a second UE, a scheduling request message in the first subset of the set of PSFCH RBs. The operations of 2010 may be performed in accordance with examples as disclosed herein. In some examples, aspects of the operations of 2010 may be performed by a scheduling request component as described with reference to FIGS. 6 through 9.

Figure 21:
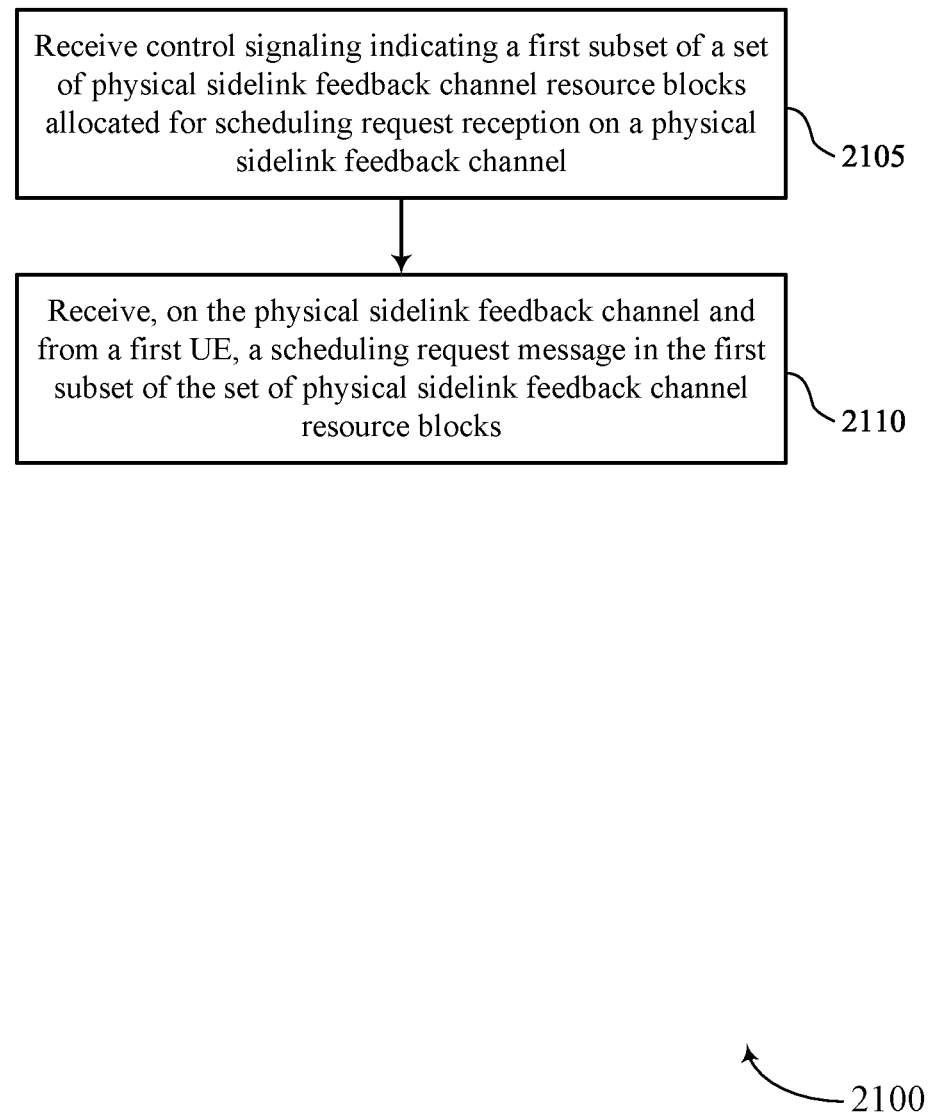

FIG. 21 shows a flowchart illustrating a method 2100 that supports resource mapping for a scheduling request on a PSFCH in accordance with one or more aspects of the present disclosure. The operations of the method 2100 may be implemented by a UE or its components as described herein. For example, the operations of the method 2100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 2105, the method may include receiving control signaling indicating a first subset of a set of PSFCH RBs allocated for scheduling request reception on a PSFCH. The operations of 2105 may be performed in accordance with examples as disclosed herein. In some examples, aspects of the operations of 2105 may be performed by an RB allocation component as described with reference to FIGS. 6 through 9.

At 2110, the method may include receiving, on the PSFCH and from a first UE, a scheduling request message in the first subset of the set of PSFCH RBs. The operations of 2110 may be performed in accordance with examples as disclosed herein. In some examples, aspects of the operations of 2110 may be performed by a scheduling request component as described with reference to FIGS. 6 through 9.

Figure 22:
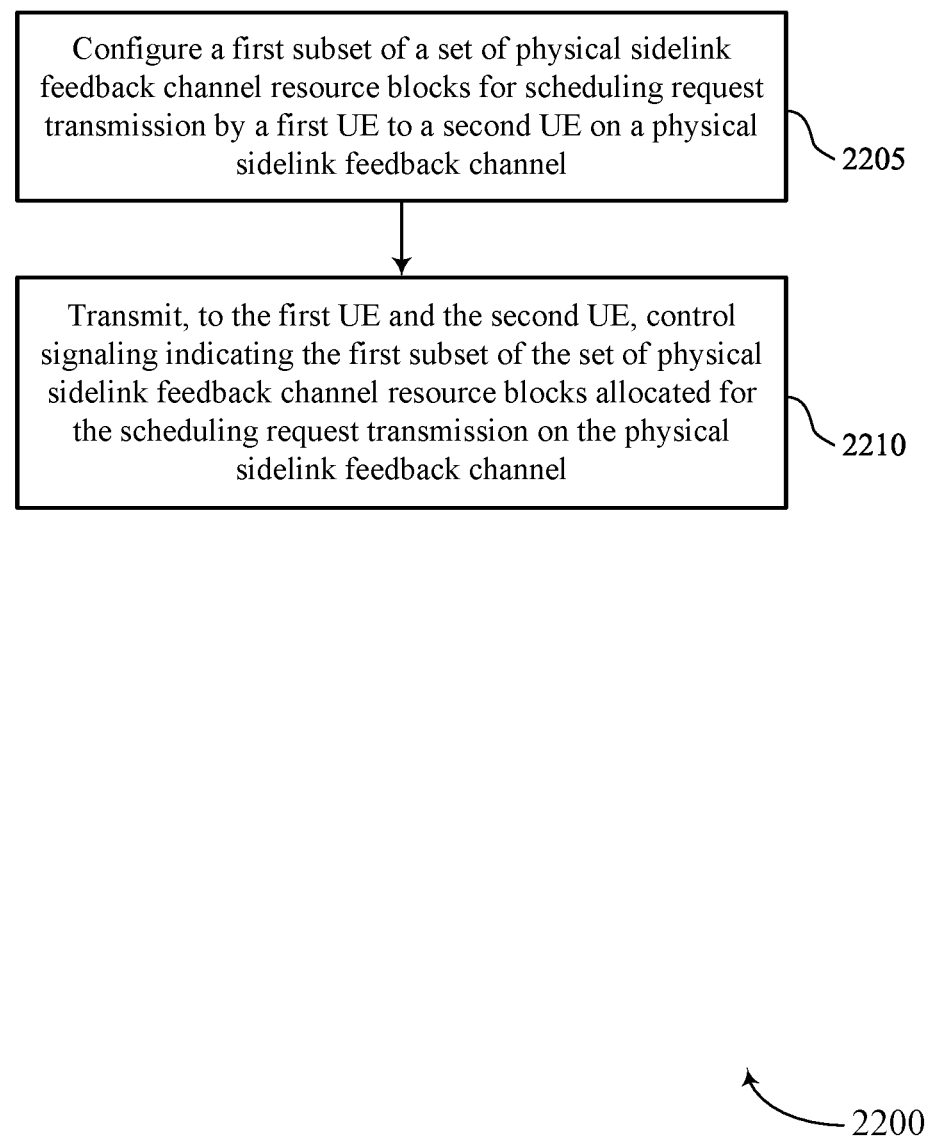

FIG. 22 shows a flowchart illustrating a method 2200 that supports resource mapping for a scheduling request on a PSFCH in accordance with one or more aspects of the present disclosure. The operations of the method 2200 may be implemented by a base station or its components as described herein. For example, the operations of the method 2200 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2205, the method may include configuring a first subset of a set of PSFCH RBs for scheduling request transmission by a first UE to a second UE on a PSFCH. The operations of 2205 may be performed in accordance with examples as disclosed herein. In some examples, aspects of the operations of 2205 may be performed by an RB allocation component 1125 as described with reference to FIG. 11.

At 2210, the method may include transmitting, to the first UE and the second UE, control signaling indicating the first subset of the set of PSFCH RBs allocated for the scheduling request transmission on the PSFCH. The operations of 2210 may be performed in accordance with examples as disclosed herein. In some examples, aspects of the operations of 2210 may be performed by a control signaling component 1130 as described with reference to FIG. 11.

Figure 23:
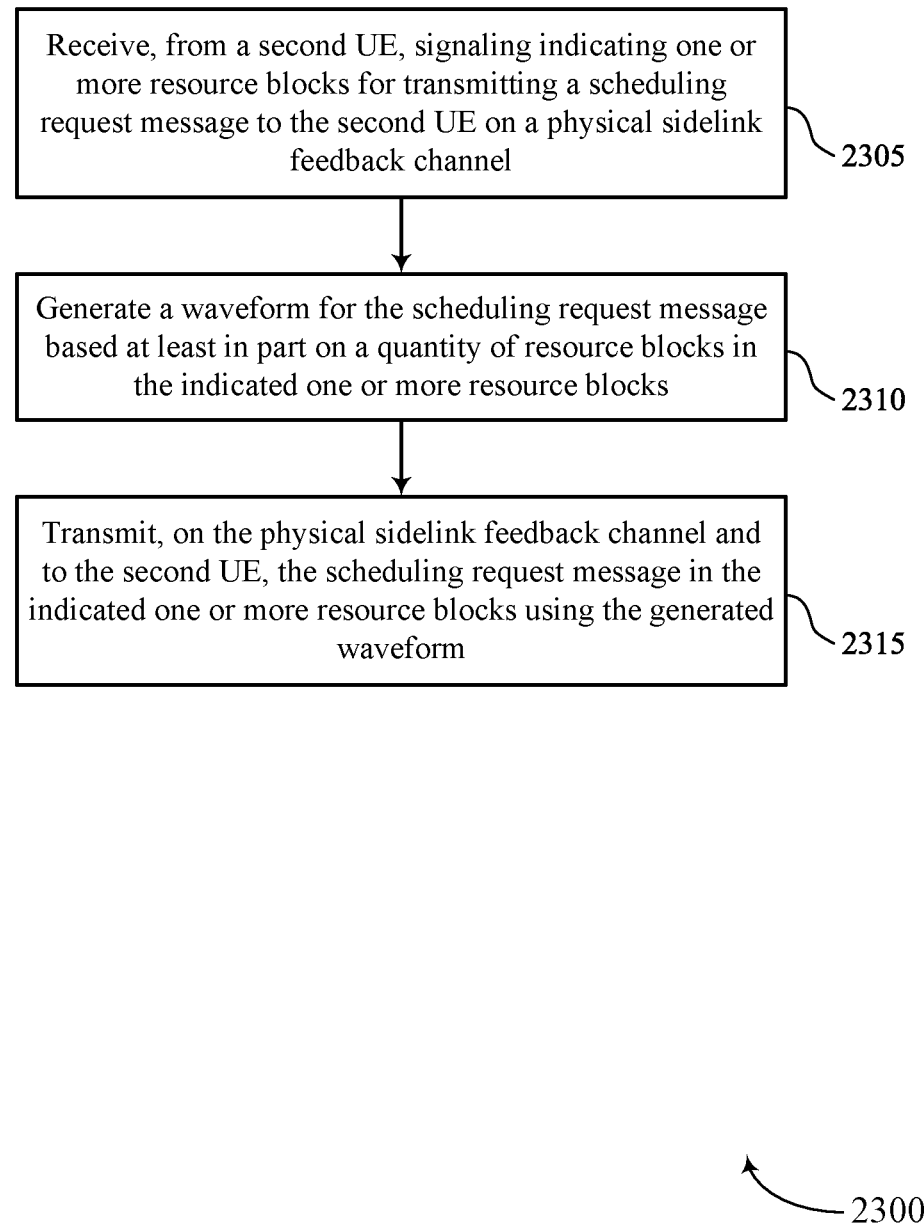

FIG. 23 shows a flowchart illustrating a method 2300 that supports resource mapping for a scheduling request on a PSFCH in accordance with one or more aspects of the present disclosure. The operations of the method 2300 may be implemented by a UE or its components as described herein. For example, the operations of the method 2300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 2305, the method may include receiving, from a second UE, signaling indicating one or more RBs for transmitting a scheduling request message to the second UE on a PSFCH. The operations of 2305 may be performed in accordance with examples as disclosed herein. In some examples, aspects of the operations of 2305 may be performed by an RB allocation component as described with reference to FIGS. 6 through 9.

At 2310, the method may include generating a waveform for the scheduling request message based on a quantity of RBs in the indicated one or more RBs. The operations of 2310 may be performed in accordance with examples as disclosed herein. In some examples, aspects of the operations of 2310 may be performed by a waveform generation component as described with reference to FIGS. 6 through 9.

At 2315, the method may include transmitting, on the PSFCH and to the second UE, the scheduling request message in the indicated one or more RBs using the generated waveform. The operations of 2315 may be performed in accordance with examples as disclosed herein. In some examples, aspects of the operations of 2315 may be performed by a scheduling request component as described with reference to FIGS. 6 through 9.

Figure 24:
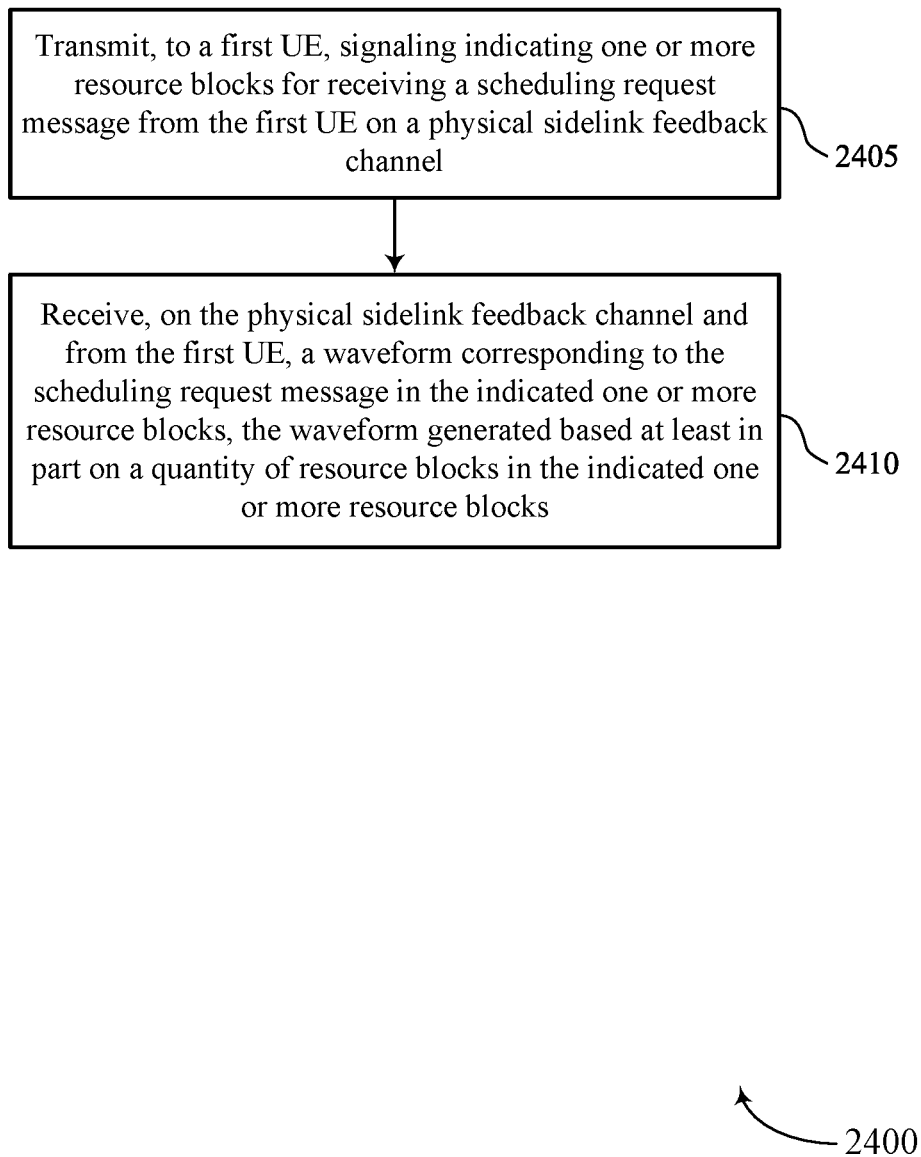

FIG. 24 shows a flowchart illustrating a method 2400 that supports resource mapping for a scheduling request on a PSFCH in accordance with one or more aspects of the present disclosure. The operations of the method 2400 may be implemented by a UE or its components as described herein. For example, the operations of the method 2400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 2405, the method may include transmitting, to a first UE, signaling indicating one or more RBs for receiving a scheduling request message from the first UE on a PSFCH. The operations of 2405 may be performed in accordance with examples as disclosed herein. In some examples, aspects of the operations of 2405 may be performed by an RB allocation component as described with reference to FIGS. 6 through 9.

At 2410, the method may include receiving, on the PSFCH and from the first UE, a waveform corresponding to the scheduling request message in the indicated one or more RBs, the waveform generated based on a quantity of RBs in the indicated one or more RBs. The operations of 2410 may be performed in accordance with examples as disclosed herein. In some examples, aspects of the operations of 2410 may be performed by a scheduling request component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Aspect 1: A method for wireless communications by a first UE, comprising: receiving control signaling indicating a first subset of a set of PSFCH RBs allocated for scheduling request transmission on a PSFCH; and transmitting, on the PSFCH and to a second UE, a scheduling request message in the first subset of the set of PSFCH RBs.

Aspect 2: The method of aspect 1, the receiving the control signaling comprising: receiving a first bit map indicating the first subset of the set of PSFCH RBs allocated for the scheduling request transmission.

Aspect 3: The method of aspect 2, further comprising: receiving, from the second UE, a group index associated with the first UE; and determining the first subset of the set of PSFCH RBs allocated for the scheduling request transmission on the PSFCH based at least in part on the group index, the first bit map indicating the first subset of the set of PSFCH RBs allocated for the scheduling request transmission by a first plurality of UEs associated with the group index, and the first bit map further indicating at least a second subset of the set of PSFCH RBs allocated for the scheduling request transmission by a second plurality of UEs associated with a second group index.

Aspect 4: The method of any of aspects 2 through 3, wherein the first bit map further indicates a set of slots in which the first subset of the set of PSFCH RBs is allocated for the scheduling request transmission on the PSFCH; and the first bit map comprises a set of bits, each bit of the set of bits indicating a RB in the set of PSFCH RBs, a RB in a sub-channel of the set of PSFCH RBs, a RB in a set of sub-channels of the set of PSFCH RBs, or a combination thereof.

Aspect 5: The method of any of aspects 1 through 4, further comprising: receiving a second bit map indicating a second subset of the set of PSFCH RBs allocated for HARQ transmission on the PSFCH.

Aspect 6: The method of aspect 5, wherein the first subset of the set of PSFCH RBs at least partially overlaps with the second subset of the set of PSFCH RBs.

Aspect 7: The method of any of aspects 1 through 6, further comprising: selecting one or more RBs from the first subset of the set of PSFCH RBs, the transmitting comprising: transmitting the scheduling request message in the selected one or more RBs.

Aspect 8: The method of aspect 7, the selecting further comprising: selecting the one or more RBs based at least in part on an ID for the first UE, an ID for the second UE, a slot number, a sub-channel index for the PSFCH, a quantity of S/As, a group index associated with the first UE, or a combination thereof.

Aspect 9: The method of aspect 7, further comprising: receiving, from the second UE, an RRC message configuring the first UE with the one or more RBs, the selecting comprising: selecting the one or more RBs based at least in part on the RRC message.

Aspect 10: The method of any of aspects 7 through 9, further comprising: selecting an additional RB from a second subset of the set of PSFCH RBs based at least in part on a second selection procedure, the selecting the one or more RBs from the first subset of the set of PSFCH RBs being based at least in part on a first selection procedure different from the second selection procedure; and transmitting, on the PSFCH, a HARQ message in the selected additional RB.

Aspect 11: The method of aspect 10, further comprising: receiving, from the second UE, a message indicating an offset value for the first selection procedure, the selected additional RB being distinct from the selected one or more RBs based at least in part on the offset value for the first selection procedure.

Aspect 12: The method of any of aspects 1 through 11, further comprising: determining to transmit both the scheduling request message and a HARQ indicator in a slot, the transmitting comprising: transmitting a hybrid message indicating the scheduling request message and the HARQ indicator in one or more RBs of the first subset of the set of PSFCH RBs.

Aspect 13: A method for wireless communications by a second UE, comprising: receiving control signaling indicating a first subset of a set of PSFCH RBs allocated for scheduling request reception on a PSFCH; and receiving, on the PSFCH and from a first UE, a scheduling request message in the first subset of the set of PSFCH RBs.

Aspect 14: The method of aspect 13, the receiving the control signaling comprising: receiving a first bit map indicating the first subset of the set of PSFCH RBs allocated for scheduling request reception.

Aspect 15: The method of any of aspects 13 through 14, further comprising: receiving a second bit map indicating a second subset of the set of PSFCH RBs allocated for HARQ reception on the PSFCH.

Aspect 16: The method of aspect 15, wherein the first subset of the set of PSFCH RBs at least partially overlaps with the second subset of the set of PSFCH RBs.

Aspect 17: The method of any of aspects 13 through 16, further comprising: transmitting, to the first UE, a RRC message configuring the first UE with one or more RBs from the first subset of the set of PSFCH RBs, the scheduling request message received in the one or more RBs based at least in part on the RRC message.

Aspect 18: The method of any of aspects 13 through 17, further comprising: transmitting, to the first UE, a message indicating an offset value for a first selection procedure; and receiving, on the PSFCH, a HARQ message in a second subset of the set of PSFCH RBs, the scheduling request message being received in one or more RBs selected based at least in part on the first selection procedure and the HARQ message being received in an additional RB distinct from the one or more RBs based at least in part on the offset value for the first selection procedure.

Aspect 19: The method of any of aspects 13 through 18, further comprising: transmitting, to a plurality of UEs comprising at least the first UE, a plurality of group indexes, each group index of the plurality of group indexes associated with one or more UEs of the plurality of UEs, and the scheduling request message being received in one or more RBs of the first subset of the set of PSFCH RBs based at least in part on a group index of the plurality of group indexes associated with the first UE.

Aspect 20: The method of any of aspects 13 through 19, further comprising: determining that the scheduling request message is transmitted to the second UE based at least in part on a slot in which the scheduling request message is received, the first subset of the set of PSFCH RBs being allocated for scheduling request transmission to the second UE in the slot.

Aspect 21: The method of any of aspects 13 through 19, further comprising: determining that the scheduling request message is transmitted to the second UE based at least in part on one or more RBs in which the scheduling request message is received being selected based at least in part on an ID for the second UE.

Aspect 22: A method for wireless communications by a base station, comprising: configuring a first subset of a set of PSFCH RBs for scheduling request transmission by a first UE to a second UE on a PSFCH; and transmitting, to the first UE and the second UE, control signaling indicating the first subset of the set of PSFCH RBs allocated for the scheduling request transmission on the PSFCH.

Aspect 23: The method of aspect 22, the control signaling comprising a first bit map indicating the first subset of the set of PSFCH RBs allocated for the scheduling request transmission, and the method further comprising: configuring a second subset of the set of PSFCH RBs for HARQ transmission by the first UE to the second UE on the PSFCH; and transmitting, to the first UE and the second UE, a second bit map indicating the second subset of the set of PSFCH RBs allocated for the HARQ transmission on the PSFCH.

Aspect 24: A method for wireless communications at a first UE, comprising: receiving, from a second UE, signaling indicating one or more RBs for transmitting a scheduling request message to the second UE on a PSFCH; generating a waveform for the scheduling request message based at least in part on a quantity of RBs in the indicated one or more RBs; and transmitting, on the PSFCH and to the second UE, the scheduling request message in the indicated one or more RBs using the generated waveform.

Aspect 25: The method of aspect 24, the quantity of RBs comprising one RB, and the method further comprising: determining a first root ZC sequence assigned to the second UE for a first slot, the generated waveform being based at least in part on the first root ZC sequence, a cyclic shift, or both; and determining a second root ZC sequence assigned to the second UE for a second slot based at least in part on a pseudo-random number generator, a seed value, an ID of the second UE, or a combination thereof.

Aspect 26: The method of any of aspects 24 through 25, further comprising: generating a plurality of bits for the scheduling request message, the plurality of bits indicating an amount of data pending in a buffer for transmission to the second UE.

Aspect 27: The method of any of aspects 24 through 26, further comprising: selecting a cyclic shift, a preamble, or both for the scheduling request message to indicate an amount of data pending in a buffer for transmission to the second UE.

Aspect 28: The method of any of aspects 24, 26, or 27, the quantity of RBs comprising two or more RBs, and the method further comprising: determining a root ZC sequence for the two or more RBs, the generated waveform being based at least in part on the root ZC sequence; and selecting a cyclic shift from a set of valid cyclic shifts for the scheduling request message, the set of valid cyclic shifts being based at least in part on the quantity of RBs, one or more channel conditions of the PSFCH, or a combination thereof.

Aspect 29: The method of any of aspects 24 through 28, the first UE comprising an S/A and the second UE comprising a PLC, and the method further comprising: determining the quantity of RBs based at least in part on a quantity of S/As associated with the PLC, a quantity of additional PLCs coexisting with the PLC, or a combination thereof.

Aspect 30: A method for wireless communications at a second UE, comprising: transmitting, to a first UE, signaling indicating one or more RBs for receiving a scheduling request message from the first UE on a PSFCH; and receiving, on the PSFCH and from the first UE, a waveform corresponding to the scheduling request message in the indicated one or more RBs, the waveform generated based at least in part on a quantity of RBs in the indicated one or more RBs.

Aspect 31: A method for wireless communications by a first UE, comprising: determining a configuration for a PSFCH, the configuration indicating a set of PSFCH RBs; receiving a first bit map indicating a first subset of the set of PSFCH RBs allocated for scheduling request transmission on the PSFCH and a second bit map indicating a second subset of the set of PSFCH RBs allocated for HARQ transmission on the PSFCH; and transmitting, on the PSFCH and to a second UE, a scheduling request message in the first subset of the set of PSFCH RBs.

Aspect 32: The method of aspect 31, further comprising: selecting one or more RBs from the first subset of the set of PSFCH RBs, the transmitting comprising: transmitting the scheduling request message in the selected one or more RBs.

Aspect 33: The method of aspect 32, the selecting further comprising: selecting the one or more RBs based at least in part on an ID for the first UE, an ID for the second UE, a slot number, a sub-channel index for the PSFCH, a number of S/As, a group index associated with the first UE, or a combination thereof.

Aspect 34: The method of aspect 32, further comprising: receiving, from the second UE, a RRC message configuring the first UE with the one or more RBs, the selecting comprising: selecting the one or more RBs based at least in part on the RRC message.

Aspect 35: The method of any of aspects 32 through 34, further comprising: selecting an additional RB from the second subset of the set of PSFCH RBs; and transmitting, on the PSFCH, a HARQ message in the selected additional RB.

Aspect 36: The method of aspect 35, wherein the selecting the one or more RBs from the first subset of the set of PSFCH RBs is based at least in part on a first selection algorithm; and the selecting the additional RB from the second subset of the set of PSFCH RBs is based at least in part on a second selection algorithm different from the first selection algorithm.

Aspect 37: The method of aspect 36, further comprising: receiving, from the second UE, a message indicating an offset value for the first selection algorithm, the selected additional RB being distinct from the selected one or more RBs based at least in part on the offset value for the first selection algorithm.

Aspect 38: The method of any of aspects 31 through 37, further comprising: receiving, from the second UE, a group index associated with the first UE; and determining the first subset of the set of PSFCH RBs allocated for scheduling request transmission on the PSFCH based at least in part on the group index.

Aspect 39: The method of aspect 38, wherein the first bit map indicates the first subset of the set of PSFCH RBs allocated for scheduling request transmission by a first plurality of UEs associated with the group index; and the first bit map further indicates a third subset of the set of PSFCH RBs allocated for scheduling request transmission by a second plurality of UEs associated with a second group index.

Aspect 40: The method of aspect 39, wherein the first subset of the set of PSFCH RBs is time-division multiplexed with the third subset of the set of PSFCH RBs.

Aspect 41: The method of any of aspects 31 through 40, further comprising: determining to transmit both the scheduling request message and a HARQ indicator in a slot, the transmitting comprising: transmitting a hybrid message indicating the scheduling request message and the HARQ indicator in one or more RBs of the first subset of the set of PSFCH RBs.

Aspect 42: The method of any of aspects 31 through 41, the receiving the first bit map and the second bit map comprising: receiving, from a base station, a broadcast message indicating the first bit map and the second bit map.

Aspect 43: The method of any of aspects 31 through 42, wherein the first bit map further indicates a set of slots in which the first subset of the set of PSFCH RBs is allocated for scheduling request transmission on the PSFCH.

Aspect 44: The method of any of aspects 31 through 43, wherein the first bit map further indicates a first slot in which the first subset of the set of PSFCH RBs is allocated for scheduling request transmission to the second UE and a second slot in which the first subset of the set of PSFCH RBs is allocated for scheduling request transmission to a third UE.

Aspect 45: The method of any of aspects 31 through 44, wherein the first bit map comprises a set of bits, each bit of the set of bits indicating a RB in the set of PSFCH RBs, a RB in a sub-channel of the set of PSFCH RBs, a RB in a set of sub-channels of the set of PSFCH RBs, or a combination thereof.

Aspect 46: The method of any of aspects 31 through 45, wherein the first subset of the set of PSFCH RBs at least partially overlaps with the second subset of the set of PSFCH RBs.

Aspect 47: A method for wireless communications by a first UE, comprising: determining a configuration for a PSFCH, the configuration indicating a set of PSFCH RBs; receiving a first bit map indicating a first subset of the set of PSFCH RBs allocated for scheduling request reception on the PSFCH and a second bit map indicating a second subset of the set of PSFCH RBs allocated for HARQ reception on the PSFCH; and receiving, on the PSFCH and from a second UE, a scheduling request message in the first subset of the set of PSFCH RBs.

Aspect 48: The method of aspect 47, further comprising: transmitting, to the second UE, a RRC message configuring the second UE with one or more RBs from the first subset of the set of PSFCH RBs, the scheduling request message received in the one or more RBs based at least in part on the RRC message.

Aspect 49: The method of any of aspects 47 through 48, further comprising: receiving, on the PSFCH, a HARQ message in the second subset of the set of PSFCH RBs.

Aspect 50: The method of aspect 49, further comprising: transmitting, to the second UE, a message indicating an offset value for a first selection algorithm, the scheduling request message transmitted in one or more RBs selected based at least in part on the first selection algorithm and the HARQ message transmitted in an additional RB distinct from the one or more RBs based at least in part on the offset value for the first selection algorithm.

Aspect 51: The method of any of aspects 47 through 50, further comprising: transmitting, to a plurality of UEs comprising at least the second UE, a plurality of group indexes, each group index of the plurality of group indexes associated with one or more UEs of the plurality of UEs, and the scheduling request message being received in one or more RBs of the first subset of the set of PSFCH RBs based at least in part on a group index of the plurality of group indexes associated with the second UE.

Aspect 52: The method of any of aspects 47 through 51, further comprising: determining that the scheduling request message is transmitted to the first UE based at least in part on a slot in which the scheduling request message is received, the first subset of the set of PSFCH RBs being allocated for scheduling request transmission to the first UE in the slot.

Aspect 53: The method of any of aspects 47 through 52, further comprising: determining that the scheduling request message is transmitted to the first UE based at least in part on one or more RBs in which the scheduling request message is received being selected based at least in part on an ID for the first UE.

Aspect 54: A method for wireless communications at a first UE, comprising: determining data pending in a buffer for transmission to a second UE; selecting one or more RBs for transmitting a scheduling request message to the second UE on a PSFCH based at least in part on the data pending in the buffer; generating a waveform for the scheduling request message based at least in part on a number of RBs in the selected one or more RBs; and transmitting, on the PSFCH and to the second UE, the scheduling request message in the selected one or more RBs using the generated waveform.

Aspect 55: The method of aspect 54, the number of RBs comprising one RB, and the method further comprising: determining a root ZC sequence assigned to the second UE, the generated waveform being based at least in part on the root ZC sequence, a cyclic shift, or both.

Aspect 56: The method of aspect 55, the root ZC sequence being assigned to the second UE for a first slot, and the method further comprising: determining a second root ZC sequence assigned to the second UE for a second slot based at least in part on a pseudo-random number generator, a seed value, an ID of the second UE, or a combination thereof.

Aspect 57: The method of any of aspects 54 through 56, further comprising: generating a plurality of bits for the scheduling request message, the plurality of bits indicating an amount of data pending in the buffer for transmission to the second UE.

Aspect 58: The method of any of aspects 54 through 57, further comprising: selecting a cyclic shift, a preamble, or both for the scheduling request message to indicate an amount of data pending in the buffer for transmission to the second UE.

Aspect 59: The method of any of aspects 54, 57, or 58, the number of RBs comprising two or more RBs, and the method further comprising: determining a root ZC sequence for the two or more RBs, the generated waveform being based at least in part on the root ZC sequence.

Aspect 60: The method of aspect 59, further comprising: selecting a cyclic shift from a set of valid cyclic shifts for the scheduling request message, the set of valid cyclic shifts being based at least in part on the number of RBs, one or more channel conditions of the PSFCH, or a combination thereof.

Aspect 61: The method of any of aspects 54 through 60, further comprising: receiving, from the second UE, a message indicating the number of RBs, the selecting the one or more RBs being based at least in part on the message.

Aspect 62: The method of any of aspects 54 through 60, the first UE comprising a sensor/actuator and the second UE comprising a PLC, and the method further comprising: determining the number of RBs based at least in part on a number of S/As associated with the PLC, a number of additional PLCs coexisting with the PLC, or a combination thereof.

Aspect 63: The method of any of aspects 54 through 58, 61, or 62, wherein the number of RBs comprises one RB; and the generated waveform comprises a PUCCH format 0 waveform.

Aspect 64: An apparatus for wireless communications by a first UE, comprising: a processor; and memory coupled to the processor, the processor and memory configured to perform a method of any of aspects 1 through 12.

Aspect 65: An apparatus for wireless communications by a first UE, comprising at least one means for performing a method of any of aspects 1 through 12.

Aspect 66: A non-transitory computer-readable medium storing code for wireless communications by a first UE, the code comprising instructions executable by a processor to perform a method of any of aspects 1 through 12.

Aspect 67: An apparatus for wireless communications by a second UE, comprising: a processor; and memory coupled to the processor, the processor and memory configured to perform a method of any of aspects 13 through 21.

Aspect 68: An apparatus for wireless communications by a second UE, comprising at least one means for performing a method of any of aspects 13 through 21.

Aspect 69: A non-transitory computer-readable medium storing code for wireless communications by a second UE, the code comprising instructions executable by a processor to perform a method of any of aspects 13 through 21.

Aspect 70: An apparatus for wireless communications by a base station, comprising: a processor; and memory coupled to the processor, the processor and memory configured to perform a method of any of aspects 22 through 23.

Aspect 71: An apparatus for wireless communications by a base station, comprising at least one means for performing a method of any of aspects 22 through 23.

Aspect 72: A non-transitory computer-readable medium storing code for wireless communications by a base station, the code comprising instructions executable by a processor to perform a method of any of aspects 22 through 23.

Aspect 73: An apparatus for wireless communications at a first UE, comprising: a processor; and memory coupled to the processor, the processor and memory configured to perform a method of any of aspects 24 through 29.

Aspect 74: An apparatus for wireless communications at a first UE, comprising at least one means for performing a method of any of aspects 24 through 29.

Aspect 75: A non-transitory computer-readable medium storing code for wireless communications at a first UE, the code comprising instructions executable by a processor to perform a method of any of aspects 24 through 29.

Aspect 76: An apparatus for wireless communications at a second UE, comprising: a processor; and memory coupled to the processor, the processor and memory configured to perform the method of aspect 30.

Aspect 77: An apparatus for wireless communications at a second UE, comprising at least one means for performing the method of aspect 30.

Aspect 78: A non-transitory computer-readable medium storing code for wireless communications at a second UE, the code comprising instructions executable by a processor to perform the method of aspect 30.

Aspect 79: An apparatus for wireless communications by a first UE, comprising: a processor; and memory coupled to the processor, the processor and memory configured to perform a method of any of aspects 31 through 46.

Aspect 80: An apparatus for wireless communications by a first UE, comprising at least one means for performing a method of any of aspects 31 through 46.

Aspect 81: A non-transitory computer-readable medium storing code for wireless communications by a first UE, the code comprising instructions executable by a processor to perform a method of any of aspects 31 through 46.

Aspect 82: An apparatus for wireless communications by a first UE, comprising: a processor; and memory coupled to the processor, the processor and memory configured to perform a method of any of aspects 47 through 53.

Aspect 83: An apparatus for wireless communications by a first UE, comprising at least one means for performing a method of any of aspects 47 through 53.

Aspect 84: A non-transitory computer-readable medium storing code for wireless communications by a first UE, the code comprising instructions executable by a processor to perform a method of any of aspects 47 through 53.

Aspect 85: An apparatus for wireless communications at a first UE, comprising: a processor; and memory coupled to the processor, the processor and memory configured to perform a method of any of aspects 54 through 63.

Aspect 86: An apparatus for wireless communications at a first UE, comprising at least one means for performing a method of any of aspects 54 through 63.

Aspect 87: A non-transitory computer-readable medium storing code for wireless communications at a first UE, the code comprising instructions executable by a processor to perform a method of any of aspects 54 through 63.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first user equipment (UE), comprising:
   one or more memories; and
   one or more processors coupled with the one or more memories and configured to cause the first UE to:
      receive control signaling that comprises a first bit map, wherein the first bit map indicates a first subset of a set of physical sidelink feedback channel resource blocks allocated for transmission of a scheduling request via a physical sidelink feedback channel; and
      transmit, via the physical sidelink feedback channel and to a second UE based at least in part on the first bit map, a scheduling request message via the first subset of the set of physical sidelink feedback channel resource blocks.

2. The apparatus of claim 1, wherein the one or more processors are further configured to cause the first UE to:

receive, from the second UE, a group index associated with the first UE; and
determine the first subset of the set of physical sidelink feedback channel resource blocks allocated for the transmission of the scheduling request via the physical sidelink feedback channel based at least in part on the group index,
wherein the first bit map indicates the first subset of the set of physical sidelink feedback channel resource blocks allocated for the transmission of the scheduling request by a first plurality of UEs associated with the group index, and
wherein the first bit map further indicates at least a second subset of the set of physical sidelink feedback channel resource blocks allocated for the transmission of the scheduling request by a second plurality of UEs associated with a second group index.

3. The apparatus of claim 1, wherein:
the first bit map further indicates a set of slots in which the first subset of the set of physical sidelink feedback channel resource blocks is allocated for the transmission of the scheduling request via the physical sidelink feedback channel; and
the first bit map comprises a set of bits, wherein each bit of the set of bits indicates a resource block in the set of physical sidelink feedback channel resource blocks, a resource block in a sub-channel of the set of physical sidelink feedback channel resource blocks, a resource block in a set of sub-channels of the set of physical sidelink feedback channel resource blocks, or a combination thereof.

4. The apparatus of claim 1, wherein the one or more processors are further configured to cause the first UE to:
receive a second bit map that indicates a second subset of the set of physical sidelink feedback channel resource blocks allocated for hybrid automatic repeat request transmission via the physical sidelink feedback channel.

5. The apparatus of claim 4, wherein the first subset of the set of physical sidelink feedback channel resource blocks at least partially overlaps with the second subset of the set of physical sidelink feedback channel resource blocks.

6. The apparatus of claim 1, wherein the one or more processors are further configured to cause the first UE to:
select one or more resource blocks from the first subset of the set of physical sidelink feedback channel resource blocks, wherein, to transmit the scheduling request message, the one or more processors are configured to cause the first UE to:
transmit the scheduling request message via the selected one or more resource blocks.

7. The apparatus of claim 6, wherein the one or more processors are further configured to cause the first UE to:
select the one or more resource blocks based at least in part on an identifier for the first UE, an identifier for the second UE, a slot number, a sub-channel index for the physical sidelink feedback channel, a quantity of sensors/actuators, a group index associated with the first UE, or a combination thereof.

8. The apparatus of claim 6, wherein the one or more processors are further configured to cause the first UE to:
receive, from the second UE, a radio resource control message that configures the first UE with the one or more resource blocks, wherein, to select the one or more resource blocks, the one or more processors are configured to cause the first UE to:
select the one or more resource blocks based at least in part on the radio resource control message.

9. The apparatus of claim 6, wherein the one or more processors are further configured to cause the first UE to:
select an additional resource block from a second subset of the set of physical sidelink feedback channel resource blocks based at least in part on a second selection procedure, wherein the one or more resource blocks are selected from the first subset of the set of physical sidelink feedback channel resource blocks based at least in part on a first selection procedure different from the second selection procedure; and
transmit, via the physical sidelink feedback channel, a hybrid automatic repeat request message via the selected additional resource block.

10. The apparatus of claim 9, wherein the one or more processors are further configured to cause the first UE to:
receive, from the second UE, a message that indicates an offset value for the first selection procedure, wherein the selected additional resource block is distinct from the selected one or more resource blocks based at least in part on the offset value for the first selection procedure.

11. The apparatus of claim 1, wherein the one or more processors are further configured to cause the first UE to:
determine to transmit both the scheduling request message and a hybrid automatic repeat request indicator via a slot, wherein, to transmit the scheduling request message, the one or more processors are configured to cause the first UE to:
transmit a hybrid message that indicates the scheduling request message and the hybrid automatic repeat request indicator via one or more resource blocks of the first subset of the set of physical sidelink feedback channel resource blocks.

12. An apparatus for wireless communications at a second user equipment (UE), comprising:
one or more memories; and
one or more processors coupled with the one or more memories and configured to cause the second UE to:
receive control signaling that comprises a first bit map, wherein the first bit map indicates a first subset of a set of physical sidelink feedback channel resource blocks allocated for reception of a scheduling request via a physical sidelink feedback channel; and
receive, via the physical sidelink feedback channel and from a first UE based at least in part on the first bit map, a scheduling request message via the first subset of the set of physical sidelink feedback channel resource blocks.

13. The apparatus of claim 12, wherein the one or more processors are further configured to cause the second UE to:
receive a second bit map that indicates a second subset of the set of physical sidelink feedback channel resource blocks allocated for hybrid automatic repeat request reception via the physical sidelink feedback channel.

14. The apparatus of claim 13, wherein the first subset of the set of physical sidelink feedback channel resource blocks at least partially overlaps with the second subset of the set of physical sidelink feedback channel resource blocks.

15. The apparatus of claim 12, wherein the one or more processors are further configured to cause the second UE to:
transmit, to the first UE, a radio resource control message that configures the first UE with one or more resource blocks from the first subset of the set of physical sidelink feedback channel resource blocks, the scheduling request message received via the one or more resource blocks based at least in part on the radio resource control message.

16. The apparatus of claim 12, wherein the one or more processors are further configured to cause the second UE to:
transmit, to the first UE, a message that indicates an offset value for a first selection procedure; and
receive, via the physical sidelink feedback channel, a hybrid automatic repeat request message via a second subset of the set of physical sidelink feedback channel resource blocks, wherein the scheduling request message is received via one or more resource blocks selected based at least in part on the first selection procedure and the hybrid automatic repeat request message is received via an additional resource block distinct from the one or more resource blocks based at least in part on the offset value for the first selection procedure.

17. The apparatus of claim 12, wherein the one or more processors are further configured to cause the second UE to:
transmit, to a plurality of UEs that comprises at least the first UE, a plurality of group indexes, each group index of the plurality of group indexes associated with one or more UEs of the plurality of UEs, wherein the scheduling request message is received via one or more resource blocks of the first subset of the set of physical sidelink feedback channel resource blocks based at least in part on a group index of the plurality of group indexes associated with the first UE.

18. The apparatus of claim 12, wherein the one or more processors are further configured to cause the second UE to:
determine that the scheduling request message is transmitted to the second UE based at least in part on a slot via which the scheduling request message is received, the first subset of the set of physical sidelink feedback channel resource blocks allocated for transmission of the scheduling request to the second UE via the slot.

19. The apparatus of claim 12, wherein the one or more processors are further configured to cause the second UE to:
determine that the scheduling request message is transmitted to the second UE based at least in part on selection of one or more resource blocks via which the scheduling request message is received based at least in part on an identifier for the second UE.

20. An apparatus for wireless communications at a network entity, comprising:
one or more memories; and
one or more processors coupled with the one or more memories and configured to cause the network entity to:
configure a first subset of a set of physical sidelink feedback channel resource blocks for transmission of a scheduling request by a first user equipment (UE) to a second UE via a physical sidelink feedback channel; and
transmit, to the first UE and the second UE, control signaling that comprises a first bit map, wherein the first bit map indicates the first subset of the set of physical sidelink feedback channel resource blocks allocated for the transmission of the scheduling request via the physical sidelink feedback channel.

21. The apparatus of claim 20, wherein the one or more processors are further configured to cause the network entity to:
configure a second subset of the set of physical sidelink feedback channel resource blocks for hybrid automatic repeat request transmission by the first UE to the second UE via the physical sidelink feedback channel; and
transmit, to the first UE and the second UE, a second bit map that indicates the second subset of the set of physical sidelink feedback channel resource blocks allocated for the hybrid automatic repeat request transmission via the physical sidelink feedback channel.

22. A method for wireless communications at a first user equipment (UE), comprising:
receiving control signaling comprising a first bit map, the first bit map indicating a first subset of a set of physical sidelink feedback channel resource blocks allocated for transmission of a scheduling request via a physical sidelink feedback channel; and
transmitting, via the physical sidelink feedback channel and to a second UE based at least in part on the first bit map, a scheduling request message via the first subset of the set of physical sidelink feedback channel resource blocks.

23. The method of claim 22, further comprising:
receiving, from the second UE, a group index associated with the first UE; and
determining the first subset of the set of physical sidelink feedback channel resource blocks allocated for the transmission of the scheduling request via the physical sidelink feedback channel based at least in part on the group index,
the first bit map indicating the first subset of the set of physical sidelink feedback channel resource blocks allocated for the transmission of the scheduling request by a first plurality of UEs associated with the group index, and
the first bit map further indicating at least a second subset of the set of physical sidelink feedback channel resource blocks allocated for the transmission of the scheduling request by a second plurality of UEs associated with a second group index.

24. The method of claim 22, wherein:
the first bit map further indicates a set of slots in which the first subset of the set of physical sidelink feedback channel resource blocks is allocated for the transmission of the scheduling request via the physical sidelink feedback channel; and
the first bit map comprises a set of bits, each bit of the set of bits indicating a resource block in the set of physical sidelink feedback channel resource blocks, a resource block in a sub-channel of the set of physical sidelink feedback channel resource blocks, a resource block in a set of sub-channels of the set of physical sidelink feedback channel resource blocks, or a combination thereof.

25. A method for wireless communications at a second user equipment (UE), comprising:
receiving control signaling comprising a first bit map, the first bit map indicating a first subset of a set of physical sidelink feedback channel resource blocks allocated for reception of a scheduling request via a physical sidelink feedback channel; and
receiving, via the physical sidelink feedback channel and from a first UE based at least in part on the first bit map, a scheduling request message via the first subset of the set of physical sidelink feedback channel resource blocks.

26. The method of claim 25, further comprising:
receiving a second bit map indicating a second subset of the set of physical sidelink feedback channel resource blocks allocated for hybrid automatic repeat request reception via the physical sidelink feedback channel.

27. The method of claim 26, wherein the first subset of the set of physical sidelink feedback channel resource blocks at least partially overlaps with the second subset of the set of physical sidelink feedback channel resource blocks.

28. A method for wireless communications at a network entity, comprising:
configuring a first subset of a set of physical sidelink feedback channel resource blocks for transmission of a scheduling request by a first user equipment (UE) to a second UE via a physical sidelink feedback channel; and
transmitting, to the first UE and the second UE, control signaling comprising a first bit map, the first bit map indicating the first subset of the set of physical sidelink feedback channel resource blocks allocated for the transmission of the scheduling request via the physical sidelink feedback channel.

29. The method of claim 28, further comprising:
configuring a second subset of the set of physical sidelink feedback channel resource blocks for hybrid automatic repeat request transmission by the first UE to the second UE via the physical sidelink feedback channel; and
transmitting, to the first UE and the second UE, a second bit map indicating the second subset of the set of physical sidelink feedback channel resource blocks allocated for the hybrid automatic repeat request transmission via the physical sidelink feedback channel.

30. A non-transitory computer-readable medium storing code for wireless communications at a first user equipment (UE), the code comprising instructions executable by one or more processors to cause the first UE to:
receive control signaling comprising a first bit map, the first bit map indicating a first subset of a set of physical sidelink feedback channel resource blocks allocated for transmission of a scheduling request via a physical sidelink feedback channel; and
transmit, via the physical sidelink feedback channel and to a second UE based at least in part on the first bit map, a scheduling request message via the first subset of the set of physical sidelink feedback channel resource blocks.

31. A non-transitory computer-readable medium storing code for wireless communications at a second user equipment (UE), the code comprising instructions executable by one or more processors to cause the second UE to:
receive control signaling comprising a first bit map, the first bit map indicating a first subset of a set of physical sidelink feedback channel resource blocks allocated for reception of a scheduling request via a physical sidelink feedback channel; and
receive, via the physical sidelink feedback channel and from a first UE based at least in part on the first bit map, a scheduling request message via the first subset of the set of physical sidelink feedback channel resource blocks.

32. A non-transitory computer-readable medium storing code for wireless communications at a network entity, the code comprising instructions executable by one or more processors to cause the network entity to:
configure a first subset of a set of physical sidelink feedback channel resource blocks for transmission of a scheduling request by a first user equipment (UE) to a second UE via a physical sidelink feedback channel; and
transmit, to the first UE and the second UE, control signaling comprising a first bit map, the first bit map indicating the first subset of the set of physical sidelink feedback channel resource blocks allocated for the transmission of the scheduling request via the physical sidelink feedback channel.

* * * * *